(12) United States Patent
Faris et al.

(10) Patent No.: US 10,838,190 B2
(45) Date of Patent: Nov. 17, 2020

(54) HYPERSPECTRAL IMAGING METHODS AND APPARATUSES

(71) Applicant: SRI International, Menlo Park, CA (US)

(72) Inventors: Gregory Faris, Menlo Park, CA (US); Dennis Ai, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/312,130

(22) PCT Filed: Jun. 21, 2017

(86) PCT No.: PCT/US2017/038555
§ 371 (c)(1),
(2) Date: Dec. 20, 2018

(87) PCT Pub. No.: WO2017/223206
PCT Pub. Date: Dec. 28, 2017

(65) Prior Publication Data
US 2019/0204577 A1    Jul. 4, 2019

Related U.S. Application Data

(60) Provisional application No. 62/352,931, filed on Jun. 21, 2016.

(51) Int. Cl.
*G01N 21/64* (2006.01)
*G02B 21/36* (2006.01)
(Continued)

(52) U.S. Cl.
CPC .......... *G02B 21/361* (2013.01); *G01J 3/2823* (2013.01); *G01N 21/64* (2013.01);
(Continued)

(58) Field of Classification Search
CPC . G02B 21/361; G02B 21/0088; G01J 3/2823; G01J 2003/2826; G01J 3/44; G01N 21/64; G06T 1/20
See application file for complete search history.

(56) References Cited

U.S. PATENT DOCUMENTS 3,701,589 A    10/1972  Haines
6,337,472 B1   1/2002   Garner et al.
(Continued)

FOREIGN PATENT DOCUMENTS

WO    0006980 A1     2/2000
WO    2014118326 A2  8/2014
WO    20140118326 A2 8/2014

OTHER PUBLICATIONS

USPTO. International Search Report and Written Opinion for related PCT Application No. PCT/US2017/038555, dated Sep. 11, 2017, 27 pages.
(Continued)

*Primary Examiner* — Maurice C Smith
(74) *Attorney, Agent, or Firm* — Dicke, Billig & Czaja PLLC

(57) ABSTRACT

An example imaging apparatus comprises a light source, an imaging spectrometer, an image sensor, control circuitry, and processing circuitry. The light source generates power for delivery at a molecular sample, which can include at least 100 mW. The imaging spectrometer separates light emitted from the molecular sample into a plurality of different component wavelengths. The control circuitry causes the image sensor to scan one or more regions of the molecular sample while the imaging spectrometer is aligned with the image sensor and collects hyperspectral image data of the molecular sample from the light emitted that corresponds to the plurality of different component wavelengths. The processing circuitry performs an image processing
(Continued)

pipeline by transforming the hyperspectral image data into data that is representative of a quantification of emitters, absorbers, and/or scatterers present in the one or more regions of the molecular sample.

25 Claims, 41 Drawing Sheets

(51) Int. Cl.
　　　G02B 21/00　　(2006.01)
　　　G02B 21/08　　(2006.01)
　　　G02B 21/16　　(2006.01)
　　　G01J 3/28　　　(2006.01)
　　　G02B 21/24　　(2006.01)
　　　G06K 9/00　　　(2006.01)
　　　G06T 7/50　　　(2017.01)
　　　G06T 1/20　　　(2006.01)
　　　H04N 5/225　　(2006.01)
　　　H04N 5/232　　(2006.01)
　　　G06T 5/00　　　(2006.01)

(52) U.S. Cl.
　　　CPC ....... *G02B 21/0088* (2013.01); *G02B 21/088* (2013.01); *G02B 21/16* (2013.01); *G02B 21/245* (2013.01); *G06K 9/00134* (2013.01); *G06T 1/20* (2013.01); *G06T 7/50* (2017.01); *H04N 5/2256* (2013.01); *H04N 5/23212* (2013.01); *G01J 2003/2826* (2013.01); *G01N 21/6458* (2013.01); *G01N 2021/6419* (2013.01); *G01N 2021/6421* (2013.01); *G06T 5/002* (2013.01); *G06T 5/006* (2013.01); *G06T 2207/10056* (2013.01); *G06T 2207/10064* (2013.01); *G06T 2207/10152* (2013.01)

(56) References Cited

U.S. PATENT DOCUMENTS

| | | |
|---|---|---|
| 2003/0001807 A1 | 1/2003 | Debiez et al. |
| 2004/0160601 A1* | 8/2004 | Womble ............... G01N 21/276 356/301 |
| 2010/0097151 A1 | 4/2010 | Arai |
| 2011/0262124 A1 | 10/2011 | Hashigami et al. |
| 2011/0311142 A1 | 12/2011 | Robles-Kelly et al. |
| 2012/0202192 A1 | 8/2012 | Moshe et al. |
| 2014/0293062 A1 | 10/2014 | Hoye et al. |
| 2015/0075068 A1 | 3/2015 | Stowe et al. |
| 2015/0086117 A1 | 3/2015 | Comstock et al. |
| 2016/0177366 A1* | 6/2016 | Auner ...................... G01J 3/44 435/5 |
| 2017/0030835 A1* | 2/2017 | Chan ..................... G01N 21/65 |

OTHER PUBLICATIONS

EPO. Supplementary Partial European Search Report dated Feb. 17, 2020, for related European Patent Application No. 17816142.8, 12 pages.

Gao, L. and Smith, R.T. (2015), Optical hyperspectral imaging in microscopy and spectroscopy—a review of data acquisition. J. Biophoton, 8: 441-456. doi:10.1002/jbio.201400051.

Everard, C.D., Kim, M.S., Cho, H. et al. Hyperspectral fluorescence imaging using violet LEDs as excitation sources for fecal matter contaminate identification on spinach leaves. Food Measure 10, 56-63 (2016). https://doi.org/10.1007/s11694-015-9276-x.

Lu, Guolan, and Baowei Fei. Medical hyperspectral imaging: a review. Journal of biomedical optics vol. 19,1 (2014): 10901. doi:10.1117/1.JBO.19.1.010901.

EPO. Extended European Search Report dated Jul. 15, 2020, for related European Patent Application No. 17816142.8, 14 pages.

* cited by examiner

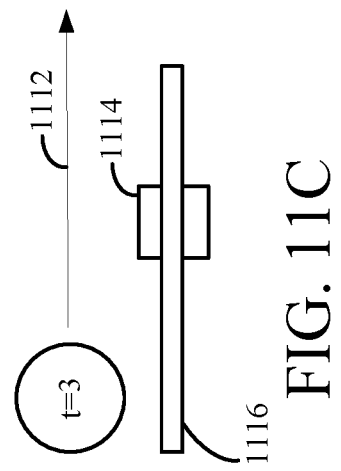
FIG. 11A
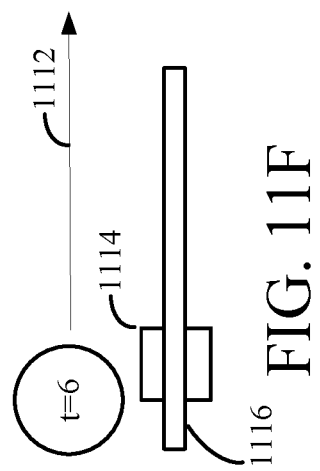
FIG. 11B
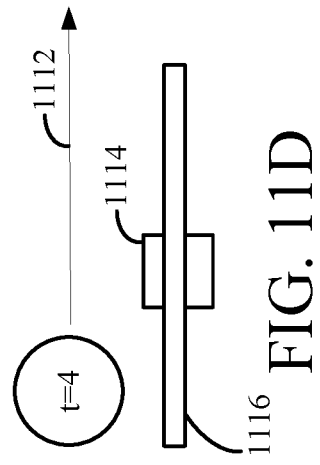
FIG. 11C
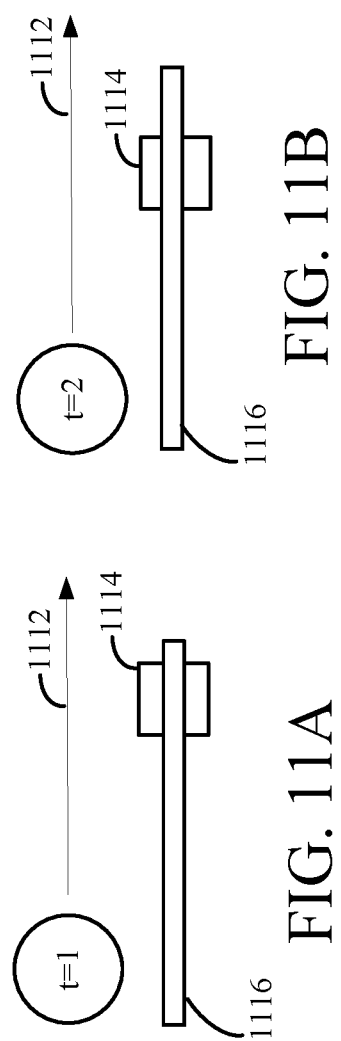
FIG. 11D
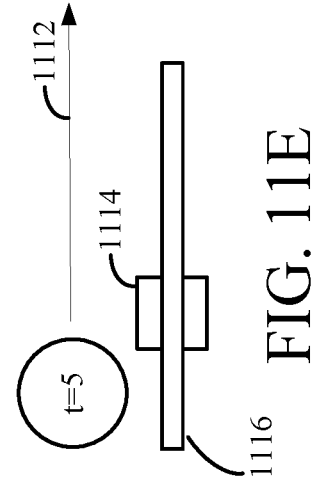
FIG. 11E
FIG. 11F

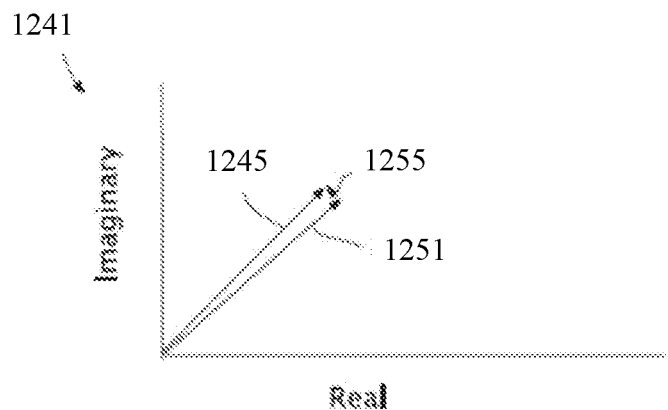
FIG. 12D
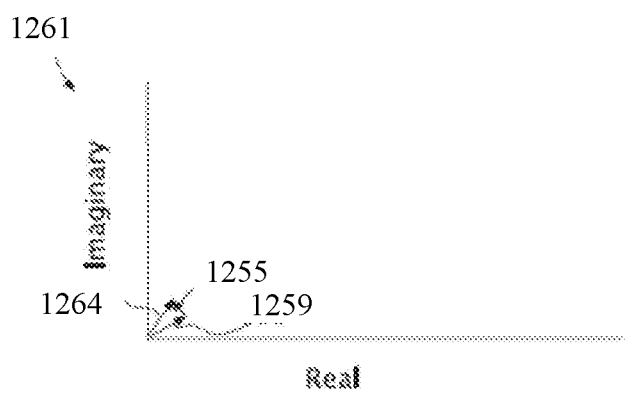
FIG. 12E
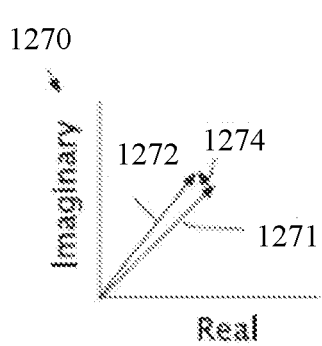 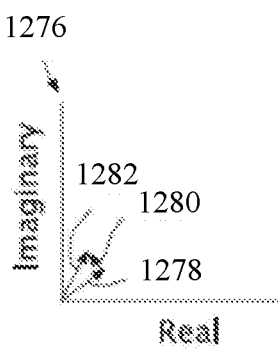 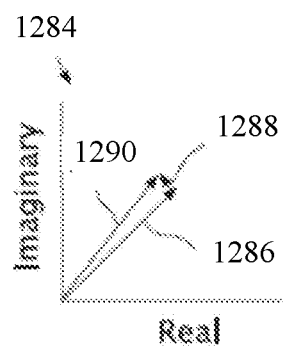
FIG. 12F     FIG. 12G     FIG. 12H

HYPERSPECTRAL IMAGING METHODS AND APPARATUSES

OVERVIEW

In research, such as biomedical research, there is increasing demand for quantitative multiplexed measurement methods. In quantitative multiplexed measurement methods, numerous biologic molecules (e.g., such as, but not limited to, circulating tumor cells (CTCs), labeled tissue sections, and exosomes) can be analyzed at the same time. Analyzing multiple proteins, nucleic acids, or other cellular structures (hereby referred to as "analytes") in tandem, can be useful to understanding information, such as how individual components in complex biological systems interact with one another for drug discovery, diagnostics, basic research, and other applications. Multiplexed measurements can be used in the fields of genomics or proteomics and other emerging areas to analyze different biologic molecules in one or multiple samples. However, such techniques are difficult to carry out in real time due to time constraints and the amount of data to be collected and analyzed. Real time analysis can be beneficial for various applications, such as in the practice of medicine and/or diagnosis.

These and other matters have presented challenges to efficiencies of imaging apparatus implementations, for a variety of applications.

SUMMARY

Aspects of various embodiments are directed to methods and apparatuses for generating hyperspectral images of molecular samples, and more specifically, in certain embodiments, to high-speed hyperspectral imaging apparatus used to collect at least twelve billion data points a minute.

Various example embodiments are directed to issues such as those addressed above and/or others which may become apparent from the following disclosure. Aspects of various embodiments are directed to methods and apparatuses for generating, calibrating, sample focusing, and processing hyperspectral images of molecular samples at high speed. Two example classes of apparatuses include a line scanning apparatus and a staring apparatus. Both classes of apparatuses involve consideration of sufficient illumination, high data acquisition rates, efficient data processing, and calibration.

In certain example embodiments, aspects of the present disclosure involve generating hyperspectral image data representative of a molecular sample and outputting data representative of a quantification of emitters, absorbers, and/or scatterers present in the sample.

In mores specific aspects, a method includes generating a hyperspectral image of a molecular sample from a collected plurality of different component wavelengths. The component wavelengths correspond to a representation of an illuminated region of interest of the molecular sample. Example molecular samples can include multiple biologic molecules, such as, but not limited to, circulating tumor cells (CTCs), labeled tissue sections, proteins, and exosomes. The different component wavelengths collected are indicative of spectral intensities of light emitted from the molecular sample, and as excited by a light source. For example, a microscope is used to collect and transfer the component wavelengths by illuminating the molecular sample using a light source. Responsive to the hyperspectral image, data representative of a quantification of labels in the molecular sample can be generated and output.

To image large numbers of labels in a manner that mitigates crosstalk and maximizes the dynamic range, a hyperspectral imaging apparatus is used, which has finer spectral resolution than conventional or multispectral imaging. Imaging biological molecules may be performed either directly based on absorption (e.g., absorption by oxyhemoglobin, deoxyhemoglobin, or melanin), with endogenous fluorescence (inherent to the sample, e.g., NADH or flavins) or indirectly by use of a label that indicates the presence of the molecule as by fluorescence (fluorescent dyes, quantum dot, phosphors, or other nanoparticles), chemiluminescence, scattering (metal or other nanoparticle), or absorption (dyes). For ease of reference, these various fluorophores, chromophores, or scatterers (e.g., emitters, absorbers, and/or scatterers) can be referred to as labels, even though the label may be the molecule of interest itself. To generate quantitative, multiplexed images of the labels in a high-throughput manner, the imaging apparatus, data acquisition, and data processing operate at a threshold speed. In various specific aspects, the hyperspectral imaging system can process twelve billion or more data points per minute, although embodiments are not so limited.

Hyperspectral imaging refers to or includes collecting and processing information across an electromagnetic spectrum. Specifically, in hyperspectral imaging, a spectrum for each pixel in the image can be obtained. The spectrum is divided into a number of intervals or wavelength bands in the visible spectrum, which are indicative of spectral pixels. The range of the spectrum can be adjusted for particular applications. For example, if fluorophores, that are known to be present in a molecular sample, emit light between 500-700 nm, the collected component wavelengths can be between 500-700 nm, which can reduce the region of interest, as discussed further herein.

In order to output the data indicative of quantification of labels (e.g., emitters, absorbers, and/or scatters present) in the molecular sample, the component wavelengths can be decomposed from measured spectral intensities to provide the quantifications of individual labels. The imaging apparatus can collect the component wavelengths by separating (e.g., dispersing or interfering) light emitted from the molecular sample into the different component wavelengths, such as via an imaging spectrometer. In some instances, the imaging spectrometer separates the light by dispersion, as with a prism or grating, and in some cases by interference, as for Fourier transform spectral imaging. The separated lighted is collected and transferred across numerous (e.g., 60) intervals in the visible spectrum. As a specific example, an imaging spectrometer may separate light in the range of 400-800 nm onto 60 spectral pixels, which results in 60 component wavelengths. In such an example, a first spectral intensity that is associated with a first component wavelength is between 400-406.67 nm. One or more emitters, absorbers, and/or scatterers in the molecular sample may span multiple spectral pixels. For instance, a particular fluorophore may emit wavelengths of light from 375-600 nm. The spectral pixels can be reduced into intensities for each label by performing spectral decomposition of the spectral intensities (e.g., the hyperspectral data) into partial label quantifications and decomposition of the partial label quantifications into the label quantification.

To perform imaging at high speeds involves various interrelated factors. For example, appropriate illumination power and illumination throughput efficiency, as well as efficient capture of photons from multiple labels is beneficial because image integration or exposure times are shorter. Data processing speeds and efficiency are also beneficial because of the large data bandwidths and to avoid bottlenecks and minimize latency. Image correction methods are used to minimize or mitigate degradations of image quality due to illumination non-uniformity or to compensate for image distortions from hyperspectral imaging systems. Data compression is important to assist data processing and minimize file storage requirements. Strategies for autofocusing are important to maximize time imaging and minimize overhead time for scanning systems.

The hyperspectral imaging apparatuses as described herein can be used to extract a large amount of information from an observed molecular sample. Specific method embodiments allow for the use of five or more labels, such as fluorophores, while allowing for sensitivity and specificity above a threshold and with reduced crosstalk. The ability to perform the selection and analysis with the same apparatus can reduce or minimize the risk of cross-contamination of the samples due to handling and transport. As a specific example, with respect to detecting multiple fluorophores, the apparatus described herein can detect four or a larger number of fluorophores, limited more by the availability of the fluorophores with narrow emission spectra. The detection and real-time analysis can be carried out at video rates. Applications of the method include microscopy, high-throughput in-vitro assays, and in-vivo imaging. For microscopy, this method can allow rapid-imaging cytometry or rapid identification of rare cell types. For in-vitro diagnostics, it can allow accurate use of more labels in large-format assays such as gene or protein arrays, microfluidic droplet arrays, or large-format multiwall plates. For in-vivo imaging, it can allow real-time monitoring of multiple-label concentrations.

A number of related and specific aspects of the present disclosure are directed to an imaging apparatus used to provide hyperspectral image data by performing parallel processing. The imaging apparatus includes a light source, an imaging spectrometer, an image sensor, control circuitry, and processing circuitry that performs a processing pipeline. The light source generates optical power for delivery at a molecular sample, and in response to the light source generating the optical power, the imaging spectrometer separates light emitted from one or more regions of the molecular sample illuminated by the optical power into a plurality of different component wavelengths. In specific aspects, the light source can generate sufficient power for delivering at least 100 milliwatts (mW) of optical power at the molecular sample. The image sensor, including circuitry, collects the light emitted along an optical pathway corresponding to the plurality of different component wavelengths. In various aspects, the image sensor provides data indicative of the plurality of different component wavelengths along a data carrying path to control circuitry and processing circuitry at a rate of at least 100,000,000 wavelength-pixel measurements per second for a period of at least ten seconds. The control circuitry is arranged with the image sensor to scan the molecular sample by causing the image sensor to scan the one or more regions of the molecular sample while the imaging spectrometer is aligned with the image sensor and/or the source of emitted light (e.g., the illumination line), and collecting hyperspectral image data between a range of 200-1000 nm of the molecular sample from the light emitted that corresponds to the plurality of different component wavelengths. The processing circuitry (e.g., processing circuits that process data in parallel) performs an image processing pipeline by transforming the hyperspectral image data into data that is representative of a quantification of emitters, absorbers, and/or scatterers present in the one or more regions of the molecular sample. And, in certain embodiments, thereby improving or optimizing an otherwise obtainable or achievable data acquisition rate and/or data processing rate of images of the molecular sample. In specific aspects, processing circuitry can perform the image processing pipeline at the rate of least 100,000,000 wavelength-pixel measurements per second. The above-described apparatus can be used to perform line-scanning and/or staring scanning, in various aspects.

The processing circuitry can additionally transform the hyperspectral image data by revising the hyperspectral image data to account for noise and/or distortions present in the hyperspectral image data. The distortions and/or noise can include keystone phenomenon, smile phenomenon, pixel misregistrations, non-uniform illumination, phase correction and a combination thereof. In some embodiments, the control circuitry generates first calibration data indicative of emitters, absorbers, and/or scatterers present in the molecular sample and second calibration data indicative of distortions present in the imaging apparatus, and the processing circuitry performs the image processing pipeline using the first and the second calibration data. Other specific aspects can include performing the image processing pipeline by using a first technique including an ordinary least squares method, and, in response to sampled data points producing negative label quantities or exhibiting residual error outside a threshold error as determined using the first technique, using a second technique. And, in specific aspects, the decomposition of the spectra intensities can include adjusting for optical power of the light source based on a non-uniform intensity pattern of the light source, as further described herein.

Other specific embodiments are directed to an imaging apparatus that includes a multi-mode laser diode as the light source, an imaging spectrometer, an image sensor, and control circuitry. The multi-mode laser diode generates optical power for delivery at a molecular sample. The multi-mode diode can generate sufficient power for delivering at least 100 milliwatts (mW) of optical power at the molecular sample, for example, In response to the multi-mode laser diode generating the optical power, the imaging spectrometer separates light emitted from the molecular sample illuminated by the optical power into a plurality of different component wavelengths. The image sensor, including circuitry, collects the light emitted along an optical pathway corresponding to the plurality of different component wavelengths. And, the control circuitry is arranged with the image sensor to scan the molecular sample by causing the image sensor to scan the molecular sample while maintaining alignment of the imaging spectrometer with the image sensor and/or the source of emitted light, and collecting hyperspectral image data of the molecular sample from the collected light emitted corresponding to the plurality of different component wavelengths. And, in certain embodiments, thereby improving or optimizing an otherwise obtainable or achievable data acquisition rate of images of the molecular sample. In specific aspects, the control circuitry causing the image sensor to scan the molecular sample while maintaining alignment of fast and slow axes of the multi-mode laser diode to filter the optical power to an illumination line and reduce out-of-focus light.

In various related aspects, the imaging apparatus further includes an optical slit. The optical slit can filter the light emitted, reflected, transmitted, or scattered to a line at one or more different regions imaged. For example, imaging spectrometer can include an optical slit aligned with fast and slow axes of the multi-mode laser diode, the optical slit filtering the emitted light and reduce out-of-focus light. The optical slit can optionally be adjusted. As an example, the control can control a width of the optical slit based an image mode of the imaging apparatus and an exposure time. Further, the imaging spectrometer, in some aspects, includes a plurality of slits. The plurality of slits are arranged along the optical pathway to filter the light emitted, reflected, transmitted or scattered to a line at one or more different regions imaged.

The imaging apparatus can include various optional components, such an optical system and processing circuitry, as described above. For example, the optical system includes at least one optical element, which focuses the delivered optical power from the multi-mode laser diode into an illumination line and delivers the illumination line at the molecular sample. The processing circuitry can generate data representative of a quantification of emitters, absorbers, and/or scatterers present in the molecular sample.

Various aspects are directed to an imaging apparatus used to filter the light emitted by the light source to an illumination line at different portions of the molecular sample. For example, the apparatus includes a light source arrangement, an imaging spectrometer, an image sensor, and control circuitry. The light source arrangement has at least one light source to generate optical power for delivering a plurality of illumination lines at a molecular sample. In response to the at least one light source generating the optical power, the imaging spectrometer separates light emitted from the molecular sample illuminated by the plurality of illumination lines into a plurality of different component wavelengths. The imaging spectrometer can further filter the light emitted to an illumination line at different portions of the molecular sample. In various aspects, the imaging spectrometer includes an optical slit to filter the light emitted, reflected, transmitted or scattered. In other related aspects, the light source arrangement includes a plurality of light sources, and at least two of the plurality of light sources have non-overlapping sets of wavelengths. The image sensor, which includes circuitry, collects the light emitted along an optical pathway from the molecular sample that corresponds to the plurality of different component wavelengths. And, the control circuitry is arranged with the image sensor to scan the molecular sample by causing the image sensor to scan the molecular sample while the imaging spectrometer is aligned with the image sensor and/or the source of emitted light, and collecting hyperspectral image data of the molecular sample from the light emitted that corresponds to the plurality of different component wavelengths. And, in certain embodiments, thereby improving or optimizing an otherwise obtainable or achievable data acquisition rate of images of the molecular sample.

In some specific aspects, the imaging spectrometer includes a plurality of optical slits used to filter the light emitted, reflected, transmitted or scattered to a line at one or more different regions imaged. For example, the light source arrangement can include a set of light sources per optical slit of the plurality and/or two light sources per optical slit of the plurality. In other aspects, the imaging apparatus includes a plurality of image sensors, with each image sensor being configured and arranged with one of the plurality of optical slits and/or with a set of the plurality of optical slits. In other aspects, the light source arrangement includes a plurality of light sources, and at least two of the plurality of light sources have non-overlapping sets of wavelengths.

Various embodiments are directed to an imaging apparatus that includes a light source, an imaging spectrometer, an image sensor, and control circuitry used for performing high-throughput hyperspectral imaging. The light source can generate sufficient power for delivering at least 100 milliwatts (mW) of optical power at a molecular sample for fluorescence imaging. The light emitted from the light source can travel down an excitation light pathway and illuminate at least a region of a molecular sample. In response to the light source generating the at least 100 mW of optical power, light emitted from the molecular sample can travel along an optical emission pathway. The imaging spectrometer can separate light emitted from the region of the molecular sample illuminated by the optical power into a plurality of different component wavelengths. The image sensor, which includes circuitry, can collect the light emitted along the optical pathway from the region of the molecular sample corresponding to plurality of different component wavelengths. The control circuitry is arranged with the image sensor to scan the molecular sample. The control circuitry can be used to scan the region of the sample while performing autofocusing on the same or another region. In some aspects, the control circuitry scans the molecular sample by repeatedly carrying out the acts of: causing the image sensor to scan the region of the molecular sample while the imaging spectrometer is aligned with the image sensor and/or the source of the light emitted from the region and while, on-the-fly and during the scan, determining a depth position for the region or another region of the biological region to be scanned after the region (autofocus), and causing the molecular sample to move to the depth position to alter an effective length of the optical pathway and therein improving a quality of a focal plane for the region or the other region of the molecular sample. The control circuitry can repeat the acts for subsequent regions of the molecular sample.

In some aspects, the control circuitry scans the molecular sample by causing the image sensor to scan the region of a plurality of regions of the molecular sample while concurrently determining an optimal focal plane for the region and/or another region of the plurality of regions, and causing the molecular sample to move to the depth position, such as after scanning the region or a portion of. In related aspects, the imaging apparatus further includes optical system, including at least one optical element, which expands a light profile as emitted by the light source along its width to generate an illumination line. The optical system can include an optical objective that transmits transmit the light emitted from the molecular sample, which can optionally include the illumination line, to the imaging spectrometer. The imaging spectrometer can include an optical slit that filters the light emitted reflected, transmitted, or scattered from the light source to a line at one or more different regions imaged.

In related aspects, the autofocusing can be performed using another image sensor having a tilt and autofocusing control circuitry. For example, the image sensor at a tilt can collect a plurality of lines, each of the plurality of lines being a different z-distance away from an image plane of the imaging apparatus. The control circuitry can determine an optimal focal plane for the region or the other region of the molecular sample by using the plurality of lines. The tilt can cause a plurality of different image distance, and thereby causing the image sensor to be the different z-distances from the image plane.

In other alternative and related aspects, a substrate holding the molecular sample has a reflective coating on a surface opposite to the emission path of the light source, which is used to determine the optimal focal plane. The reflective coating can reflective outside of an imaging spectral region and transparent inside of the imaging spectral region. In related aspects, the imaging apparatus further includes another light source that generate optical power outside of the imaging spectral region for delivering at the substrate.

In specific aspects, the image sensor can collect the plurality of different component wavelengths as separated by the imaging spectrometer at the region of the molecular sample for each component wavelength at a frame rate and with an amount of light sufficient to identify between at least four labels in the molecular sample. The imaging apparatus can further include processing circuitry. The processing circuitry can processing the hyperspectral image data in parallel including collecting the hyperspectral image data of the molecular sample from the collected light emitted that corresponds to the plurality of different component wavelengths and transforming the hyperspectral image data into data that is representative of a quantification of emitters, absorbers, and/or scatterers present in the molecular sample.

In a number of aspects, the imaging apparatus further includes autofocusing control circuitry, a cylindrical lens or mirror, and an additional image sensor. Light emitted from the molecular sample can be split and passed to both the autofocusing control circuitry and the spectrometer along two different optical pathways. The cylindrical lens or mirror is used to expand a width of the emitted light and pass the emitted light to the additional image sensor. The additional image sensor is at a tilt, mechanically or optically, such that the optical pathway to the image sensor varies. For example, each row on the additional image sensor can image the emitted light on a different z-plane. The additional image sensor collects a plurality of lines at the image sensor that represent a line in the molecular sample with each of the plurality of lines at the additional image sensor being a different z-distance from an image plane. The z-plane that maximizes a focus metric can be identified and fed back to the stage to adjust the z position of the molecular sample. In other embodiments, the autofocusing is performed using a reflective film located on a substrate holding the molecular sample. Additionally and/or alternatively, the control circuitry can perform on-the-fly illumination control by maintaining a measured peak signal from the image sensor in a threshold saturation range.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 11A-11F illustrate an example process for calibrating hyperspectral data based on non-uniform illumination patters of a light source, in accordance with embodiments of the present disclosure;

FIGS. 12D-12H illustrate an example method to remove or reduce the impact of noise, in accordance with embodiments of the present disclosure.

Figure 1A:
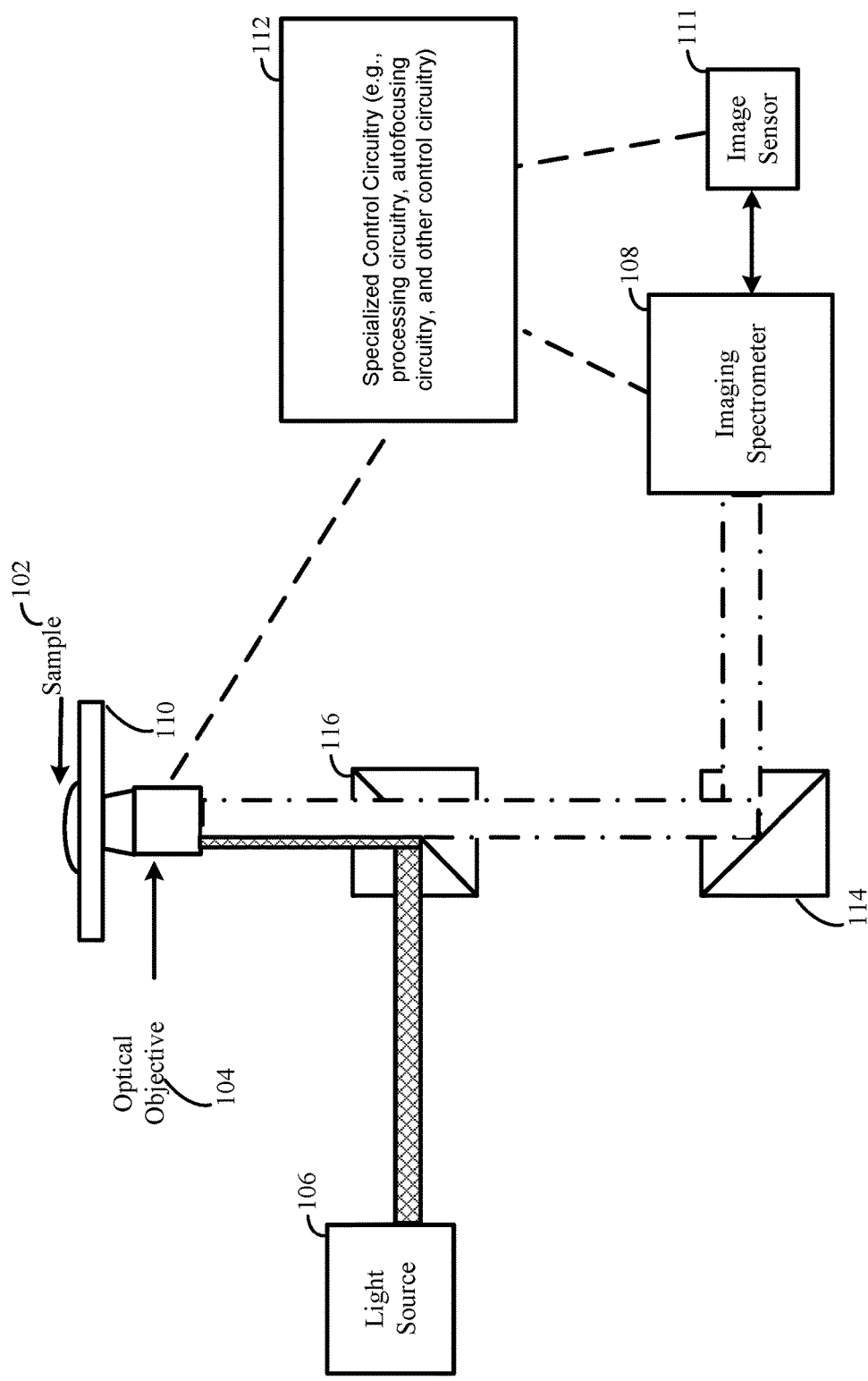
FIGS. 1A-1E show examples of an apparatus for generating a hyperspectral image, in accordance with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving generation of hyperspectral images of a molecular sample. In certain implementations, aspects of the present disclosure have been shown to be beneficial when used in the context of using a plurality of light sources, concurrently or sequentially, to illuminate the molecular sample and to generate the hyperspectral image. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to hyperspectral imaging and apparatuses thereof. Hyperspectral imaging refers to or includes collecting and processing information across a portion of the electromagnetic spectrum at a relatively large number of wavelengths (tens or hundreds of wavelengths) for each point in a sample. As previously described, there are an ever growing number of potential uses for analyzing multiple proteins, nucleic acids, or other cellular structures (e.g., analytes) in tandem. Hyperspectral imaging in accordance with the present disclosure can be used to simultaneously image greater than four analytes in a molecular sample. To generate a hyperspectral image of a molecular sample, the total number of data points acquired is significantly larger than for conventional imaging, which acquires a few wavelengths for each point in the sample. For instance, imaging a standard tissue slide (15 mm×15 mm) results in 126 billion data points to generate a hyperspectral image of the sample using a 20× microscope objective and 96 wavelengths per sample point. Further, the plurality of analytes can be analyzed using fluorophores or other labels, which may have spectral overlap. Due to the spectral overlap, in order distinguish if an observed signal came from the desired fluorophore, or a fluorophore whose emission spectra overlapped with the desired fluorophore, spectral imaging techniques can be used. Spectral imaging techniques can include acquiring many wavelength measurements for each spatial point in a molecular sample and using those data points to mitigate spectral overlap in a process called spectral unmixing or spectral decomposition. In this process, the wavelength measurements (e.g., the spectral data) is transformed into label quantifications. In order to make hyperspectral imaging practical for applications, such as those in biomedical research and medicine, it becomes imperative to increase the data acquisition rate of the hyperspectral imaging apparatus.

Imaging apparatuses in accordance with the present disclosure can perform high-throughput, highly-multiplexed, and high-resolution imaging of a molecular sample. Various embodiments are directed to a hyperspectral imaging system that is capable of acquiring 12 billion data points per minute or more, which can image a total sample in ten minutes. An example hyperspectral imaging apparatus is capable of acquiring spectral data at a rate of 240 million spectral data points per second, or 14 billion data points per minute. Furthermore, it is possible to extend the imaging apparatus to acquire up to 960 million spectral data points per second and acquire even higher multiplexing and/or sample imaging speeds.

To achieve the resolution, speed, and multiplexing capabilities, imaging apparatuses in accordance with the present disclosure can include various features and/or perform various processes. For example, the light emitted from a light source (usually 500 mW of output power) of the apparatus can be parallelized across the sample by focusing the light emitted into a line, such that each point in the sample is illuminated with sufficient light for imaging while improving the overall light throughput of the system by a factor of 12-50×. The apparatus can concurrently collect light across a plurality of wavelength ranges and with transmission efficiency, so as to maximize the signal collected by the image sensor(s), and to minimize the time that the imaging apparatus is not actively acquiring data when imaging large samples. Additionally, autofocusing can be performed in tandem with imaging, as to minimize the time in which the instrument is not imaging the sample. Furthermore, the raw hyperspectral data acquired by the image sensor can processed in parallel to transform the data into label quantification data, and which improves the data acquisition and process rates, thus, for example, in one embodiment, transforming the data at speeds of 240 to 960 million data points per second, although embodiments are not so limited and can include a variety of speeds.

Given a fixed number of wavelengths to acquire per point in a sample, a number of factors can be considered when increasing the data acquisition rate. Such factors include the power density of light that illuminates the sample, the transmission, collection, and reflection efficiency of the optics in the imaging apparatus, and/or the frame rate of the image sensor that is collecting light from the sample. It is also relevant to increase the percentage of the total scan time in which the image sensor is actively imaging, as opposed to autofocusing or moving to the next region to be imaged. In various embodiments, an image post-processing pipeline is capable of processing incoming data at the acquisition rate that is determined by the above factors.

Speed of the imaging apparatus can be dependent on the output power of the light source, the frame rate of the image sensor, and the transfer or storage rate of the processing circuitry. In specific embodiments, the apparatus is a high-speed and high powered hyperspectral microscope that can illuminate a molecular sample at a power of 200 mW-6 W, can capture image data at a frame rate of between 100 frames per second (FPS) to 4,000 FPS, and can transfer and/or store the image data at a rate of between 250 MB/s to 1 GB/s. For example, a high power light source, as further described herein, can be used which provides sufficient light to achieve the above scanning speeds. An optical system can shape a light profile as emitted via the at least one light source along its width to generate an illumination line.

Various embodiments are directed to an imaging apparatus. The imaging apparatus includes a light source, an imaging spectrometer, an image sensor, and control circuitry. The light source can generate sufficient power for delivering at least 100 milliwatts (mW) of optical power at a molecular sample. Light emitted from the molecular sample can travel along an optical pathway from the sample to the imaging spectrometer and then to the image sensor. The imaging spectrometer separates the light emitted from the region of the molecular sample illuminated by the optical power into a plurality of different component wavelengths. The image sensor can collect the light emitted along the optical pathway from the region of the molecular sample corresponding to plurality of different component wavelengths. The control circuitry is used to scan the region of the sample while performing autofocusing on the same or another region. In specific instances, the control circuitry scans the molecular sample by causing the image sensor to scan the region of the molecular sample while the imaging spectrometer is aligned with the image sensor and/or a source of the emitted light, and while, on-the-fly and during the scan, determining a depth position for another region of the biological region to be scanned after the region and a second step of causing the molecular sample to move to the depth position to alter an effective length of the optical pathway, and therein improving a quality of a focal plane for the region and/or other region of the molecular sample. The control circuitry can repeat the above-described acts for subsequent regions of the molecular sample. The position of the next imaging plane may be determined by extrapolation using recent data points acquired on the current image region (e.g., imaging strip) and/or previously image regions (e.g., neighboring strips) that have already been imaged. A strip refers to or includes a single pass over the sample perpendicular to the illumination line. The strip can differ from a row in a typical raster scan because multiple pixels are acquired along the illumination line during a scan.

In various embodiments, the hyperspectral imaging system can be used for fluorescence imaging. More specifically, the system can include a hyperspectral line scanning imaging apparatus or, alternatively, a staring apparatus. For example, the hyperspectral line scanning imaging apparatus can include one or more light sources and a series of optics to focus the light from the one or more light sources into a line that illuminates a molecular sample with one or more fluorescent labels. The illumination from the illumination line causes these fluorescent labels to emit fluorescence, which is collected by an imaging lens (e.g. a microscope objective), and transmitted to an imaging spectrometer. The imaging spectrometer then separates the illumination line into its component wavelengths and onto an image sensor.

In specific embodiments, the power density of the light that illuminates the sample is sufficiently large such that the fluorescence signal collected by the image sensor, in a given exposure time, is above the noise threshold but below the saturation limit of the image sensor. The amount of power density can include at least 100 mW of optical power. In some specific embodiments, the power output by one or more light sources can be between 100 mW and 6 W. If the power density of that illumination line is increased, the same image is acquired in a shorter exposure time, which increases the number of sample points that the apparatus can scan per second. Furthermore, the light can be matched to the width being imaged by the image spectrometer to mitigate unused light. If the light illuminates a broader region than that collected by the imaging spectrometer, then (1) less light is available for imaging and (2) the sample not being imaged is subject to photobleaching without the benefit of providing light for imaging.

To illustrate the use of a high power light source, an example point scanning (confocal) microscope that images each point on the sample with a laser whose output power is on the order of 20 mW, images at a scan rate of 10 million sample points per second, and has 4 photodetectors for detection. Each sample point is illuminated by 2 nJ of energy, and the emitted fluorescence signal is split amongst the 4 photodetectors. By comparison, a hyperspectral line scanning apparatus in accordance with various embodiments has a scan rate of 2 million sample points per second, and the fluorescence signal is split amongst 96 spectral data points per sample point. In order to achieve sufficient signal to noise ratio for each of these spectral data points, the output power of the light source is at least larger by a factor of 5, or 100 mW in this example. It can be beneficial to have a light source with a maximum output power that is greater than 100 mW, given that the concentration of various labels in a sample may be low. In various embodiments, it may be beneficial to reduce motion blur by pulsing the light source with a duty cycle of 0.5 or lower, or to increase sample imaging speed by using a reduced region of interest on the image sensor (as further described herein).

The imaging apparatus can be used for pushbroom and/or staring imaging of a molecular sample. The imaging apparatus includes an optical objective and control circuitry configured to scan a molecular sample using a light source arrangement having at least one light source. The light source arrangement can include light emitting diodes (LEDs), lasers, and lamps, such as single mode and/or multi-mode laser diodes, and various combinations of the same. The light source arrangement emits one or more light beams and two or more of the light beams can be emitted at different light intensities. As further described herein, the plurality of light sources can each emit at least one light beam at non-uniform intensities. Each light source can be relatively high-powered, for example, emitting between 200 mW and 6 W of (laser) optical power.

In specific embodiments, the apparatus includes a stage. The stage holds the molecular sample for scanning. The stage, an optical objective, and/or other equipment can be moved to control a position of the molecular sample relative to the optical objective. In specific embodiments, the stage is constantly moved to scan the entire molecular sample and to avoid dead time that is associated with accelerating and decelerating the stage. Constantly moving the stage can minimize the time taken to scan the sample. For example, the imaging apparatus can be used to image a 9-well microtiter plate in 2.2 minutes, image a 384-well plate in 8.8 minutes, and/or image a 15 mm×15 mm region of a microscope slide in 3.2 minutes. Depending on the type of molecular sample (e.g., slide, microarray, tissue array), different particular scan patterns can be used, as further described herein. Alternatively, the light beam can be moved instead of and/or in addition to the stage.

Light from the light source (or a plurality of light sources) illuminates the molecular sample and light emitted from the molecular sample is collected. The light emitted is responsive to or indicative of excitement of a label (e.g., fluorophore) by the light sources. As previously described, the label can include an object present in the sample that emits (e.g., an emitter), absorbs (e.g., an absorber), and/or scatters (e.g., a scatterer) light. The label can emit, absorb, or scatter light responsive to excitement by the light source arrangement or excitation by another source which may be present in the molecular sample or added to the molecular sample (e.g., chemical reaction, biochemical reaction, electrochemical reaction). Various embodiments, for example, are directed to photoluminescence applications (e.g., fluorescence, phosphorescence, or Raman emission), chemiluminescence applications and other luminescence applications.

The imaging apparatus has an emitted-light optical pathway from the molecular sample to an image sensor. The pathway can include a variety of different components to direct the emitted light from the sample to the image sensor, such as an imaging spectrometer, beamsplitters, and/or mirrors. The imaging spectrometer separates light emitted from the molecular sample into a plurality of different component wavelengths. The component wavelengths include and/or refer to different wavelength ranges and can be representative of spectral intensities of labels (e.g., fluorophores). In specific embodiments, the imaging spectrometer includes a prism and one or more lenses (e.g., a lens-prism-lens system). In other embodiments, the imaging spectrometer includes a diffraction grating and/or other components that may be appreciated by one of skill in the art. In other embodiments the imaging spectrometer includes an interferometer or other means of separating light as for Fourier transform spectral imaging.

The imaging spectrometer can optionally include an optical slit. The optical slit filters the light emitted, reflected, transmitted or scattered from the molecular sample into one or more lines at one or more regions imaged (e.g., regions of the sample as imaged and/or regions of light) and reduces out-of-focus light. The light emitted from the illumination line is then provided to other components of the imaging spectrometer (e.g., the prism) to separate the light emitted in response to the illumination line into component wavelengths.

The optical slit can filter the light in a variety of ways. In some embodiments, the optical slit can filter the light emitted, reflected, transmitted or scattered in conjunction with the optical system (e.g., the imaging optics). For example, the optical slit can spatially filter the light, preferentially collecting light from a preferred line at the molecular sample (e.g., reduces light from neighboring regions transverse and longitudinally, i.e., out-of-focus light). In other embodiments, the optical slit can filter the light emitted, reflected, transmitted or scattered from the light source in conjunction with the imaging spectrometer. For example, the optical slit can filter the light into different wavelength positions on the image sensor. In various embodiments, the imaging apparatus includes one optical slit and in other embodiments, includes a plurality of optical slits. The optical slit or each of the plurality of optical slits can filter the light to one region imaged or a plurality of different regions imaged.

The optical slit can be an adjustable optical slit. For example, the width of the optical slit can be controlled by control circuitry of the imaging apparatus (and/or manually). The width of the optical slit can be adjusted based on dimensions of a region of interest in the molecular sample, an image mode, and an exposure time being used. The width of the slit is controlled to provide an amount of light that is sufficient to recognize target objects in the molecular sample include the spatial or spectral resolution. The control circuitry can include or have access to a look up table that includes different regions of interest, signal to noise values to recognize targets, image mode, and exposure times, and can be used to determine or output the width of the slit to use. Further, the optical slit can include a plurality of optical slits, as further described herein.

The imaging apparatus further includes an image sensor. Example image sensors include a complementary metal-oxide-semiconductor (CMOS) area image sensor, a line sensor that is several pixels wide, a charge-coupled device (CCD)-based sensor, among other example image sensors. The image sensor collects the plurality of different component wavelengths in a region of interest. In some specific examples, the region of interest can include different regions formed of distinct lines. For example, each distinct line represents the same line in the molecular sample but at a different wavelength (e.g., first line being 400-405 nm, second line being 405-410 nm, etc.). In a specific example, a region of interest can include 2048×60 pixels, which corresponds to the spatial and spectral direction respectively. Instead of imaging using the whole sensor (and throwing away extra data), the region of interest can be reduced from full resolution to gain an order, or more, of improved speed. By using a region of interest that is reduced (e.g., from 2048×1536 full resolution to 2048×60 pixels), the imaging apparatus can be used to image at speeds of 1,500 frames per second or more, in specific embodiments. Imaging at such speeds is benefited by the relatively high powered light sources (e.g., the multi-mode laser diodes and/or other light sources emitting at 200 mW-6 W of power) to provide sufficient light.

The collected component wavelengths are provided to (e.g., transferred) processing circuitry. The processing circuitry can be part of or separate from the control circuitry and/or the imaging apparatus. In some embodiments, the processing circuitry includes circuitry that is part of the control circuitry and other circuitry (which may be part of another device) that is external to the control circuitry and is in communication with the control circuitry. The processing circuitry can be used to perform various processing, in parallel with the control circuitry, on the image data collected and to generate data representative of a quantification of emitters, absorbers, and/or scatterers present in the molecular sample. The processing circuitry can generate a hyperspectral image of the molecular sample from the collected plurality of different component wavelengths, such as by stitching together collected component wavelengths (e.g., the different distinct lines) which overlap the region of interest.

Increasing the power of the light source can be used to improve the data acquisition rate. There are a few possible methods that one can use to achieve this, such as using high-power diode pumped solid-state lasers, high-power light-emitting diodes (LEDs), and superluminescent diodes. In some specific embodiments, multi-mode laser diodes can be used as the light source, and for biological imaging. Coupled with appropriate beam shaping optics to focus that light into a narrow line, the imaging apparatus is able to perform line-by-line imaging of a wide variety of fluorescent samples with exposure times on the order of 1 ms or less.

Various embodiments are directed to an imaging apparatus which includes a multi-mode laser diode as the light source, an imaging spectrometer, an image sensor, and control circuitry. The multi-mode laser diode generates optical power for delivery at a molecular sample. In response to the multi-mode laser diode generating the optical power, an imaging spectrometer separates light emitted from the molecular sample illuminated by the optical power into a plurality of different component wavelengths. The image sensor collects the light emitted along an optical pathway corresponding to the plurality of different component wavelengths. The control circuitry is arranged with the image sensor to scan the molecular sample by causing the image sensor to scan the molecular sample while maintaining alignment of the imaging spectrometer with the image sensor and/or the source of emitted light (e.g., illumination line), and collecting hyperspectral image data of the molecular sample from the collected light emitted corresponding to the plurality of different component wavelengths.

For line imaging, the illumination that falls outside the region imaged onto the optical slit of the imaging spectrometer is not used or is wasted, leading to two issues: (1) lower efficiency due to wasted illumination and (2) excess sample degradation as the wasted light is leading to photobleaching without the benefit of providing a useful signal. In various embodiments, the light source provides near-diffraction-limited illumination to avoid these two problems associated with wasted light. In some embodiments, diode lasers are used as the light sources as they can be efficient, low cost, and compact. In more specific embodiments, multi-mode diode lasers can be used, which provide higher powers (on the order of 1 W), but the multi-mode property of these diodes prevents focusing the beam into a diffraction-limited spot. By contrast, single-mode diode lasers provide power that is generally below 100 mW. There is then a trade-off between power and diffraction-limited performance for diode lasers, and the high power multi-mode lasers may not be used when diffraction-limited performance is required. The multi-mode laser has poor performance in only one direction, which is called the slow axis. In the slow axis, the multi-mode laser behaves as though it is emitting several laser beams. Consequently, multi-mode laser diodes can suffer from poor beam quality in the slow axis and cannot be focused into a diffraction-limited point.

The hyperspectral line scanning apparatus uses a good focus in one direction, perpendicular to the illumination line. The multi-mode laser can be used to provide near-diffraction-limited performance in the fast axis. In specific embodiments, the laser is then oriented with the fast axis perpendicular to the illumination line to achieve the best performance and least wasted light. Examples of commercially available lasers that can be used include: Ushio HL40033G R3 (1000 mW power, 405 nm wavelength), and Ushio HL63193MG (700 mW power, 638 nm wavelength). These all provide high power (700 mW to 1,000 mW). However, as multi-mode lasers, the manufacturer's specification sheets do not specify whether the beams are diffraction limited in the fast direction. In various embodiments, four lasers are tested and found that the beam quality is near diffraction limited in the fast direction. This makes these lasers suited for use in the high speed scanning hyperspectral imaging system. The near-diffraction limited fast axis is focused to produce the narrow line. Although the slow axis does not focus well, this may not impact the results because the length of the line spans the entire optical slit. In fact, cylindrical lenses are typically used to further broaden the beam in the slow direction. The high power of multi-mode laser diodes can be leveraged by focusing the fast axis, which is nearly diffraction-limited, and corresponds to the thickness of the illumination line. The slow axis is then expanded, which corresponds to the length of the illumination line. In this manner, useful light is maximized and wasted light is minimized.

As fluorophores (or other types of labels) are excited using light sources that have non-uniform intensity patterns, the resulting hyperspectral image reflects the variations in illumination (e.g., is generated using the variation in illumination). In various embodiments, processing circuitry outputs data representative of a quantification of labels in a molecular sample by calibrating illumination of the hyperspectral image using non-uniform intensity patterns attributable to the plurality of light sources (e.g., correcting the non-uniform light intensities using the non-uniform intensity patterns). Data representative of quantification of labels in the molecular sample can be generated and output by performance of decomposition of measured spectra intensities of the plurality of different component wavelengths into partial label quantifications (e.g., relative concentrations). The partial label quantifications are used to calibrate the illumination and generate the data representative of the label quantifications. For example, the processing circuitry can perform decomposition of label intensities corresponding to spectra intensities of the plurality of different component wavelengths in the hyperspectral image into the label quantifications by adjusting for power of the plurality of light sources based on the non-uniform intensity pattern.

A number of related and specific embodiments are directed to an imaging apparatus used to provide hyperspectral image data by performing parallel processing. The imaging apparatus includes a light source, an imaging spectrometer, an image sensor, control circuitry, and processing circuitry that performs a processing pipeline. The light source generates optical power for delivery at a molecular sample, and in response to the light source generating the optical power, the imaging spectrometer separates light emitted from one or more regions of the molecular sample illuminated by the optical power into a plurality of different component wavelengths. The image sensor, including circuitry, collects the light emitted along an optical pathway corresponding to the plurality of different component wavelengths. In various embodiments, the image sensor provides data indicative of the plurality of different component wavelengths along a data carrying path to control circuitry and processing circuitry at a rate of at least 100,000,000 wavelength-pixel measurements per second for a period of at least ten seconds. The control circuitry is arranged with the image sensor to scan the molecular sample by causing the image sensor to scan the one or more regions of the molecular sample while the imaging spectrometer is aligned with the image sensor and/or the source of emitted light, and collecting hyperspectral image data between a range of 200-1000 nm of the molecular sample from the light emitted that corresponds to the plurality of different component wavelengths. The processing circuitry performs an image processing pipeline by transforming the hyperspectral image data into data that is representative of a quantification of emitters, absorbers, and/or scatterers present in the one or more regions molecular sample. In specific embodiments, the processing circuitry can perform the image processing pipeline at the rate of least 100,000,000 wavelength-pixel measurements per second. For example, the processing circuitry can process the data in parallel and can include multiple processing circuits.

Various embodiments are directed to an imaging apparatus that filters the light emitted by the light source to an illumination line at different portions of the molecular sample. For example, the apparatus includes a light source arrangement, an imaging spectrometer, an image sensor, and control circuitry. The light source arrangement has at least one light source to generate optical power for delivering a plurality of illumination lines at a molecular sample. In response to the at least one light source generating the optical power, the imaging spectrometer separates light emitted from the molecular sample illuminated by the plurality of illumination lines into a plurality of different component wavelengths. The imaging spectrometer filters the light emitted from the light source to an illumination line at different portions of the molecular sample. In various embodiments, the imaging spectrometer includes an optical slit to filter the light emitted, reflected, transmitted or scattered. In other embodiments, the light source arrangement includes a plurality of light sources, and at least two of the plurality of light sources have non-overlapping sets of wavelengths. The image sensor collects the light emitted along an optical pathway from the molecular sample that corresponds to the plurality of different component wavelengths. The control circuitry is arranged with the image sensor to scan the molecular sample by causing the image sensor to scan the molecular sample while the imaging spectrometer is aligned with the image sensor and/or the source of emitted light, and collecting hyperspectral image data of the molecular sample from the light emitted that corresponds to the plurality of different component wavelengths.

In various specific embodiments, the imaging apparatus can further includes autofocusing control circuitry, a cylindrical lens or mirror, and/or an additional image sensor having a mechanical or optical tilt. The additional image sensor with the tilt can be used to collect a plurality of lines that each represent a region in the molecular sample. The tilt of the additional image sensor causes each of the plurality of lines to be a different z-distance from an image plane. In this manner, the same region in the molecular sample is effectively imaged onto multiple z-planes simultaneously. As the imaging apparatus scans across the molecular sample, a z-stack is built or otherwise formed using vertical images and used to determine the focus plane in real-time (e.g., the z-stacks do not have to be acquired using extra time as the autofocusing is performed during the imaging of the sample). A running z-stack can be kept (e.g., 2048×2048×120 pixels) and used to calculate the focal plane based on a focus metric. In response to identifying the focal plane, the control circuitry can adjust a z-position of the molecular sample relative to the objective lens to focus the imaging apparatus.

In specific implementations, the imaging apparatus can be used to analyze multiple biologic molecules in a single molecular sample. A specific example of such a situation exists in the analysis of exosomes. Exosomes are one type of extracellular vesicles that are found in most bodily fluids such as blood, saliva, etc. Research indicates that exosomes may play an important role in signaling mechanisms in healthy and disease states. Exosomes are of endosomal origin and thus carry and display proteins (cargo) associated with this pathway. Exosomes typically also contain protein and nucleic acid (mRNA, miRNA, DNA) cargo associated with the cell or tissue of origin. The structure of exosomes is such that the proteins are largely found on the surface of the vesicle, whereas RNA is found inside. The proteins carry information about the origin of the molecule, whereas the RNA contains the genetic or control information. It is believed that the proteins and the RNA combination provide useful diagnostic information about disease states. In accordance with various embodiments, apparatuses, such as a hyperspectral microscope, can be used to analyze the protein and the cargo (RNA) simultaneously. Additionally, referring back to the benefit of analyzing multiple molecules, this use is particularly relevant for exosomes, as a large number of these are normally present in a given sample. Apparatuses in accordance with the present disclosure can analyze a large number (e.g., 4 or more labels per exosome, and in some embodiments 12 or more) of exosomes simultaneously.

As another specific example, imaging apparatuses in the present disclosure can be used to analyze different labels at the same time. The analysis of exosomes and other biologic molecules often involves the use of different types of fluorophores with each type being engineered to bind to only one type of molecule such as by conjugation to an antibody, aptamer, peptide, etc. Example fluorophores or labels can include fluorescent dyes, fluorescent nanoparticles, and quantum dots fluoresce under illumination at specific frequencies. The binding and the fluorescent property is utilized to identify the biologic molecules targeted by the antibodies, aptamers, etc. Fluorophores emit light at specific wavelengths (e.g., wavelength ranges) that is detected by appropriate optical filtering. The imaging apparatus can be used to detect and measure multiple fluorophores at the same time.

In various specific examples, the imaging apparatus in the present disclosure can be used to perform real-time imaging. Various different research and diagnostics analyses may benefit from real-time imaging. As an example, during minimally invasive surgery, numerous molecules may be monitored at the same time. These measurements can be fluorescent measurements as described above or reflectance or transmission absorption measurements of endogenous or exogenous chromophores. The molecules provide more information about the tissue and may be useful to guide surgical procedures. Imaging apparatuses in accordance with embodiments described herein can be used to analyze, in tandem, multiple different wavelengths (e.g., 4 or more, and in some embodiments 12 or more) at high frame rates (e.g., 100 FPS to 4,000 FPS). Prior systems tend to acquire information with high spectral coverage using hundreds of wavelengths or more, but have imaging rates on the order of one per minute or lower, or high frame rates and low spectral coverage using fixed wavelength filters (e.g., video rates of 30 frames per second or higher with a handful of wavelengths).

Turning now to the figures, FIGS. 1A-1D illustrate example apparatuses for generating a hyperspectral image, in accordance with the present disclosure. The apparatus is or includes an imaging apparatus used to scan molecular samples. The imaging apparatus can include a microscope having internal processing circuitry and external processing circuitry. As used herein, a molecular sample includes or refers to a sample having or consisting of one or more different molecules. The molecular sample can include a biological specimen, such as blood, urine, saliva and other fluids, cells, tissue sections, exosomes, proteins, genetic material, bacteria, agricultural or food materials, among other sources of samples such as from synthetically created samples (e.g., synthetically created material, tissue, or cells), other types of liquids (e.g., a sample from a water source, such as a river or lake) and surfaces (e.g., a swab from a surface).

In various embodiments, the example apparatuses illustrated by FIGS. 1A-1D can be used to provide one or more levels of parallelization, to increase a throughput of the imaging apparatus. Parallelization includes or refers to converting of sequential data, processing of data, and/or physical phenomena into multiple threads of the data, processing of the data, and/or physical phenomena. As further described herein, the one or more different levels of parallelization can include parallelizing the light emitted from the light source, parallelizing the light collected by the image sensor, and parallelizing the image processing. Parallelizing the light emitted from the light source includes or refers to spreading the light emitted from a light source, e.g., the light profile, into an area and/or across a plurality of wavelengths or pixels of the sample. Parallelizing the light collected by the image sensor includes or refers to collecting and/or recording the light output from the imaging apparatus (e.g., by an image sensor) concurrently across a plurality of wavelengths of light. Parallelizing the illumination includes using multiple light sources and/or multiple illumination lines. Parallelizing the imaging processing can include processing the raw image data output from the imaging apparatus in parallel and using different processing resources. In a number of specific embodiments, more than one level of parallelization can occur, such as two or more or all three.

As illustrated by FIG. 1A, the imaging apparatus includes a light source 106, specialized control circuitry 112, an imaging spectrometer 108, an image sensor 111, and an optical objective 104. An optical objective includes or refers to an optical system that gathers light from an object being imaged and can focus the light to produce an image. Examples include a lens, glass or mirror, and/or a combination of various lenses, glass or mirrors. In various embodiments, the optical objective 104 includes multiple lenses, with each lens having different focusing characteristics depending on its location in the path of the light. In other embodiments and/or in addition, the optical objective 104 can include a microscope objective or a camera lens that passes light from the molecular sample 102. The light that is passed may be transmitted, scattered, and/or reflected by the molecular sample 102 as observed via luminescence, fluorescence, phosphorescence, absorption, or scattering. In some embodiments, a camera lens, such as those used of machine vision, is used. Optics for multiple resolutions may be beneficial for applications using two scans of the molecular sample 102. The first scan can include a scan of a first resolution and of the entire molecular sample 102, followed by a second or more scan of a higher-resolution than the first resolution and of a region of interest (which is smaller than the entire sample) of the molecular sample 102. In a number of embodiments, the optical objective 104 is part of an objective turret having a plurality of microscopic lenses attached thereto.

The optical objective 104 and control circuitry use a light source 106 to scan a molecular sample 102. The light source 106 includes or refers to a device or component that emits electromagnetic radiation within a certain portion of the electromagnetic spectrum, also known as light. The light source 106 emits light which is used to illuminate the molecular sample 102, sometimes herein referred to as the "excitation light." The shape of the light emitted by the light source is herein referred to as the "light profile." Light emitted from the molecular sample 102, sometimes herein referred to as the "emission light", is passed along an emitted-light optical pathway to an image sensor 111 using a variety of components (e.g., mirror 114, imaging spectrometer 108). An optical pathway includes or refers to a pathway in which light is transmitted through or by the imaging apparatus. The light used to illuminate the sample can pass on a path from the light source to the molecular sample, and can be referred to as "excitation light" which is passed along an "excitation-light optical pathway". Light emitted from the optical pathway that is transmitted from the biological sample to the imaging spectrometer and to the image sensor can be referred to as "emission light" which is passed along an "emitted-light optical pathway". For imaging used to measure absorption, reflection, and/or scattering of light, and photoluminescence applications (e.g., fluorescence, phosphorescence, or Raman emission), illumination of the molecular sample 102 is beneficial. However, it may be appreciated that applications directed to chemiluminescence and other luminescence applications may not use a light source to generate light. A variety of different types of light sources can be used, such as lamps, light emitting diodes (LED), and lasers. For (high speed) hyperspectral imaging, lasers can be beneficial and for applications of brightfield imaging, lamps or LEDs may be used, with LEDs providing longer lifespans and incandescent lamps providing broader spectral bands. For epifluorescence imaging, the light source 106 is on the same side of the molecular sample 102 as the imaging spectrometer 108, the excitation and emission light pass through a single lens or microscope objective. A dichroic filter(s) 116 or other means is used to separate the excitation and emission light.

Although the illustrated light source 106 in FIG. 1A is on the same side of the molecular sample 102 as the imaging spectrometer 108, in many cases the light source may be on the opposite side of the sample from the imaging spectrometer, as further illustrated and described in connection with FIG. 21A.

The control circuitry 112 can be used to control the power, temperature, and optionally, the pulsing of the light source(s) 106. In accordance with various embodiments, the control circuitry 112 (e.g., a microcomputer, such as a high speed DSP, a CPU, or computer processing chip(s) or logic circuitry, such as a programmable logic array (PLA)) that can carry out various acts. For example, the various acts include the above-described control of power, temperature, and optionally, the pulsing of the light source(s) 106. In other embodiments, the acts include causing the image sensor to scan a region of the molecular sample while, on-the-fly during the scan, determining (and moving the sample to) a focal plane associated with the region and/or another region of the molecular sample, as further described herein. On-the-fly, as used herein, refers to or includes processing that occurs while the imaging apparatus is in motion or another process is in progress. In specific embodiments, on-the-fly can refer to determining a focal plane for the region and/or the other region while the process of scanning the region is ongoing (e.g., in real time or near-real time). Real time refers to or includes processing of input data within a threshold amount of time, e.g., seconds or milliseconds, such that the data is available as feedback.

The power can be configured to be in tandem with the image sensor 111 such that the image sensor 111 can record a signal without undergoing saturation. The temperature is kept steady (e.g., within a threshold temperature range) throughout the entire imaging process, using passive or active cooling. The light source 106 can be pulsed to reduce motion blur (as opposed to changing the exposure time of the image sensor 111). The light sources can each output between 100 mW to 6 W of optical power, in specific embodiments. In other specific embodiments, the light sources output between 120 mW to 6 W of optical power or 200 mW to 6 W of optical power. The light source 106 and/or each of a plurality of light sources outputs sufficient optical power for delivering at least 100 mW of optical power at the molecular sample 102.

In some embodiments, the output power (e.g., the light profile) can be focused into an illumination line onto the molecular sample 102 using an optical system, which can optionally include an optical slit, as further described herein. Focusing the power into an illumination line can effectively parallelize the output power across multiple pixels of the molecular sample 102. An illumination line includes or refers a line of light on the molecular sample. In various embodiments, the illumination line is a shape of light that is modified from a respective light profile emitted by the light source 106. For example, the light profile emitted from the light source can be modified to spread at a width or length into an illumination line across a plurality of pixels. By focusing the emitted light into an illumination line, each point in the sample 102 is illuminated with sufficient light for imaging while improving the overall light throughput of the apparatus by a factor of 12-50× as compared to light source(s) at a lower power output. For example, the output power from the light source 106 can provide sufficient light to spread the light across a plurality of spatial pixels while still allowing for imaging, and which can mitigate the risk or impact of the output power on the molecular sample 102.

As an example, if the 100 mW to 6 W of optical power is delivered at a single point in the sample, the delivered power may damage or burn at least some of the molecular sample as the light is focused into a point. The output power can be expanded or spread into a line across many points or pixels of the molecular sample 102, also referred herein as an "illumination line" such that each point of pixel receives a percentage of the total output power. In other embodiments, the control circuitry 112 can move the alignment of the output power such that the light source 106 delivers optical power at different points (and using the total output power) for less than a threshold period of time, which can prevent or mitigate damaging and/or burning of the sample 102. In specific embodiments, the illumination line can be formed by very rapidly scanning a point to form a line such as with an acoustooptic or electrooptic modulator.

In various embodiments, the imaging apparatus can include a plurality of light sources. The plurality of light sources can be multi-mode light sources and/or single mode light sources, lamps, white light sources, colored light sources, etc. For example, the plurality of light sources can include a plurality of multi-mode laser diodes, a plurality of single mode laser diodes, and a combination of one or more multi-mode laser diodes and one or more single mode laser diodes. In specific embodiments, the apparatus includes a light source arrangement having one to four multi-mode laser diodes. The plurality of light sources can be used concurrently (e.g., all at the same time) to illuminate the molecular sample 102. In other embodiments, the light sources can be used to sequentially illuminate the molecular sample 102. For example, the molecular sample 102 is imaged using a first light source, and then imaged using a second light source, which is continued until all light sources are used. The light source 106 can emit a plurality of light beams at non-uniform intensities.

As may be appreciated and is further illustrated herein, a multi-mode laser diode emits several laser beams along an axis of the diode, sometimes referred to as the "slow axis" of the diode. Similarly, although not to the same degree, a single mode laser diode has a line intensity that is not perfectly uniform, and may emit a non-uniform laser intensity (e.g., several laser beams at different intensities). As a result, the intensity pattern of a light source can be non-uniform. An intensity pattern of a light source refers to or includes an intensity pattern of one or more beams of light emitted from the light source and/or the intensity pattern of a beam of light over time. For a multi-mode laser diode, along the "fast axis" of the diode, the laser beam quality can be nearly Gaussian and nearly diffraction-limited, and makes the diodes beneficial for line imaging.

The control circuitry 112 can include processing circuitry and can control a stage used to perform one or more acts to control a position of the molecular sample 102. The apparatus can scan the molecular sample 102 by controlling the position of the molecular sample 102 relative to the optical objective 104. The molecular sample 102 is positioned and secured to a stage 110, which can be translated in at least two degrees-of-freedom, such as along the X and Y directions. In various specific embodiments, the stage 110 can be translated in three degrees-of freedom along the X, Y, and Z directions. For example, the stage 110 can be a piezo-stage that simultaneously controls the X, Y, and Z position of the molecular sample 102. Alternatively and/or in addition, the apparatus includes two stages. The first stage moves the molecular sample 102 in the X and Y direction and the second stage is attached to the optical objective 104 to adjust the Z-distance between the optical objective 104 and the molecular sample 102.

The control circuitry 112 (and/or other processing circuitry) can control the relative position of the molecular sample 102 relative to the optical objective 104, which can be in an X, Y, and/or Z direction. For example, using the control circuitry 112 and the stage 110, the molecular sample 102 is scanned using a scanning pattern. The scanning pattern can be used to scan the entire molecular sample 102 and/or a region of interest using a line-scanning approach in which the stage 110 continuously moves during the scan. As the position of the molecular sample 102 is moved, relative to the optical objective 104, the image sensor 112 records component wavelengths ranges. The process of scanning and moving the molecular sample 102 continues until the region of interest of the molecular sample 102, which may include the entire molecular sample 102, is scanned. Although embodiments are not so limited, and the stage 110 may not constantly move, such as with a staring approach, and/or the imaging apparatus can move relative to the stage 110.

The light emitted from the molecular sample 102 is passed along an emitted-light optical pathway, as illustrated by the dashed-lines of FIG. 1A. Various components, such as the dichroic filter 116, beamsplitters, and one or more mirrors 114, can be used to direct the emission light along the pathway to an imaging spectrometer 108. An imaging spectrometer includes or refers to an instrument used to acquire spectrally-revolved image data (e.g., hyperspectral image data) of the molecular sample 102. The imaging spectrometer 108 can include a prism and one or more lenses (e.g., a lens-prism-lens system). In other embodiments, the imaging spectrometer 108 includes a diffraction grating and/or other components that may be appreciated by one of skill in the art. Alternatively, the imaging spectrometer can use inteferometric methods to separate wavelength such as for Fourier transform spectroscopic imaging. The imaging spectrometer 108 separates the light emitted from the molecular sample 102 into a plurality of different component wavelengths.

The emission light, in some embodiments, is focused into an illumination line prior to reaching the imaging spectrometer 108, such as by focusing a laser beam onto the molecular sample 102 during fluorescence, or is a light area, such as when illuminating the molecular sample with an LED during brightfield imaging. For example, the light emitted from the light source 106 can be focused and converted to a line by a lens that is arranged between the molecular sample 102 and the light source 106. In other embodiments, the imaging spectrometer 108 includes an optical slit to filter the filter the light emitted, reflected, transmitted or scattered into one or more lines and to reduce out-of-focus light. An optical slit includes or refers to an opening, which can be along a line and within a material or surface, used to filter emission or excitation light travelling along an optical pathway. For example, the emitted light is incident upon the optical slit of the imaging spectrometer 108, which restricts the light along the Y axis before becoming incident upon the prism of the imaging spectrometer 108. The prism separates out the light into its component wavelengths (e.g., colors) and passes light emitted corresponding to the component wavelengths along the emitted-light optical pathway to the imaging sensor 111.

The width of the optical slit can be controlled by the control circuitry 112 and/or manually, in specific embodiments. For example, the width of the optical slit can be adjusted based on dimensions of a region of interest in the molecular sample 102, an image mode, and an exposure time being used. The width of the slit is controlled to provide an amount of light that is sufficient to recognize target objects in the molecular sample 102. The greater the width of the optical slit, the more light that is collected, whereas a smaller width reduces out-of-focus light. The control circuitry 112 can include or have access to a look up table that includes different regions of interest, signal to noise values to recognize targets, image mode, and exposure times, and can be used to determine or output the width of the slit to use. Further, the optical slit can include a plurality of slits, in specific embodiments.

The light emitted that corresponds to the separated component wavelengths (e.g., colors) is passed along the emitted-light optical pathway from the imaging spectrometer 108 to the image sensor 111. An image sensor includes or refers to circuitry used to detect and convey information that constitutes an image by converting light waves into signals. The image sensor 111 can be a CMOS area image sensor, a camera that has a two-dimensional (2D) CCD array, a monochrome camera that has a 2D CCD array, and/or a line sensor that is several pixels wide, among other sensors. The component wavelengths can be incident on different locations of the image sensor 111 (e.g., locations of a CCD array along one dimension of the array). The image sensor 111 collects the light emitted that corresponds to the plurality of different component wavelengths and can, optionally, store the component wavelengths in storage of the control circuitry 111 or transfer to other processing circuitry, such as parallelized circuitry that processes the hyperspectral image data in parallel.

The imaging apparatus can parallelize the output light from the apparatus. For example, using the control circuitry 112 and the image sensor 111, the emission light is concurrently collected across the plurality of component wavelengths (e.g., at once/at the same time). The image sensor 111 collects and records the light as separated by the imaging spectrometer 108. The light corresponding to the plurality of different component wavelengths can be recorded as a rectangular region of interest on the image sensor 111. The region of interest is formed of distinct lines. For example, each distinct line at the image sensor 111 represents the same line in the molecular sample 102 but at a different wavelength (e.g., first line being 400-405 nm, second line being 405-410 nm, etc.), sometimes referred to herein as "spectral pixels". The region of interest can be reduced from full resolution of 2048×1536. In a specific example, a region of interest can include 2048×60 pixels, which corresponds to the spatial and spectral direction (e.g., pixels) respectively. In such an example, there are 60 distinct lines that are 2048 pixels long, and each distinct line records a different component wavelength. Instead of imaging using the whole sensor (and throwing away extra data), the region of interest is reduced to gain an order or more of improved speed. By using a region of interest that is reduced (e.g., from 2048×1536 full resolution to 2048×60 pixels), the imaging apparatus can be used to image at speeds of 1,500 frames per second or more. Imaging at such speeds is benefited by the relatively high powered light sources (e.g., the multi-mode laser diodes and/or other light sources emitting at 100 mW-6 W of power) to provide sufficient light.

Various settings can be changed prior to scanning the molecular sample 102, including the region of interest, the imaging mode, illumination intensity and/or pulse-width, and exposure time. The region of interest can be adjusted (e.g., made smaller or larger) to collect a different numbers of wavelengths. For example, if imaging fluorescence of between 400-600 nm (instead of 400-800 nm), a region of interest can be adjusted to 2048×30 pixel region of interest on the imaging sensor 112. This can increase the data throughput by approximately fifty percent as compared to capturing a 2048×60 pixel region of interest. Many imaging sensors have different imaging modes which can be selected. As a specific example, the Point Grey IMX 252 has a low-noise mode (which offers a higher dynamic range) and normal mode (which is faster). Further, the exposure time, illumination intensity, and/or pulse-width can be altered to adjust the motion blur when imaging and/or adjust over-saturation of the image sensor's pixels. Reducing the exposure time can reduce the motion blur and over-saturation, whereas increasing the exposure time can increase these parameters.

The component wavelengths collected by the image sensor 111 are passed (e.g., transferred to or by accessing storage) to processing circuitry for further processing. The processing circuitry can be external to the microscope (e.g., a standalone central processing unit (CPU) such as a desktop computer, a laptop computer, a server), internal, and/or both. In various embodiments, the control circuitry includes a first processing circuit and a second processing circuit. The second processing circuit is used to process the output data in parallel with the imaging apparatus collecting the data using the control circuitry and the first processing circuit. The control circuitry 112 can be used to control the stage 110 and interface with the image sensor 111. Further, the control circuitry 112, including the first processing circuit, can be used to control the light source 106, optical alignment, and the optical objective 104. In specific embodiments, the first processing circuit instructs the stage 110 when and where to move the molecular sample 102, and instructs the imaging sensor 111 when to image the molecular sample 102. The second processing circuit can be used to store the image data and perform various post-processing of the imaging data, including but not limited to spectral decomposition, compression, background correction, hyperspectral smile and keystone correction, and light source intensity correction. However, embodiments are not so limited and the processing circuitry can include greater or less than two processing circuits. In various embodiments, the second processing circuit can include a GPU, CPU, field-programmable gate array (FPGA), and/or other standalone processing device. The second processing circuit can be part of or in communication with a device having a display and allowing a user to select and configure the specific imaging application, and to view the results of the imaging.

The processing circuitry (e.g., the first, second processing circuit, or more) can be used to generate a hyperspectral image of the molecular sample 102. For example, the processing circuitry can generate the hyperspectral image by stitching together the different distinct lines for the spatial pixels, representing the different wavelengths, representing the region of interest. The processing circuitry, in response to the hyperspectral image, outputs data representative of a quantification of labels in the molecular sample 102. The collected component wavelengths (e.g., spectral intensities) provided to the processing circuitry include raw image data and do not correct for various distortions. The distortions can include variations in light intensity attributable to the light source 106 (and along the illumination line), hyperspectral phenomena such as smile and keystone, pixel misregistrations, among other distortions. The processing circuitry is used to perform the above-listed processes, as further described below. For example, as the light is collected across a plurality of different intervals (e.g., 60 intervals) in the visible spectrum, the processing circuitry performs smile and keystone correction, and decomposes the collected component wavelengths from spectral intensities into distinct label quantifications. In some specific embodiments, the hyperspectral image data is revised to account for the distortions, which can include correcting for the non-uniform illumination of the light source 106, as further described herein.

The data representative of the quantification of labels can be output and/or generated by performing smile and keystone correction to the raw imaging data and then decomposing the collected component wavelengths from spectral intensities into the label quantifications. The labels used for the decomposition can be distinct fluorophores or other emitters which a user has imaged. As previously described, in some specific embodiments, a plurality of (different wavelength) light sources can be used to concurrently illuminate the molecular sample 102. In such embodiments, more than one light source may excite the same label at the same time. The decomposition of the component wavelength to label quantifications corrects for the excitement by more than one light source. In other embodiments, the plurality of (different wavelength) light sources can be used to sequentially illuminate the molecular sample 102 and the step of decomposing the collected component wavelengths into label quantifications may optionally not be performed.

As further described herein, the control circuitry 112 can be used to perform spectral imaging techniques, which include acquiring many wavelength measurements for each spatial point in a molecular sample and using the data points to mitigate spectral overlap in a process known as spectral unmixing or spectral decomposition. In this process, the wavelength measurements (i.e., the spectral data) are transformed into label quantifications. Decomposing the component wavelengths from spectra intensities to label quantifications can include a spatial pixel by spatial pixel process that includes inputting the recorded intensities at each component wavelengths (e.g., if 2048×60 pixels, then 60 component wavelengths) that are given at a spatial pixel and outputting the relative concentrations of the particular label being imaged, which is also referred to herein as the "partial or relative quantification of a label In specific embodiments, the light source may have a non-uniform illumination pattern, as further described and illustrated herein. After decomposing into partial label quantifications (or optionally when not performed), the non-uniformity of the light source 106 can be corrected for. The hyperspectral image, after the below described spectral decomposition, is an illumination, smile, and keystone-corrected hyperspectral image with a plurality of channels. The particular number of channels is dependent on the number of distinct labels imaged. For example, if nine fluorophores are imaged in the molecular sample, the illumination, smile, and keystone-corrected hyperspectral image has nine channels. Each of the channels corresponds to a quantity of a label selected to be imaged. The processing circuitry calibrates (e.g., corrects) the illumination of the hyperspectral image (e.g., the image data) using non-uniform intensity patterns which are attributable to the light source 106. In specific embodiments, each light source of the light source has a non-uniform intensity pattern, which may be known and/or identified by the processing circuitry. Using the non-uniform intensity patterns, the processing circuitry decomposes the partial label quantifications into label quantifications by adjusting for (laser) power of the light sources based on the non-uniform light intensities. Corrections for variable throughput or response of the slit, spectrometer, or image sensor may be performed similarly.

The non-uniform intensity patterns can be identified, in a number of embodiments. To identify the pattern for a particular light source, the processing circuitry identifies a section of the molecular sample 102 that is excited by the particular light source. The molecular sample 102 is moved, using the stage 110 and the control circuitry 112, in a direction of an illumination line of the respective light source, as further illustrated and described in connection with FIGS. 11A-11F. For each pixel in the direction (e.g., the 2048 pixels long), the image sensor 111 is instructed to collect the component wavelengths emitted by the molecular sample 102 at the same section (e.g., same point in the sample). By moving and collecting the component wavelengths, in the direction of the illumination line (at the end of the process) each point on the illumination line has imaged the same point in the sample once. Using the sequence of image data, the intensity pattern of the light source is constructed and used for calibration. In various embodiments, the process is repeated for each light source. In response to the calibration, the processing circuitry can output data representative of a quantification of labels in the molecular sample 102, such as via a display and/or print out. In various embodiments, multiple points in the molecular sample can be imaged using the same illumination line, which can be used to reduce the noise level of the measurement.

In various embodiments, the apparatus illustrated by FIG. 1A can be used to perform autofocusing during capturing of the image data. For example, the apparatus can include autofocusing control circuitry (which can be part of the control circuitry 112) for performing autofocusing during the scan of the molecular sample 102. The autofocusing can include, as further described herein, determining a plane of focus in a z-stack of a line in the molecular sample 102 and adjusting a z-position of the molecular sample 102 relative to the optical objective 104 based on the plane of focus. A plane of focus, also called a "focal plane", refers to or includes a distance from the image sensor (e.g., camera) from which a focus of a region of the molecular sample 102 is obtained. In specific embodiments, the plane of focus can include an optimal plane, e.g., a distance from the image sensor and/or the objective lens at which the sharpest focus is obtained.

As may be appreciated by the discussion above and further herein, the control circuitry, which includes processing circuitry, is used to control various features and settings of the imaging apparatus. The control circuitry 112 can be internal to the imaging apparatus, external to the imaging apparatus and in communication, and/or both (e.g., processing occurs internal and external to the microscope). The control circuitry 112 can be used to control, and customize for different applications, the output power of the light source arrangement (e.g., of each light source), the temperature of the light source arrangement (e.g., of each light source), the Z-position of the optical objective 104 relative to the molecular sample 102 via a Z-axis stage, control of the X and Y position of the sample 102 via an XY-stage, switching of the active optical objective 104 (e.g., objective) via a motorized objective turret, providing feedback to external circuitry regarding the X, Y, and Z position of the sample 102, and sending instructions to the autofocusing control circuitry and image sensor 111 to achieve a frame rate. In specific embodiments, the control circuitry 112 can control the output laser power of the lasers (e.g., of each laser diode), the temperature of each laser arrangement (e.g., of each light source), and the output power of LED modules, as further described herein.

The control circuitry 112 can be used to control the stage(s) 110 and interface with the image sensor 111. It also optionally controls the light source 106, optical alignment, and optical objective 104, depending on the system configuration and application. Specifically, the control circuitry 112 can instruct the stage 110 where to move the sample 102, and the image sensor 111 when to image the sample 102. The control circuitry can also store the image data, perform post-processing of the image data, and/or provide the image data to other processing circuitry to perform the post-processing. This post-processing performed may include spectral decomposition, compression, background correction, hyperspectral smile correction, light source intensity correction, etc. The control circuitry 112 or other external circuitry can be part of or in communication with a device having a display to allow the user to select and configure their application, and to view the final results of the procedure.

In accordance with a number of specific embodiments, the control circuitry sends a unique XY scanning pattern to the stage 110. Additionally, different algorithms for autofocusing may be required for different applications. The control circuitry can also control the frame rate of the image sensor 111, and how the images are stored. For example, the data may be directly written to a high-speed (e.g., solid-state) disk, or post-processed and compressed by other processing circuitry that is operating in parallel with the control circuitry, such as a field-programmable gate array (FPGA), graphics processing unit (GPU), and/or a central processing unit (CPU). And, the final output can be displayed to the user, which may be different depending on the application (e.g., an image, a chart, a table, etc.).

The processing circuitry (e.g., circuitry that is external to the microscope portion of the imaging apparatus) can be used to calibrate the microscope for different applications and/or imaging processes based on inputs by a user. A number of factors can impact the image quality, such as saturation and signal-to-noise ratio, or the microscope mode. The imaging apparatus can be operated in different modes including a fluorescence mode and brightfield. Some example factors that image the image quality when operating in the fluorescence mode are further described below. When using lasers (e.g., multi-mode and/or single mode laser diodes) for illuminating the sample 102, the output power can impact image quality of the image data. For example, the laser power dictates the number of photons that are exciting fluorescent labels in the sample 102. The quality of the fluorophore used to label the sample 102 can also impact image quality as the quantity of fluorophores may be variable at different points on the sample. For example, a fluorophore conjugated to a protein-specific antibody emits light in proportion to the amount of protein at a particular point in the sample. A user may be concerned with the minimum and maximum quantity for each fluorophore being imaged across the entire sample. This depends on the sample 102 that the user chooses to image. The quantum yield of the fluorophore can also impact image quality. Each fluorophore being imaged has a unique quantum yield, which is the efficiency at which the excitation light causes fluorescence emission. This is also dependent on the fluorophore itself as well as the wavelength of the laser. This depends on the fluorophores that the user chooses to image. And, photobleaching can impact the image quality. Prolonged exposure to light can cause fluorophores to photobleach, meaning they can no longer produce fluorescence emission light. Therefore, minimization of unnecessary exposure to light can be beneficial. This also depends on the fluorophores that the user chooses to image.

Some example factors that impact data image quality when operating in the brightfield mode are further described below. The output power of the LED(s) can impact image quality. The LED power dictates the number of photons that are being transmitted through or reflected from the sample. The absorption and scattering coefficient of the sample can impact the image quality. Because transmitted light is being measured in the brightfield mode, the percentage of light that is absorbed or scattered can affect the number of photons that ultimately reach the image sensor. This depends on the sample 102 that the user chooses to image.

Various image sensor factors can also impact the quality of image data in either mode. Such example factors include camera read noise, well depth, exposure time, dynamic range, and quantum efficiency can also impact the quality of the image data. In fluorescence mode, the read noise may be the pre-dominant source of noise, and can help to inform the minimum output power chosen for each light source. This is pre-determined based on the image sensor used. The well depth indicates the maximum number of electrons a single pixel can store for each image frame, and helps inform the maximum output power chosen for each light source. This is pre-determined based on the image sensor used. By increasing the exposure time, the time that each pixel has to gather light is increased. Increasing the exposure time can result in larger signals. However, it may also result in slower scan speeds. This parameter can be adjusted at imaging time. The image sensor 111 (e.g., camera) has its own intrinsic dynamic range. From a calibration perspective, it can be beneficial to maximize usage of the dynamic range. That is, the imaging apparatus can set the output power of the light source and the exposure time of the image sensor 111 so that the majority of the signal recorded falls within the dynamic range of the image sensor 111. When photons hit the image sensor, they are "converted" into electrons with variable efficiency. This efficiency is dependent on the wavelength of the photon, and is pre-determined based on the image sensor used.

At imaging time, a variety of the factors can be controlled, such as the output power and/or pulse-width of the light source(s) and the exposure time of the image sensor 111. In many implementations, it is beneficial to complete the imaging as fast as possible, so the exposure time can be set to be no greater than the maximum frame rate of the image sensor 111 (e.g., camera). Therefore, a parameter that is adjusted can be the output power of the light source(s). While the user can set the laser power, the imaging apparatus may perform automatic optimization.

Figure 1B:
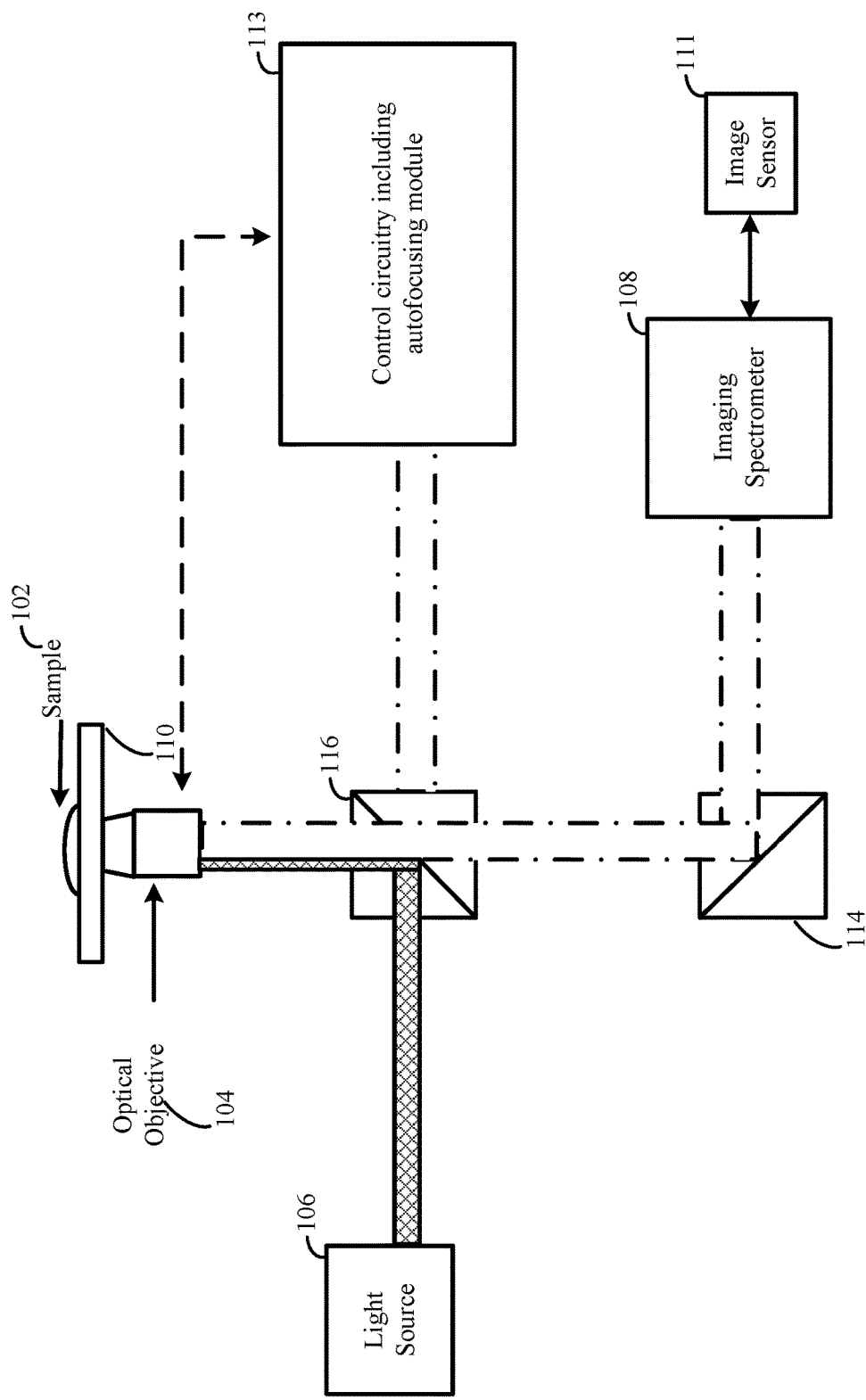

The imaging apparatus as illustrated by FIG. 1B, and various additional figures, can be used to collect image data at a relative high speed and high power. The apparatus illustrated by FIG. 1B can include the apparatus and its various components as illustrated by FIG. 1A in various embodiments, however embodiments are not so limited. As illustrated, the apparatus can include a light source 106, an imaging spectrometer 108, and image sensor 111, and control circuitry 113. In various embodiments, the apparatus includes a plurality of light sources that output power in tandem or sequentially. The apparatus illustrated by FIG. 1B can be capable of high throughput, for example, data acquisition rates, based on the particular light source, imaging spectrometer, and optionally, by performing on-the-fly auto-focusing.

The light source 106 can generate sufficient power for delivering at least 100 mW of optical power at the molecular sample 102. The output power from the light source can be focused into an illumination line, as previously described, to parallelize the light emitted from the light source 106. The light emitted from the light source 106 is directed toward the molecular sample 106 and used to illuminate the molecular sample. As previously described, the power density of the light that illuminates the sample is sufficiently large such that the fluorescence signal collected by the image sensor, in a given exposure time, is above the noise threshold but below the saturation limit of the image sensor.

The amount of light that is collected by the image sensor 111 can also be affected by the efficiency of the various optics present in the system. Multispectral imaging apparatuses that use tunable filters often have much lower light transmission (in some cases<10%), due to the polarization elements involved. In addition, such an apparatus has one excitation light on while cycling through the bandpass filters. If 20 images of a single field of view with 20 nm bandpass filters (covering 400-800 nm) are taken, a 20-fold excess photobleaching can be experienced as compared to taking one image per field of view. The hyperspectral line scanning apparatus may not make these tradeoffs, which can result in shorter exposure times, reduced photobleaching of samples, and faster data acquisition.

The imaging spectrometer 108 separates light emitted from a region of the molecular sample 102 as illuminated by the optical power. The light emitted is separated into a plurality of different component wavelengths, and passed along an optical pathway from the region of the molecular sample 102 to the image sensor 111. The image sensor 111 collects the light emitted along the optical path that corresponds to the plurality of different component wavelengths. More specifically, the light emitted that corresponds to the plurality of different component wavelengths is concurrently collected across the different component wavelengths, thus parallelizing the collection of the light output from the imaging apparatus.

Figure 3:
FIG. 3 shows an illustration of an efficiency of a diffraction grating, in accordance with embodiments of the present disclosure.

In various embodiments, the imaging spectrometer is a dispersing imaging spectrometer that includes a dispersion element. The dispersion element used in a dispersing imaging spectrometer can impact the amount of fluorescent light that is collected by the image sensor 111. The more light collected, the shorter the image sensor 111 exposure times that can be utilized while obtaining a good signal-to-noise ratio, and the faster the hyperspectral imaging system can acquire data from the sample. Examples of dispersion elements used in imaging spectrometers include prisms and diffraction gratings. However, diffraction gratings are not equally as efficient across all wavelengths. FIG. 3 illustrates that the efficiency for a selected grating drops to below 50% between 600-800 nm, which are key wavelengths in fluorescence imaging. Not only does a 50% reduction in efficiency reduce the overall throughput of the hyperspectral apparatus by 50%, but the fact that the efficiency is variable at the wavelengths of interest (roughly 350-900 nm) negatively impacts the dynamic range of the system since the hyperspectral line scanning apparatus images all spectral data points for a line of sample points in a single frame. As a result, to maximize the throughput and performance of the imaging system, a dispersive element is used with both a transmission efficiency that is high, and constant across the visible spectrum of light, such as a prism.

Typical materials used for producing prisms such as glass have a stronger dispersion in the blue region than in the red region. The consequence of this is that the spacing between detected wavelengths on the image sensor is much larger in the blue region than in the red, by a factor of 3 or more. In some cases, it can be advantageous for the prism to produce a more linear response. In one embodiment, a multi-element prism is used to produce a more uniform spectral dispersion or achieve other advantages. For more general and specific information relating to prisms and multi-element prisms, references is made to N. Hagen and T. S. Tkaczyk, "Compound prism design principles, I," Appl. Opt. 50, 4998-5011 (2011); N. Hagen and T. S. Tkaczyk, "Compound prism design principles, II: triplet and Janssen prisms," Appl. Opt. 50, 5012-5022 (2011); N. Hagen and T. S. Tkaczyk, "Compound prism design principles, III: linear-in-wavenumber and optical coherence tomography prisms," Appl. Opt. 50, 5023-5030 (2011), each of which is fully incorporated for its teachings.

The image sensor 111 can collect the plurality of different component wavelengths as separated by the imaging spectrometer 108 at the region of interest for each component wavelength at a frame rate and with an amount of light sufficient to identify between six to ten labels, or more, in the molecular sample 102 (e.g., signal to noise ratio that is high enough to recognize). The apparatus can scan a region of the sample 102 using an illumination line, and separate the light emitted from or responsive to the illumination line into its respective wavelengths onto the image sensor 111. A light profile includes or refers to a shape of light as emitted by the light source 106 (e.g., a distribution pattern of light emitted from the light source). The illumination line, as previously described, includes a line of light on the sample, and which can include a modification of the light profile using an optical system. The frame rate, such as the example provided, can be achieved by reducing the region of interest from full resolution (e.g., from 2048×1536 pixels to 2048× 60 pixels). Due to the speed of imaging, a lot of light may be beneficial to provide image data with sufficiently low signal-to-noise to recognize labels in the sample 102. The light source 106 can output between 100 mW and 6 W of laser power. Further, the above-described line-scanning approach can be used to scan the entire sample 102 without stopping movement of the stage 110 and to minimize the scan time. In specific implementations, the imaging apparatus can be used to image a 9-well microtiter plate in 2.2 minutes, image a 384-well plate in 8.8 minutes, and/or image a 15 mm×15 mm region of a microscope slide in 3.2 minutes. For example, the apparatus can image a sample at 2048×1500 pixels for a total of 3,072,000 spatial pixels per second and image a sample at 2048×60×1500 pixels for a total of 184,320,000 total pixels per second. In such an example, in 190 seconds, or just over 3 minutes, an entire sample is imaged using the imaging apparatus. In other specific embodiments, the imaging apparatus, via the light source and the image sensor, illuminates the molecular sample at an optical power of between 100-6,000 mW, at a frame rate of between 100 frames per second (FPS) to 4000 FPS, and at a transfer or storage rate of between 250 megabytes per second (MB/s) to 1 gigabyte per second (GB/s). Although embodiments are not limited to the various speeds, pixels, frame rates, and/or sample types described above.

The control circuitry 113 can be used to control the scan of the molecular sample 102. As described above, the region of interest that is captured by the image sensor is m×n pixels, where m is the number of spatial points in the line, and n is the number of spectral points to sample for each sample point. Each of then point maps to a spectral band in a region of the electromagnetic spectrum, which is pre-determined when the apparatus is designed. Once the apparatus is in the field, in one mode of operation, it can image the entire m×n region of interest. Alternatively, the image sensor can acquire an m×o region of interest, where o<n. Because the image sensor is acquiring a smaller region of interest, the resulting frame rate of the image sensor, and thus sample scanning rate, can be increased. In various embodiments, an image sensor acquires a full, 2048×96 region of interest (mapping to 400-800 nm in the visible spectrum) at approximately 1,100 frames per second. However, if the region of interest is reduced to 2048×64 (mapping to 400-667 nm in the visible spectrum), the image sensor can acquire data at 1,500 frames per second. This results in the sample being scanned 36% faster as long as the light source power can be adjusted accordingly to match the increased light throughput requirement.

This technique can be useful when an end user specifies the fluorophores that are present in the sample to be imaged. With prior knowledge of the emission spectra for each of these labels, the entire range in the electromagnetic spectrum can be computed that a user expects to see fluorescence signal for. This range can be mapped back to the specific pixels in the region of interest of the image sensor, which can be configured accordingly. This is useful for applications in which the end user is imaging one or a few fluorophores. In the latter case, processing circuitry executing a program can be used to provide experiment design advice to end users to select fluorophores that have emission spectra whose peaks are close to one another. This may be unintuitive for end users, and surprising to one of ordinary skill in the art, as they can be trained to select fluorophores whose peaks are far apart to avoid spectral crosstalk. However, because of the hyperspectral line scanning apparatus's ability to overcome spectral crosstalk, choosing fluorophores with peaks that are near to one another may be advantageous for imaging speed.

In specific embodiments, the control circuitry 113 can be used to control the scan of the molecular sample 102 by performing an autofocusing process. One source of overhead is the time it takes to autofocus a sample, especially at high magnifications. Autofocusing is the process by which the imaging apparatus identifies the best or optimal focal plane for a given field of view of the sample. High numerical aperture microscope objectives often have small depth of field (e.g. a 40× objective may have a depth of field of 1.0 μm), which requires the focal plane to be very exact.

The control circuitry 113 can be used to control the scan by performing various acts. The acts can include causing the image sensor 111 to scan the region of the molecular sample 102 while the imaging spectrometer 108 is aligned with the image sensor and/or the illumination light (e.g., the source of light) and while, on-the-fly and during the scan, determining a depth position for the region and/or another region of the biological region 102 to be scanned after the region. The control circuitry 113 can also perform of the act of causing the molecular sample to move to the depth position to alter an effective length of the optical pathway and therein improving a quality of a focal plane for the region and/or the other (e.g., a subsequent) region of the molecular sample. The improvement of the quality of the focal plane can be relative a focal plane for the region or a previously used focal plane for the region (e.g., the previous) of the sample and/or to an optimal focal plane, in various embodiments. In various embodiments, a single scan (e.g., illumination line) is used to perform both the imaging and the autofocusing, although embodiments are not so limited. As may be appreciated, the scan performed while performing the autofocusing refers to or includes extrapolating focus for the current region or the other (e.g., next) regions using data from the current region, and can include, for example, imaging one region while determining (e.g., anticipating) a focus for a subsequent region. The acts can be repeated by the control circuitry 113 for subsequent regions of the molecular sample. In various embodiments, the control circuitry 113 causes the scan of the region of the sample while concurrently determining an optimal focal plane for the respective region and/or another region which is associated with the depth position, and causes the molecular sample 102 or the optics to move to the depth position after scanning the region. This process is repeated until a portion of and/or the entire molecular sample 102 is scanned.

As described herein, the controlled scan of the molecular sample 102 can include movement of the sample 102, with the image sensor 111, imaging spectrometer 108, and illumination line (e.g., source of the emitted light) remaining stationary and aligned with respect to one another. During the scan of the sample 102, the image sensor remains aligned with the imaging spectrometer 108 and the illumination line. However, embodiments are not so limited, and can include moving other components of the imaging apparatus, such as moving the image sensor 111.

As further illustrated herein, the autofocusing can be performed using an autofocusing module, such as autofocusing control circuitry that is part of or separate from the control circuitry 113. Further, the autofocusing can be performed using another image sensor that can be tilted and/or via reflective autofocusing, as further described herein. The imaging apparatus can include the various components and features as previously described in connection with FIG. 1A. For example, a stage 110 can hold the molecular sample 102, and an optical objective 104 can transmit the light emitted from the molecular sample 102 to the imaging spectrometer 108. The control circuitry 113 in various embodiments can cause the scan by continuously controlling a plurality of positions of the molecular sample relative to the optical system, which can include X, Y, and Z positions.

In specific embodiments, the autofocusing can include an image sensor (which is at a tilt) collecting a plurality of lines, each of the plurality of lines being a different z-distance away from an image plane of the imaging apparatus. The control circuitry 113 determines an optimal focal plane for the region and/or another region of the molecular sample by using the plurality of lines, as further described herein. The autofocusing control circuitry can cause the image sensor to tilt to a plurality of different image distances (e.g., via tilting the image sensor at an angle), thereby causing the image sensor to be the different z-distances from the image plane. In even more specific and related embodiments, the imaging apparatus further includes a cylindrical lens or mirror arranged with the image sensor and the autofocusing control circuitry to collect a plurality of lines at the image sensor that represent the region of the molecular sample, and each of the plurality of lines at the imaging sensor are a different z-distance from an image plane of the imaging apparatus. The autofocusing control circuitry and/or control circuitry 113 can determine an optimal plane of focus for other regions of molecular sample based on a focus metric and the plurality of lines at the image sensor, and adjust a z-position of the molecular sample.

In other embodiments, the autofocusing is performed using a substrate having a reflective coating on a surface thereof to contain the molecular sample and is placed on the stage 110. A substrate includes or refers to a surface or material on which the molecular sample is placed. Example substrates include glass slides, micro or nanoarrays, petri dishes, microtiter plate, among other substrates. The control circuitry 113 can determine an optimal focal plane for the region and/or other region of the molecular sample by using light reflected from the reflective coating. The reflective coating can be reflective outside of an imaging spectral region and transparent inside of the imaging spectral region. The apparatus can further include another light source that generates optical power outside of the imaging spectral region for delivering at the substrate and for performing autofocusing.

In the context of the overall time that is used to acquire a hyperspectral image of a sample, the apparatus may not be actively acquiring hyperspectral data the entire time. This can be attributable to the benefit to perform autofocusing, to calibrate other image acquisition settings such as light source power, or move from one imaging region on the sample to the next imaging region. Such activities may be referred to as "overhead" for ease of reference. The overhead can be associated with time that the imaging system is not actively imaging during the scan of the sample. In imaging apparatuses that image one rectangular field of view at a time (i.e. "staring" apparatuses performing "step and stare" imaging), the stage moves from the current field of view to the next field of view. This results in the stage accelerating from a stationary position to its maximum speed, moving at a constant velocity, and then decelerating until it becomes stationary so that the next field of view can be imaged. For a sample whose length and width are both five fields of view, the apparatus performs this movement step a total of twenty-five times, which adds overhead to the total time to image a sample.

In various embodiments, a hyperspectral line scanning apparatus can image the sample line-by-line, also referred to as "line-scanning". As a result, it is not necessary for the stage 110 to stop, image the current field of view, and then move to the next field of view (which requires the stage to accelerate and then decelerate). Example hyperspectral line scanning apparatuses are designed in a way that the stage 110 can continuously move, such as moving at a constant velocity, while the imaging spectrometer 108 and the image sensor 111 capture hyperspectral data the entire time. As a result, the overhead occurs when the imaging apparatus finishes imaging a strip of the width of the entire imaging region, or when moving to a new well if imaging a microtiter plate. In the example above, the sample 102 whose length is five fields of view can be divided into five strips. The apparatus experiences overhead when moving from the end of one strip to the beginning of the next strip, for a total of five times.

The stage 110 holds the molecular sample 102 for scanning. The stage 110, the objective 104, and/or other equipment can be moved to control a position of the molecular sample 102 relative to the optical objective 104 or the optical system. In specific embodiments, the stage 110 is constantly moved to scan the entire molecular sample 102. Constantly moving the stage 110 can minimize the time taken to scan the sample. For example, the imaging apparatus can be used to image a 96-well microtiter plate in 2.2 minutes, image a 384-well plate in 8.8 minutes, and/or image a 15 mm×15 mm region of a microscope slide in 3.2 minutes.

The apparatus can further include processing circuitry. The processing circuitry is used to collect hyperspectral image data from the light emitted that corresponds to the plurality of different component wavelengths and transform the hyperspectral image data into data that is representative of a quantification of labels (e.g., emitters, absorbers, and/or scatterers) present in the molecular sample 102. As previously described, the processing can be parallelized. For example, the control circuitry 113 can collect the hyperspectral image data from the light emitted that corresponds to the plurality of different component wavelengths. The hyperspectral image data can include spectral component estimates for the plurality of different component wavelengths and which can be further processed by other processing circuitry. In various embodiments, the processing circuitry transforms the hyperspectral image data into the data representative of a quantification of emitters, absorbers, and/or scatterers by performing spectral decomposition of spectra intensities of the different component wavelengths into the quantification of emitters, absorbers, and/or scatterers present using a parallelized process, as further described herein. In some specific embodiments, the parallelized process is non-iterative, although embodiments are not so limited.

The hyperspectral image data that is acquired by the hyperspectral imaging apparatus may be imperfect. For the hyperspectral line scanning apparatus, the data may contain distortions such as keystone and smile, barrel, pincushion, as well as pixel misregistrations due to variation in the point spread function (PSF). It also reflects any non-uniformity of the illumination line that illuminates the sample 102. Furthermore, the intensities acquired by the image sensor 111 are impacted by the change in quantum efficiency of the image sensor 111 and efficiency or throughput of the optics as a function of wavelength. For a staring system performing Fourier transform imaging, phase correction may be necessary. In addition, in order to be useful to the end user, who is interested in an image where each channel of the image corresponds to a single label, spectral decomposition of the acquired hyperspectral data is performed. Because of the increased data acquisition rate of the imaging apparatus, the imaging apparatus is continuously or for an extended period of time (e.g., greater than 10 seconds), acquiring image data at speeds on the order of 200 million data points per second or more. Various acts can be used to process the data that can take advantage of parallel processing offered by CPUs, GPUs, FPGAs, or other electronic circuitry. Accordingly, in various embodiments, the above-described apparatus can dynamically modify the region of interest, to accounts for non-uniform intensity patterns attributable to one or more light sources, and to account for other distortions, as further described herein.

The control circuitry 113 can include processing circuitry that reduces the amount of data that is transmitted to other processing circuitry for further processing in parallel. The processing circuitry can generate hyperspectral image data of the molecular sample 102 from the collected light emitted from the one or more regions of the molecular sample 102. The data reduction process generally consists of the processing circuitry (e.g., an FPGA) receiving frames from the high-speed image sensor 111 and processing these frames to calculate the spectral component estimates $\hat{a}_{LS}$ as specified in EQ. 2 further illustrated herein. The hyperspectral image data can include spectra intensities of the different component wavelengths and/or the spectral component estimates. This processing reduces the data rate by a factor of L/K. Thus if L is 60 and K is 10, a 6× reduction in data rate can be achieved. Another way to conceptualize this is that instead of transmitting 60 numbers for further processing, each number representing the measured intensity at each of the 60 wavelengths, 10 numbers are transmitted. These 10 numbers represent how much of each of the 10 emitters, absorbers, or scatterers are present. By transmitting only 10 numbers instead of 60 (as an example) and performing further data analysis in real time using other processing circuitry, significant advantages may be obtained. One advantage is that the processing demand on downstream applications is reduced. In a situation where a large image of a tissue sample is rendered on a display, combining data from 10 channels can be faster than combining data from 60. Such imaging apparatuses can also be used in endoscopes perhaps during surgery; in these situations, again it is advantageous to have high throughput so that latency is low. In another example, in a point-of-care system, high throughput is quite advantageous so that care can be provided quickly.

In biological imaging where labels are utilized, the end user is generally interested in a multi-channel image, where each channel represents a quantification of each label in the sample. As a result, a transformation on the hyperspectral image data is performed, which is commonly known as spectral decomposition or spectral unmixing. By obtaining a larger number of wavelengths per label, hyperspectral imaging allows better correction for crosstalk, higher dynamic range, the ability to identify unknown spectral sources such as using blind spectral decomposition, and the ability to correct for background contribution, such as those caused by autofluorescence. The following discussion describes spectral decomposition in the context of fluorescence imaging, although similar methods can be applied to other types of labels, such as emitters, absorbers, or scatterers.

There are many methods described for spectral decomposition that treat this transformation as a linear or nonlinear problem, depending on the conditions of data acquisition. For more general and specific information on spectral decomposition or unmixing and specific techniques for the same, reference is made to N. Keshava, "A Survey of Spectral Unmixing Algorithms," Lincoln Laboratory Journal 14(1) 55-78 (2003), which is fully incorporated herein by reference. In various embodiments, the hyperspectral imaging apparatus can model the transformation problem as a linear system. That is, the acquired hyperspectral image data is a linear combination of the emission spectra of individual labels (including autofluorescence) that are present in the sample. If spectral distortions such as smile or keystone are small or have been corrected, each point in the sample can be treated independently of any other point, which makes the computation amenable to parallelization. Various example processes for estimating the amount of each label present are further described herein.

Figure 1C:
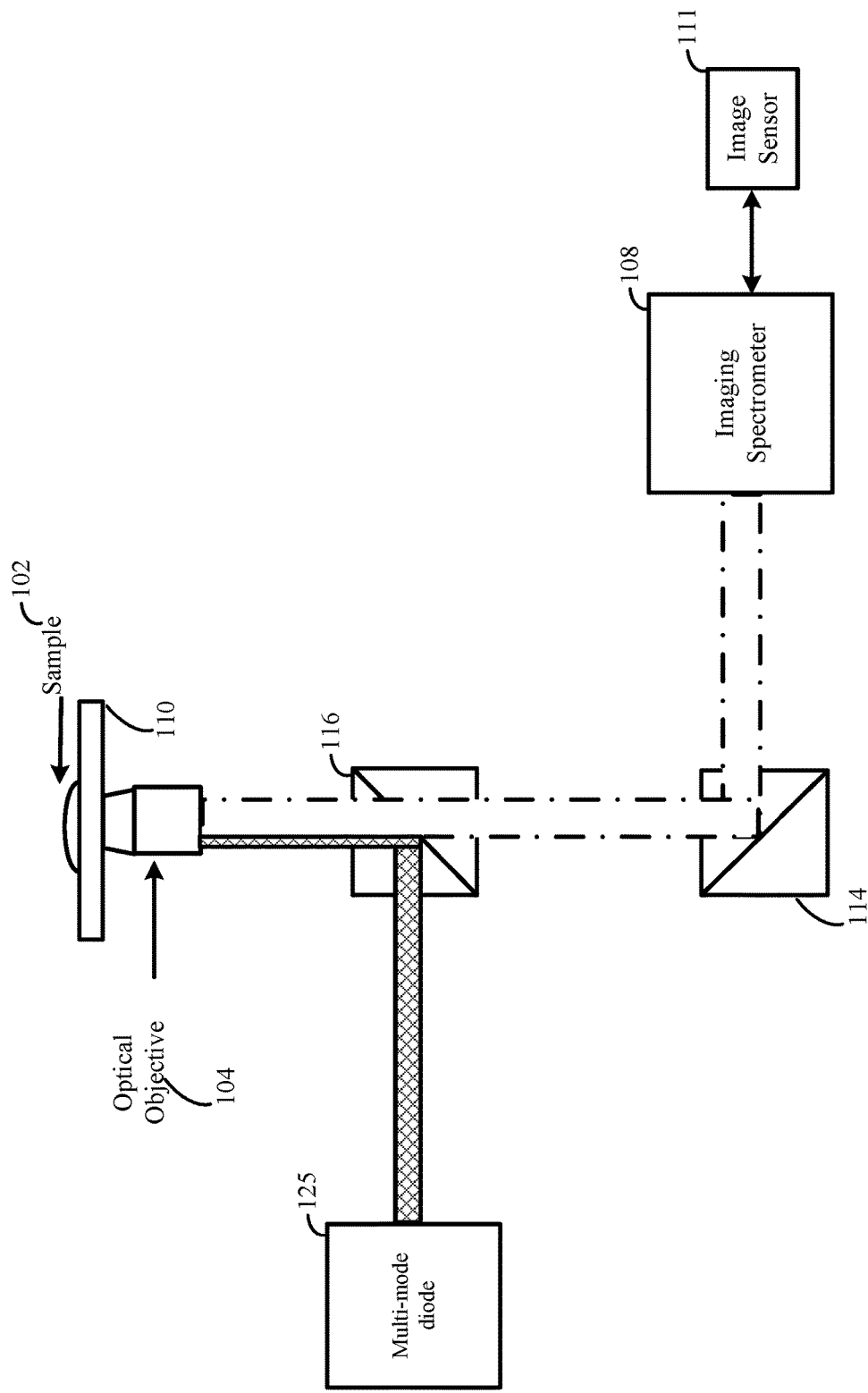

FIG. 1C illustrates an example imaging apparatus which can be used to collect image data at a relatively high speed and high power. The apparatus illustrated by FIG. 1C can include the apparatus and its various components as illustrated by FIG. 1A in various embodiments, however embodiments are not so limited. As illustrated, the imaging apparatus includes a multi-mode laser diode 125. The multi-mode laser diode generates optical power for delivery at the molecular sample 102. The light emitted from the multi-mode laser diode 125 can be filtered or focused to an illumination line, which can provide reduced sensitivity to out-of-focus light and reduce wasted light. Further, as with the light source 106 of FIGS. 1A and 1B, the multi-mode laser diode can generate sufficient power for delivering at least 100 milliwatts (mW) of optical power at the molecular sample 102. In various embodiments, the imaging apparatus can include a light source arrangement having a plurality of light sources, and at least one of the plurality of light sources including the multi-mode laser diode 125.

As previously described in connection with FIG. 1A, the light emitted from the multi-mode laser diode is transmitted along an optical pathway to the molecular sample 102. Light emitted from the molecular sample, as illuminated by the optical power, is provided along an emitted-light optical pathway from the molecular sample 102 to the imaging spectrometer 108 that separates the light into a plurality of different component wavelengths. The image sensor 111 collects the light emitted along an optical pathway corresponding to the plurality of different component wavelengths, and, in certain embodiments, thereby improving or optimizing an otherwise obtainable or achievable data acquisition rate of images of the molecular sample. The data acquisition rate includes or refers to the rate of acquiring and/or outputting hyperspectral image data. The improvement of the data acquisition rate can be relative to an apparatus using a different type of light source and/or lower levels of optical power.

Although not illustrated by FIG. 1C, control circuitry, as previously described and illustrated by FIG. 1A, is arranged with the image sensor 111 and used to scan the molecular sample 102. Similar to FIG. 1A, the control circuitry can scan the molecular sample 102 by causing the image sensor 111 to scan the molecular sample 102 while maintaining alignment of the imaging spectrometer with the image sensor 111 (and/or the source of emitted light), and collecting hyperspectral image data of the molecular sample from the collected light emitted corresponding to the plurality of different component wavelengths. An optical system can be arranged to focus the generated optical power from the multi-mode laser diode 125, e.g., the light profile, into an illumination line and delivering the illumination line at the molecular sample 102. An optical system includes or refers to a part of an optical device or apparatus which acts upon light passing through the device or apparatus, and which can contain one or more optical elements, such as a lens, a prism, a grating, and a mirror.

In specific embodiments, the control circuitry can further scan the molecular sample by causing the image sensor 111 to scan the molecular sample 102 while maintaining alignment of fast and slow axes of the multi-mode laser diode 125 to provide the optical power to a (narrow) illumination line and reduce out-of-focus light and/or wasted light. The axes of the multi-mode laser diode are further illustrated and described below in connection with FIGS. 2A-2B.

In some embodiments, the apparatus further includes an optical slit that is aligned to the axes of the multi-mode laser diode 125. The optical slit can filter the light emitted, reflected, transmitted or scattered to one more lines at different regions imaged. The optical slit can be aligned with fast and slow axes of the multi-mode laser diode to filter the emitted light and reduce out-of-focus light.

An optical slit, in accordance with a number of embodiments, can have a variety of variations. For example, the optical slit can be manually adjusted by a user and/or adjusted via the control circuitry. In specific embodiments, the control circuitry can adjust a width of the optical slit based on an image mode of the imaging apparatus and an exposure time. In other embodiments, the apparatus includes a plurality of optical slits and/or an optical slit with a plurality of slits. A slit or slits of fixed width may be used as shown in FIG. 17A Each of the slits (whether one optical slit or many) can be arranged along the optical pathway of the light emitted, reflected, transmitted or scattered from the molecular sample 102 to filter the light to one or more lines.

The collected hyperspectral data can be further processed, such as by additional processing circuitry used to parallelize processing of the data from the hyperspectral imaging apparatus. The processing circuitry can transform the hyperspectral image data into data that is representative of a quantification of emitters, absorbers, and/or scatterers present in the molecular sample by performing spectral decomposition of spectra intensities of the different component wavelengths into the quantification of emitters, absorbers, and/or scatterers present using a parallelized process. The processing can also include correcting for the spectral dependence of light throughput quantum efficiency, as further described herein.

As previously described, the light emitted from the multi-mode laser diode 125 (and other light sources in various embodiments) may not be uniform. In such embodiments, the control circuitry and/or the additional processing circuitry can correct for the non-uniform intensity pattern. In some embodiments, control circuitry calibrates illumination of the hyperspectral image data by identifying a non-uniform intensity pattern of the optical power of the multi-mode laser diode 125 and using the non-uniform intensity pattern to calibrate the illumination of the hyperspectral image data. The non-uniform intensity pattern(s) can be identified using a process as further described herein. The additional processing circuitry can further correct for distortions corresponding to the hyperspectral image data including performing smile and keystone corrections.

In specific embodiments, the control circuitry can control movement of the molecular sample 102 in a direction of an illumination line of the multi-mode laser diode 125, and for each pixel in the direction, collecting the light emitted that corresponds to the plurality of different component wavelengths. The control circuitry can then identify the non-uniform intensity pattern. For example, the pattern can be identified by identifying a section of the molecular sample with a fluorophore (or other label) excited by the multi-mode laser diode 125, controlling movement of the molecular sample in a direction of a illumination line and, for each pixel in the direction, collecting the light emitted that corresponds to the plurality of different component wavelengths associated with a section of the molecular sample, and identifying the non-uniform intensity pattern corresponding to the multi-mode laser diode 125 using the collected plurality of different component wavelengths of each pixel in the direction of the illumination line.

Figure 1D:
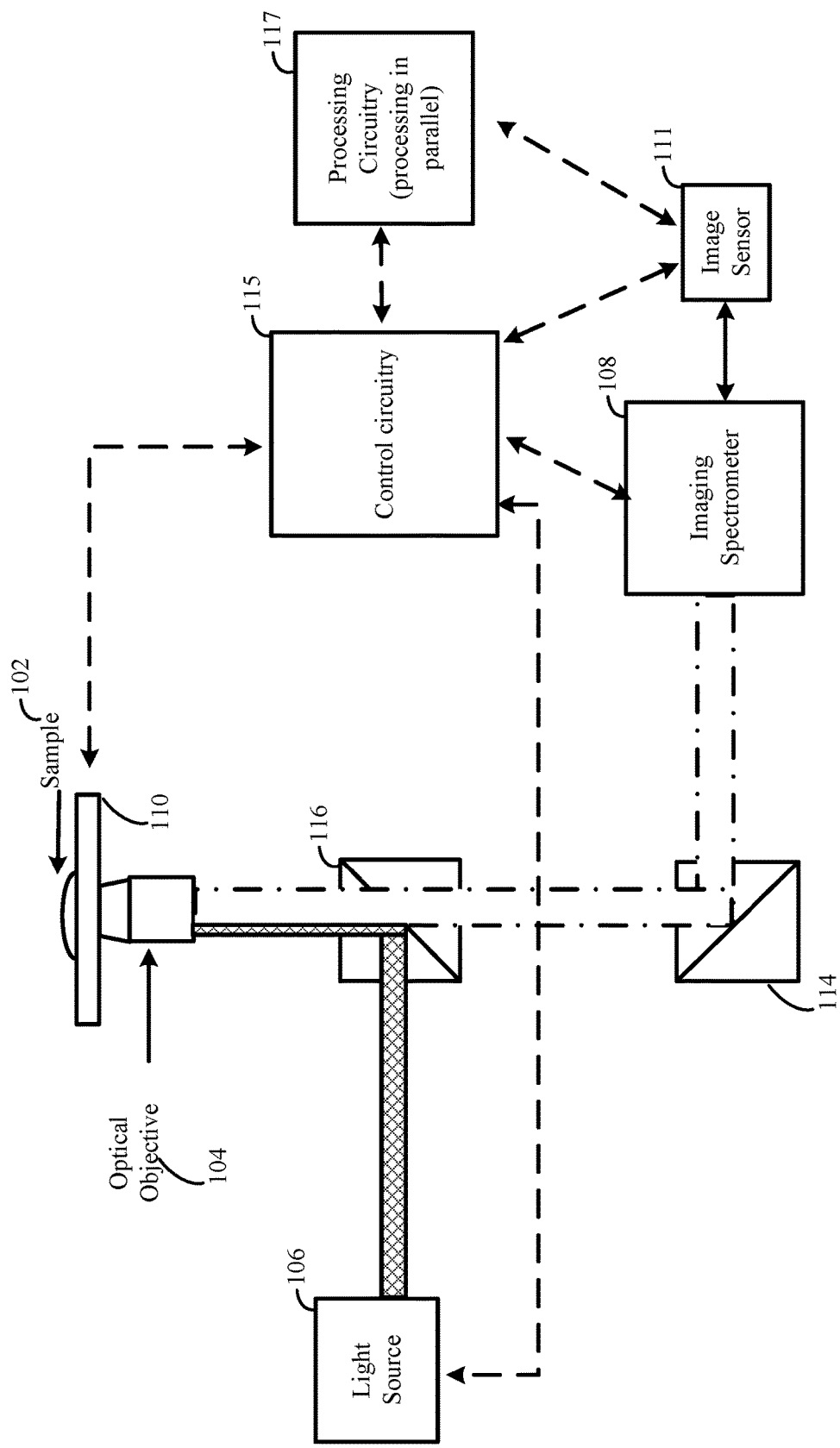

FIG. 1D illustrates an example imaging apparatus which can be used to collect image data at a relatively high speed and high power. The apparatus illustrated by FIG. 1D can include the apparatus and its various components as illustrated by FIG. 1A in various embodiments, however embodiments are not so limited. For example, the apparatus can include a light source 106 that generates optical power for delivery at a molecular sample, an imaging spectrometer 108 that separates light emitted from one or more regions of the molecular sample as illuminated by the optical power into a plurality of different component wavelengths, an image sensor 111 that collects the light emitted along an optical pathway corresponding to the plurality of different component wavelengths, control circuitry 115, and processing circuitry 117. The light source 106 can generate sufficient power for delivering at least 100 milliwatts (mW) of optical power at the molecular sample and can be focused into an illumination line onto the molecular sample 102 using an optical system, as previously described.

The control circuitry 115 is arranged with the image sensor 111 to scan the molecular sample 102. For example, the control circuitry 115 can cause the image sensor to scan the one or more regions of the molecular sample 102 while the imaging spectrometer 108 is aligned with the image sensor 111 and collect hyperspectral image data between a range of 200-1000 nm of the molecular sample from the light emitted that corresponds to the plurality of different component wavelengths. As previously described, the collected hyperspectral image data can include the spectra emissions or spectral component estimates. Further, as described further herein, the control circuitry 115 can cause the image sensor to oversample the different component wavelengths to obtain more than one wavelength per emitter, absorber, or scatterer. The control circuitry 115 can cause the image sensor 111 to sample light emitted that corresponds to the plurality of different component wavelengths of the one or more regions of the molecular sample 102 a plurality of times.

As previously described, processing circuitry 117 can be used to process the data output from the apparatus in parallel. The processing circuitry 117 can include multiple processing circuits, which can be internal and/or external to the imaging apparatus. In some embodiments, at least one processing circuit can be internal to or a part of the control circuitry 115 (or another processing circuit) and another circuit can be external to the control circuitry 115, such as a GPU. The image sensor 111 can provide the hyperspectral image data which is indicative of the plurality of different component wavelengths along a data carrying path to the parallelized processing circuitry, and in specific embodiments, can provide the data at a rate of at least 100,000,000 wavelength-pixel measurements per second for a period of at least ten seconds.

The processing circuitry 117 performs an image processing pipeline by transforming the hyperspectral image data into data that is representative of a quantification of emitters, absorbers, and/or scatterers present in the one or more regions molecular sample. And, in certain embodiments, thereby improving or optimizing an otherwise obtainable or achievable data acquisition rate and/or data processing rate of images of the molecular sample. The data processing rate includes or refers to the rate of acquiring and/or outputting data representative of the quantification of labels. The improvement of the data acquisition rate and/or processing rate can be relative to an apparatus using lower levels of optical power and/or processing the data in a non-parallel manner. For example, the processing circuitry 117 can transform the hyperspectral image data by performing decomposition of spectra intensities of the different component wavelengths into partial emitters, absorbers, and/or scatterers quantifications and decomposition of the partial emitters, absorbers, and/or scatterers quantifications into the emitters, absorbers, and/or scatterers quantifications. Partial quantifications include or refer to relative concentrations of labels present in the sample, and which can be impacted by distortions or imperfections in the hyperspectral image data. Quantification of the labels includes or refers to a representation of a nominal or absolute value of the labels present in the sample. In specific embodiments, the processing circuitry can perform the image processing pipeline at the rate of at least 100,000,000 wavelength-pixel measurements per second and for at least ten seconds.

The hyperspectral image data that is acquired by the hyperspectral imaging apparatus may be imperfect. For the hyperspectral line scanning apparatus, the data may contain distortions such as keystone and smile, as well as pixel misregistrations due to variation in the point spread function (PSF). It also reflects any non-uniformity of the illumination line that illuminates the sample. Furthermore, the intensities acquired by the image sensor are impacted by the change in optical efficiency of the emitted light path or quantum efficiency of the image sensor as a function of wavelength. In addition, in order to be useful to the end user, who is interested in an image where each channel of the image corresponds to a single label, spectral decomposition of the hyperspectral data acquired is performed.

A transformation on the hyperspectral data is performed, which can be referred to as spectral decomposition or spectral unmixing. The following discussion describes spectral decomposition in the context of fluorescence imaging.

The following is a detailed example process for estimating the amount of each label present in molecular sample imaged. For each sample point, a determination of the quantity of each label present in that sample point is made. One such method, called the "unconstrained least squares method" is described below. In this method, the data model is first described. EQ. 1 describes this data model:

$$P_m(\lambda) = \Sigma_{k=1}^{K} a_k P_k(\lambda) + n(\lambda) \quad \text{EQ. 1}$$

In EQ. 1, $P_m(\lambda)$ is the measured signal of the hyperspectral data for a given sample point at wavelength $\lambda$. K is the number of possible labels present in the measurement. $P_k(\lambda)$ is the normalized spectrum of the kth component at wavelength $\lambda$; $a_k$ is the contribution (coefficient, proportional to the label concentration) of the kth label, where $a_k \geq 0$; and $n(\lambda)$ is the measurement noise at wavelength $\lambda$. Normalization can be used to ensure consistent interpretation of the estimated contribution of each label. Various normalization functions may be utilized, such as unit power normalization where $\int_\lambda P_k(\lambda)d\lambda = 1$ or unit peak normalization where max$\{P_k(\Delta)\} = 1$.

In this model, it is assumed that the measured signal of the hyperspectral data at a specific wavelength is a summation of K components where each component results from how much each of the K labels is contributing to the measured signal at that wavelength. Each label has its own characteristic spectral response, that is its emission spectrum is known a priori. For each measurement, a certain portion (represented by the coefficients $a_k$) of each label's spectrum contributes to the total signal. By acquiring the measurements and by knowing the a priori components, using the least-squares method, an estimate of the coefficients may be found. The method is explained briefly below.

Starting with EQ. 1, L unique wavelengths can be analyzed for each sample point measurement. The number of unique wavelengths to analyze may be chosen depending on the spectral extent of the set of labels, the number of labels, and the degree of spectral overlap between the labels. For the hyperspectral line scanning apparatus, L can be varied by changing the region of interest and/or by binning pixels in the image sensor. For the hyperspectral staring apparatus, the wavelength region can be constrained using optical filters to limit the long and short wavelengths and the shortest wavelength can be varied by changing the optical path distance between samples. In both cases, the pixel integration time can be varied to maximize the dynamic range without saturating the image sensor. EQ. 1 can be used to then write out L equations, one for each wavelength measurement. This set of equations can be written in a matrix form. In general, EQ. 1 is an over determined system of equations, as there are more equations (equal to the number of spectral pixels) than unknowns (the number of labels in the sample). Under the assumption of zero-mean measurement noise, the unconstrained least squares (LS) estimate of the component contribution levels is given by EQ. 2. The process of going from the matrix to the solution is well known and is not be repeated here.

$$\hat{a}_{LS} = (VV^T)^{-1} Vm \quad \text{EQ. 2}$$

In EQ. 2, $\hat{a}_{LS} = [\hat{a}_{1,LS}, \hat{a}_{2,LS}, \ldots \hat{a}_{K,LS}]^T$ and is a K×1 vector of the estimated contribution levels of the K emission spectra components; $m = [P_m(\lambda_1) \, P_m(\lambda_2) \ldots P_m(\lambda_L)]^T$ and is an L×1 vector containing the measurements made by the hyperspectral imaging apparatus at L unique wavelengths; and $$V = \begin{bmatrix} P_1(\lambda_1) & P_1(\lambda_1) & \ldots & P_m(\lambda_1) \\ P_2(\lambda_1) & P_2(\lambda_2) & \ldots & P_m(\lambda_2) \\ \vdots & \vdots & \ldots & \vdots \\ P_K(\lambda_1) & P_K(\lambda_2) & \ldots & P_K(\lambda_L) \end{bmatrix}$$

is a K×L matrix, where each row contains the known normalized spectrum of each label evaluated at a specific wavelength. As a reference, when the noise is spectrally flat, zero-mean and Gaussian, the unconstrained least squares solution is also the maximum likelihood solution. It has been discovered that the unconstrained least-squares solution performs well when the labels present are known. It is also to be noted that more complex solutions such as constrained least-squares solution may also be utilized. Regardless of the type of algorithm used, these techniques provide a way to reduce the amount of data transmitted downstream. Thus an estimation of the coefficients $a_k$ are calculated and transmitted for further processing to the processing circuitry 117.

Various embodiments are directed to a hyperspectral staring apparatus. For staring imaging applications such as endoscopy, latency is crucial, and in one embodiment, processing can be performed with low latency with a Field Programmable Gate Array (FPGA).

As noted above, the FPGA receives frames from the high-speed image sensor and processes these frames to calculate the spectral component estimates $\hat{a}_{LS}$. The FPGA applies the matrix C as defined by EQ. 3 below, to the incoming data:

$$C = \begin{bmatrix} C_{1,1} & \cdots & C_{1,L} \\ \vdots & \ddots & \vdots \\ C_{K,1} & \cdots & C_{K,L} \end{bmatrix} = (VV^T)^{-1}V \quad \text{EQ. 3}$$

The image sensor can be configured to read out the consecutive line vectors m, where a unique m corresponds to a unique position offset along the optical slit (scanning system) or row/column number (staring system). The members of each line vector m can be clocked into the FPGA in sequence from $P_m(\lambda_1)$ to $P_m(\lambda_L)$ and processed by a structure shown in FIG. 21D. For this structure, the required multiply-accumulate (MAC) rate is K times the pixel rate. Briefly in this figure, $m_1 \ldots m_L$ are the elements of m as defined above, the C matrix is held in a storage block within the FPGA. As the elements of m are read into the FPGA, they are multiplied by the corresponding elements of the C matrix. The results are accumulated in the accumulator register. The estimates $\hat{a}_{1,LS} \ldots \hat{a}_{K,LS}$ are calculated as described above and sent to the processing circuitry 117.

To prove out the implementation, in an experimental embodiment, a Vision Research Phantom 7.3 camera can be used to feed directly into a 4DSP VP780 FPGA processor board. Other cameras and FPGA boards can also be used. The maximum data rate for this camera is 1.7 GB/s. Allowing for 2-byte pixels and some overhead in the data protocol, about 800 million data points per second are read out and input into the FPGA. With a net pixel rate of about 800 million data points per second and K=10, the total complexity to implement the above-described hardware can be 8 Giga-MAC/s. The FPGA has ample resources, both computational and storage, for the processing as well as the Fourier processing described later.

In another embodiment of the hyperspectral line scanning apparatus, GPUs are utilized for performing spectral decomposition. As discussed above, one can acquire the label emission spectra matrix, V, ahead of time. Since this matrix is fixed, the matrix C can be computed and stored in memory on the GPU, such as shared memory for NVIDIA GPUs. Then, when acquiring hyperspectral data using the imaging spectrometer, successive frames can be acquired in a buffer. Once the buffer is full, the data in the buffer can be transferred from the host (e.g., main memory) to the GPU (e.g., device memory). Each column of the image data can be assigned, $P_{m(\lambda)}$ to a separate thread, since each sample point can be treated independently of any other sample point. The thread can compute the matrix multiplication to arrive at the quantification of labels $a_k$ at each point on the sample.

In various embodiments, methods that do not require a priori knowledge of the label spectra or impose additional constraints on spectral decomposition may be used. These methods have the ability to recover the label spectra from the hyperspectral data based on a variety of algorithms with a variety of names such as blind spectral decomposition, non-negative least squares, non-negative principal component analysis, fuzzy K-means partitions algorithm, independent component analysis, or penalty-based shrink-wrapping. For more general and specific information on decomposition, reference is made to N. Keshava, "A Survey of Spectral Unmixing Algorithms," Lincoln Laboratory Journal 14(1) 55-78 (2003); H. Shirakawa and S. Miyazaki, "Blind spectral decomposition of single-cell fluorescence by parallel factor analysis," Biophys. J. 86, 1739-1752 (2004), each of which are incorporated by reference in their entirety. High speed hyperspectral imaging can rapidly acquire large data sets. The larger data sets provide a more strongly overdetermined inverse problem and can allow better recovery of the spectral components. This can be beneficial in avoiding collection of individual spectra in advance or in imaging with labels that may vary in spectral response (e.g., quantum dot emission spectra depend on the size of the quantum dots and may vary from batch to batch, and autofluorescence may be sample dependent).

In various embodiments, a post-analysis step can be implemented to determine if the estimates $\hat{a}_{1,LS} \ldots \hat{a}_{K,LS}$ are acceptable. Various criteria may be utilized to determine acceptability. As an example, the estimates may be compared to one or several thresholds and if the estimates fall within the acceptability criteria, the estimates are output to a host computer. One example of a threshold is a minimum value threshold—the estimates may be compared to this minimum and if the estimate is above a certain value, then the estimate may be passed along to the host computer. The threshold may be different for each wavelength. Also, the threshold may be adjusted depending on the labels analyzed, or the lighting conditions. The acceptability criteria can be modified by preset programs or through a user interface.

In other embodiments, the incoming measurements m can be analyzed during preanalysis, to determine the acceptability for further processing. Here again, various criteria may be utilized to determine acceptability. For example, if all the elements of m are zero or less than a threshold value, then further analysis may not be carried out and the next location in the object is analyzed. In another example, a fast pre-scan can be performed to determine the locations of objects in the image field. For the pre-scanning, a different algorithm may be used within the FPGA or other type of processing circuit to determine if an object is present at a specific location. The locations of the objects may be stored in memory. When the scanning for analysis is performed, if an object is not present at a location, the detailed analysis as expressed in EQ. 1-3 may not be carried out. This type of analysis may result in an increased throughput.

In various specific embodiments, the bit width can be reduced. In general, for K spectral components and n bits per component, each pixel can use K*n bits. However, if some spectral components are below a threshold at which they are primarily noise, one can reduce the number of bits per pixel. This uses additional bits to indicate which components are present, but reduces the data requirement overall. Data compression is advantageous because it reduces the data transfer and storage requirements.

In a number of embodiments, the imaging apparatus allows for rescanning. If the analysis determines that a specific location contains an object, but the results are deemed inappropriate based on some criteria, then that specific location can be rescanned. As an example, if it is determined by the post-analysis block that the estimate is unreliable due to noise, then light source power can be commanded to emit more light. In addition, the integration time can be lengthened. With these or other similar techniques, the noise could be diminished.

The concept of rescanning may be utilized in other ways. Depending on objects in the imaging field, the acquisition parameters such as, but not limited to the speed of scanning, and the resolution, may be modified. These parameters may be modified as a result of a pre-scan or previously referred to as a "two-scan" approach. Using this result, the speed and resolution can be determined for each object or imaging sub-section. During the scanning for analysis, the information from the pre-scan can be used to change the acquisition parameters.

The imaging apparatus illustrated by FIG. 1D, in various embodiments, can be used to perform various post-processing steps. The post-processing steps, as previously and further described herein, can include phase correction, quantum efficiency correction, optical system spectral efficiency correction, correction of distortions (e.g., keystone, smile, misregistrations), and correction of the non-uniform intensity patterns attributable to a light source. For example, the processing circuitry 117 (and/or the control circuitry 115) can calibrate illumination of the hyperspectral image data using a non-uniform intensity pattern attributable to the light source by performing decomposition of measured spectral intensities of the different component wavelengths into emitter, absorber, and/or scatterer intensities, and adjusting for optical power of the light source based on a non-uniform intensity pattern. The processing circuitry 117 and/or the control circuitry 115 identify the non-uniform intensity pattern for each of a plurality of light sources, in specific embodiments. For example, the processing circuitry 117 and/or control circuitry 115 can control movement of the molecular sample in a direction of an illumination line of and/or associated with the light source and, for each pixel in the direction, collect the light emitted that corresponds to the plurality of different component wavelengths, and identify the non-uniform intensity pattern corresponding to each of the plurality of light sources using the collected light emitted for each pixel in the direction of the illumination line.

In related embodiments, the processing circuitry 117 can revise the hyperspectral image data to account for a variation in quantum efficiency of the image sensor. The quantum efficiency of the image sensor can vary with wavelengths of the plurality of different component wavelengths. More specifically, the processing circuitry 117 can model the quantum efficiency variation of the image sensor over an electromagnetic spectrum and correct for the quantum efficiency variation using the model. As an example, the processing circuitry 117 can model the quantum efficiency variation by obtaining nominal values for the quantum efficiency of the image sensor over an electromagnetic spectrum, wherein the electromagnetic spectrum is at a spectral region that is measured by each spectral pixel in a region of interest of the image sensor. Similar methods may be applied to correction for the variation in the spectral efficiency of the emitter light pathway.

The above described apparatuses illustrated by FIGS. 1A-1D (as well as FIG. 1E) can be used for both a line-scanning and staring scanning approaches. Such apparatus can be used for delivering at least 100 milliwatts (mW) of optical power focused into an illumination line at a molecular sample for line-scanning approach. For staring approaches, the light profile emitted from the light source(s) may not be focused into an illumination line. The image sensor 111 collects the light emitted along an optical pathway that corresponds to plurality of different component wavelengths and provides data indicative of the plurality of different component wavelengths along a data carrying path to control circuitry and processing circuitry at a rate of at least 100,000,000 wavelength-pixel measurements per second for a period of at least ten seconds. The collected hyperspectral image data of the molecular sample from the light emitted that corresponds to the plurality of different component wavelengths can be within a range of 200-1000 nm. Further, the image processing pipeline can be performed by the processing circuitry at the rate of least 100,000,000 wavelength-pixel measurements per second. For line scanning approaches, the imaging apparatus can either prevent or mitigate smile and keystone present in the data or correct for the same. For staring approaches, the processing circuitry can account for phase distortions present in the hyperspectral image data. Additionally, for staring approaches, the processing circuitry can provide the data representative of the quantification of emitters, absorbers, and/or scatterers present in the molecular sample to the display with a latency of less than 250 milliseconds.

As further described herein, the imaging apparatus illustrated by FIG. 1D (as well as those illustrated by FIGS. 1A-1C) can be used to perform a mixed or hybrid method of spectral decomposition. The mixed method can include processing circuitry performing the image processing pipeline by using a first technique including an ordinary least squares method, and, in response to sampled data points producing negative label quantities or exhibiting residual error outside a threshold error as determined using the first technique, using a second technique. The first technique, such as an ordinary least squares technique can include a fast spectral decomposition relative to the second technique. The more time-consuming second technique can be used for sample points that produce negative numbers or exhibit residual error above a threshold level using the first technique.

Hybrid methods may be advantageous when the spectra are recovered from a portion of the image and then applied to the remainder of the image, a strategy that allows blind spectral recovery at the expense of processing speed initially, but allows for faster processing for the rest of the image. Blind spectral recovery can be particularly advantageous for applications on molecular samples where tissue or cell autofluorescence or absorption may vary from sample to sample.

Another example where a hybrid method can be beneficial is when the ordinary least squares method produces negative coefficients for the estimated emitter, absorber, or scatterer concentrations, $\hat{a}_{LS}$. The coefficients cannot be negative as physical systems cannot have a negative quantity of an emitter, absorber, or scatterer in a sample. In this scenario, the sample point that produced negative coefficients can be flagged, and the raw hyperspectral data can be retained for re-processing at a later time, such as when the sample scan is complete. When the system is ready to re-process the data from these flagged sample points, other methods can be applied, such as non-negative least squares, which are iterative in nature and not amenable to real-time processing.

Additional conditions that can prompt the usage of hybrid methods for spectral decomposition include cases in which the residual error of the decomposition is above a specific threshold, or when the raw hyperspectral data is partially or completely saturated. In these scenarios, it may be useful to remove the assumption that sample points can be treated independently of one another. In other words, the label quantification estimates from adjacent sample points can be used to aid in the estimation of label quantification. An example can be to interpolate the quantity of a specific emitter, absorber, or scatterer using data from neighboring sample points, particularly if the raw hyperspectral data of the sample point in question is saturated in a spectral region that coincides with the label's emission spectrum.

In an idealized system, the hyperspectral imaging apparatus can image the sample without any aberrations, distortions, or pixel misregistrations. The apparatus can perfectly separate a spatial pixel on the sample onto a column of the image sensor 111. However, in many instances, when an imaging spectrometer 108 separates light onto an image sensor, a number of phenomena can occur. In accordance with a number of embodiments, the processing circuitry 117 can transform the hyperspectral imaging data by revising the data to account for noise and/or distortions presents. The noise and/or distortions can include keystone and smile phenomena, phase correction, pixel misregistrations, non-uniform illumination, and various combinations thereof. For the hyperspectral line scanning apparatus, these can include keystone and smile. For the hyperspectral staring apparatus, these can include phase corrections, such as wavelength-dependent magnification, barrel, or pincushion variations. Keystone and smile correction are detailed below. One skilled in the art can recognize how similar corrections can be performed for other effects.

Keystone distortions refers to or includes a change in optical magnification with respect to wavelength. More specifically, keystone distortions involve a spatial shift between spatial pixels in the sample at different wavelengths. This can be visualized in FIG. 9A below. Smile distortion refers to or includes a wavelength shift in the across-track direction of the array. More specifically, smile distortions involve wavelength (or spectral) shifts at different spatial pixels. For example, the distortion can result in a change in the central wavelength of a spectral channel as a function of the position in the field of view. Furthermore, any optical blurring in the system, which can be described by the point spread function, may vary spatially and spectrally, resulting in further pixel misregistrations.

While there are optical designs that can mitigate these distortions and misregistrations, the imaging apparatus can correct these distortions via image processing acts. This requires a two-step process: acquisition of calibration data, and correction of the hyperspectral data that is recorded by the image sensor during imaging of the sample. For example, the control circuitry 115 can generate first calibration data indicative of emitters, absorbers, and/or scatterers present in the molecular sample 102 and second calibration data indicative of distortions present in the imaging apparatus. The processing circuitry 117 can perform the image processing pipeline using the first and the second calibration data. However, embodiments are not so limited, and in various embodiments a first processing circuit of the processing circuitry 117 can generate the calibration data and a second processing circuit of the processing circuitry 117 can transform the hyperspectral image data using the calibration data. There are many approaches for acquiring the required calibration data. Below, is an example of one such method for spatial misregistration and spectral misregistration.

For acquiring spatial misregistration calibration data, a polychromatic point source can be utilized for the following steps. First, the point source is set to the first "pixel" of the slit. This can create a curved line on the image sensor, which reflects keystone and spatial misregistrations. The line response function LSF(x, y) is constructed for each pixel on the image sensor, where x is a pixel position along the spatial dimension, and y is a pixel position along the spectral dimension. The line response function measures the relationship between spatial position of the point source, and the intensity of the pixel at position (x, y). The spatial position with the maximum intensity in the LSF(x, y) then becomes the center spatial position of that pixel. This process is repeated for each subsequent "pixel", which can be adjacent to the first pixel or a number of pixels away. If choosing the latter, the keystone can be interpolated at the end of the calibration process.

In some embodiments, for acquiring spectral misregistration calibration data, a monochromatic widefield sources at multiple wavelengths can be used, or a single wavelength-tunable light source. First, the slit is illuminated with the first wavelength. The spectral response function SRF(x, y) is then constructed for each pixel on the image sensor, where x is a pixel position along the spatial dimension, and y is a pixel position along the spectral dimension. The spectral response function measures the relationship between wavelength of the point source, and the intensity of the pixel at position (x, y). The wavelength with the maximum intensity in the SRF(x, y) then becomes the center wavelength of that pixel. This process is then repeated for each subsequent wavelength. If the wavelengths chosen for calibration are several nanometers apart, the smile can be interpolated at the end of the calibration process.

Using the calibration data, the raw hyperspectral data can be re-sampled, R, onto a uniformly spaced grid G, where $\Delta a$ is the image sensor's pixel size, and $\Delta b$ is the average spectral resolution of the imaging apparatus.

The spatial position p and center wavelength $\lambda$ of G(a, b) can be used to interpolate a value of (x, y) in the raw hyperspectral data grid, R, using the calculated spatial position and wavelengths from the calibration data. This can be used as the re-sampled point.

At this point, any number of interpolation methods can be used to determine the correct intensity for G(a, b), including nearest neighbor, bilinear, and bicubic interpolation. This process can be repeated for all points in G. These interpolations can be computed in parallel, as long as each thread has access to the requisite data points from the raw hyperspectral data grid, R.

Various other corrections can be performed using the processing circuitry 117, such as quantum efficiency correction, emitted path spectral efficiency correction, non-uniform illumination correction, phase correction, and/or feedback for improving data resolution. Each is further described herein.

Image sensors generally have quantum efficiencies that vary with the wavelength of light measured. Typically, silicon-based image sensors are more sensitive to the green region of the visible spectrum than to the blue or red regions. If providing the relative quantification of fluorophores, some of which may emit light in the blue, green, or red regions, it can be beneficial to correct for this variable quantum efficiency. Hyperspectral imaging apparatuses have a superior ability to correct for quantum efficiency, since a set of correction factors can be applied that more accurately model the quantum efficiency variation of image sensors over the electromagnetic spectrum.

From the datasheet of the image sensor 111, or experimental data acquired using the image sensor, values between 0.0 and 1.0 for the quantum efficiency of the image sensor 111 can be obtained at the spectral region that is measured by each spectral pixel in the image sensor's region of interest. These values can be normalized, and then the inverse of these values can be stored in a vector q, and used to correct for quantum efficiency. In an example embodiment of the hyperspectral line scanning apparatus, the image sensor's x-axis corresponds to various spatial points on the sample, while the y-axis corresponds to various spectral measurements for a given spatial point on the sample. Once this data is corrected for optical distortions, such as keystone and smile as described above, an element-wise multiplication of each column of the hyperspectral data by q can be performed, the quantum efficiency correction factors. This procedure can be conducted in parallel, as each column of the hyperspectral data can be element-wise multiplied by q by different threads concurrently. Correction for sensor quantum efficiency and emitter optical path spectral efficiency can be performed together as one spectral response function.

This correction is more accurate in hyperspectral imaging, as the length of the vector q corresponds to the number of wavelengths that are being measured. The more wavelengths measured for a constant region of the electromagnetic spectrum, the smaller spectral region each element of q represents. In other words, if the quantum efficiency of an image sensor is modeled as a continuous function, hyperspectral imaging apparatuses are able to more finely sample that function compared to multispectral or conventional imaging apparatuses. This results in more accurate results when applying the quantum efficiency correction factors to the measured hyperspectral data.

When imaging a molecular sample with an image sensor, the resulting signal (e.g. fluorescence, transmitted light) that is detected by the image sensor is proportional to the intensity of illumination. Depending on the optics used for beam-shaping, the resulting illumination line may or may not have mostly uniform illumination. This can be achieved optically using a custom-designed Powell lens, laser line generator, or other optical design. Otherwise, this can be corrected in software by performing an additional calibration step.

To produce a corrected image that reflects the optical properties of the molecular sample, a post-processing step is performed on the images recorded by the image sensor, which is sometimes herein referred to as illumination calibration or non-uniform illumination correction. In various embodiments, no emission filter is present to block any laser light that is reflected back from the sample (although there may be a dichroic filter that blocks some of the laser light). In this case, if imaging an empty area of the sample 102 (e.g., just the slide that holds the sample), reflected laser light can be separated by the imaging spectrometer 108, and the resulting hyperspectral image recorded by the image sensor 111 can reflect the non-uniform illumination of the illumination line.

Figure 1E:
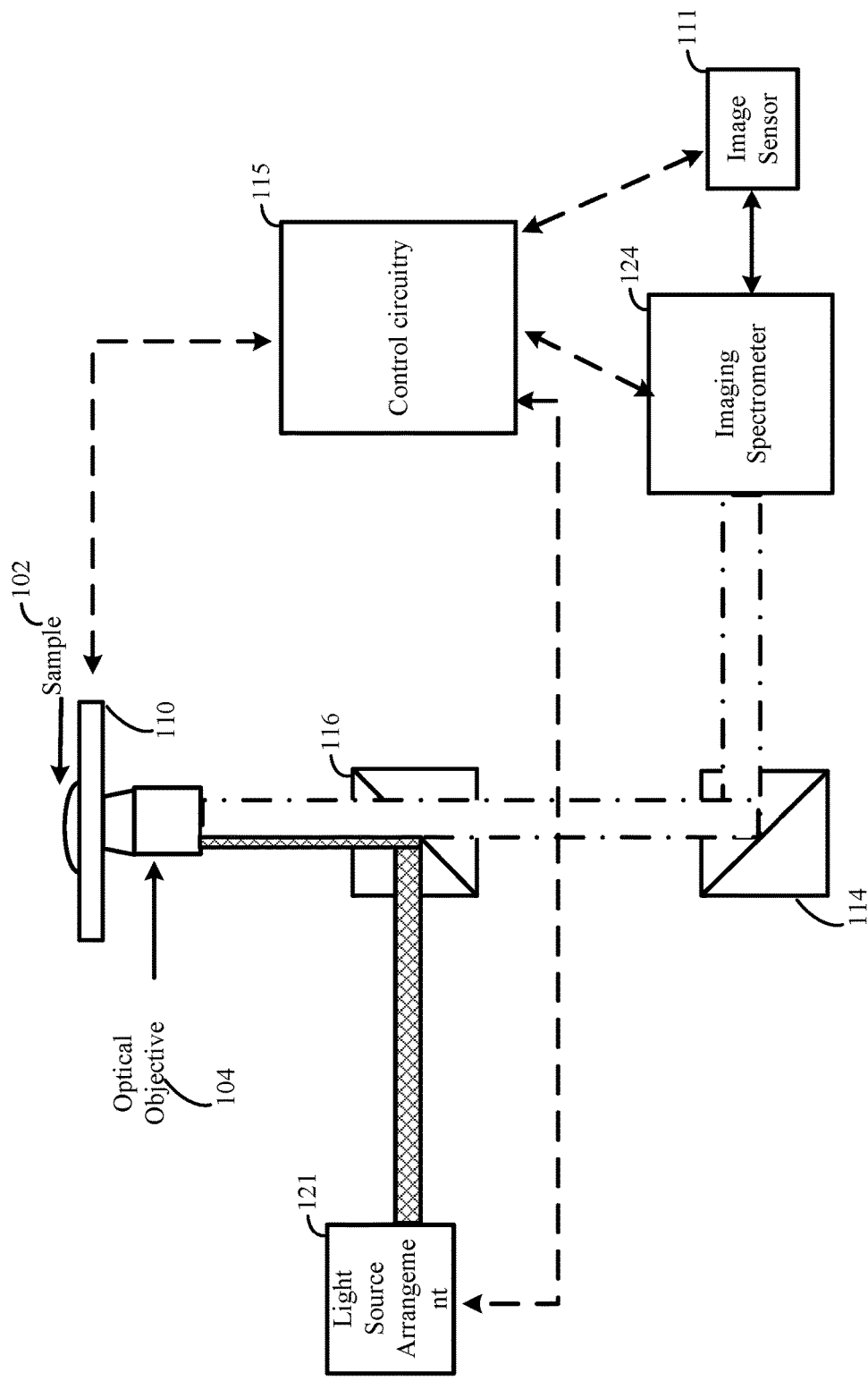

FIG. 1E illustrates an example imaging apparatus which can be used to collect image data at a relative high speed and high power. The apparatus illustrated by FIG. 1E can include the apparatus and its various components as illustrated by FIG. 1A in various embodiments, however embodiments are not so limited. The apparatus can include a light source arrangement 121, an imaging spectrometer 124, an image sensor 111, and control circuitry 115. The light source arrangement 121 includes or refers a device and/or component having a plurality of light sources.

As previously described in connection with FIG. 1A, the light emitted from the light source arrangement 121 is transmitted along an optical pathway to the molecular sample 102. Light emitted from the molecular sample 102, as illuminated by the optical power, is provided along an emitted-light optical pathway from the molecular sample 102 to the imaging spectrometer 124 that separates the light into a plurality of different component wavelengths. The image sensor 111 collects the light emitted along an optical pathway corresponding to the plurality of different component wavelengths. In some specific embodiments, an optical system can be arranged to focus the generated optical power from the light source arrangement 121 into one or more illumination lines and delivering the illumination lines at the molecular sample 102.

The imaging spectrometer 124 can be used to filter the light emitted to a line at one or more different imaged regions. The light source arrangement 121 has at least one light source to generate optical power for delivering a plurality of illumination lines at a molecular sample 102. In response to the at least one light source generating the optical power, the imaging spectrometer 124 separates light emitted from the molecular sample 102 as illuminated by the plurality of illumination lines into a plurality of different component wavelengths. In some embodiments, the imaging spectrometer 124 filters the light emitted to respective lines using an optical system and an optical slit that filters the light emitted, reflected, transmitted or scattered. In other embodiments, the light source arrangement 121 includes a plurality of light sources, and at least two of the plurality of light sources have non-overlapping sets of wavelengths and which effectively results in the light emitted, reflected, transmitted or scattered to be filtered to respective lines corresponding to different regions imaged.

The image sensor 111 collects the light emitted along an optical pathway from the molecular sample 102 that corresponds to the plurality of different component wavelengths. The control circuitry 115 causes the image sensor 111 to scan the molecular sample 102 while the imaging spectrometer 124 is aligned with the image sensor 111, and collects hyperspectral image data of the molecular sample 102 from the light emitted that corresponds to the plurality of different component wavelengths, and, in certain embodiments, thereby improving or optimizing an otherwise obtainable or achievable data acquisition rate of images of the molecular sample. The improvement of the data acquisition rate can be relative to an apparatus that does not filter the light into lines and/or uses lower levels of optical power.

In some embodiments, as further described herein, the optical system and optical slit filters the light emitted to one or more lines. The imaging spectrometer 124 can include a plurality of optical slits used to filter the light emitted, reflected, transmitted or scattered to a respective at a different region imaged (e.g., regions of light). For example, the plurality of optical slits are arranged with the imaging spectrometer 124 to filter the light into different wavelength positions on the image sensor, with each of the plurality of optical slits filtering the light to a particular wavelength position on the image sensor or in other words, to one region imaged. In further specific embodiments, the light source arrangement 121 can include a set of light sources per optical slit of the plurality. For example, the light source arrangement 121 can include two light sources per optical slit of the plurality. In related and specific embodiments, the apparatus includes a plurality of image sensors, with each image sensor being arranged with one of the plurality of optical slits or with a set of the plurality of optical slits. In other embodiments, the light source arrangement 121 includes a plurality of light sources, and at least two of the plurality of light sources have non-overlapping sets of wavelengths which are used to filter the light emitted, reflected, transmitted or scattered to the line at the different regions (e.g., the different wavelength positions on the image sensor). Similarly to other embodiments, one or more of the light sources can generate sufficient power for delivering at least 100 mW of optical power for each of the plurality of illumination lines at the molecular sample.

As previously described, the collected hyperspectral image data can be further processed, such as by an additional processing circuitry used to parallelize processing of the data from the hyperspectral imaging apparatus. The processing circuitry can transform the hyperspectral image data into data that is representative of a quantification of emitters, absorbers, and/or scatterers present in the molecular sample by performing spectral decomposition of spectra intensities of the different component wavelengths into the quantification of emitters, absorbers, and/or scatterers present using a parallelized process, and in some specific embodiments, a parallelized process. The processing can also include correcting for quantum efficiency and/or spectral response, as further described herein.

In various embodiments, light emitted from one or more light sources of the light source arrangement 124 (and other light sources in various embodiments) may not be uniform. In such embodiments, the control circuitry 115 and/or the additional processing circuitry can correct for the non-uniform intensity pattern. In some embodiments, control circuitry calibrates illumination of the hyperspectral image data by identifying a non-uniform intensity pattern of the optical power of the multi-mode laser diode 125 and using the non-uniform intensity pattern to calibrate the illumination of the hyperspectral image data.

Figure 2A:
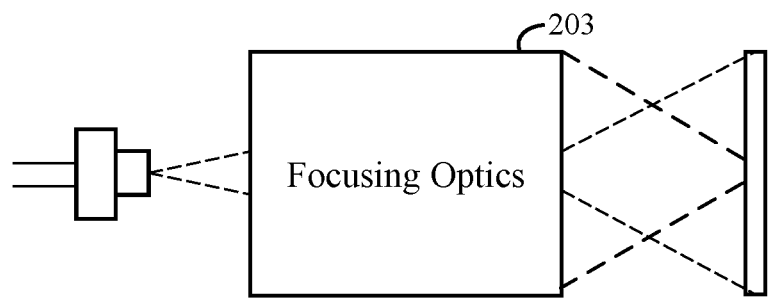
FIGS. 2A-2B show illustrations of axes of a multi-mode laser diode of an apparatus, in accordance with embodiments of the present disclosure.
Figure 2B:
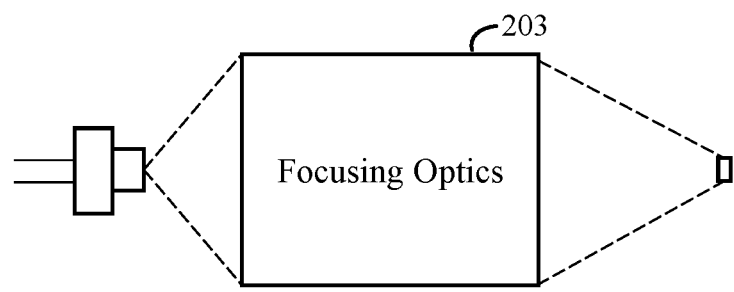

FIGS. 2A-2B show illustrations of axes of a multi-mode laser diode of an apparatus, in accordance with embodiments of the present disclosure. For example, FIG. 2A illustrates the slow axis and FIG. 2B illustrates the fast axis of a multi-mode laser diode as focused by focusing optics. The focusing optics includes or refers to an optical system that acts on passing light by focusing the light. As illustrated, the focusing optics 203 focus the light emitted from the light source to produce an illumination line. The multi-mode laser diode emits several laser beams along the slow axis of the diode. Similarly, although not to the same degree, a single mode laser diode has a line intensity that is not perfectly uniform, and may emit a non-uniform laser intensity (e.g., different intensities of the laser beam). As a result, the intensity pattern of a light source can be non-uniform.

Figure 2C:
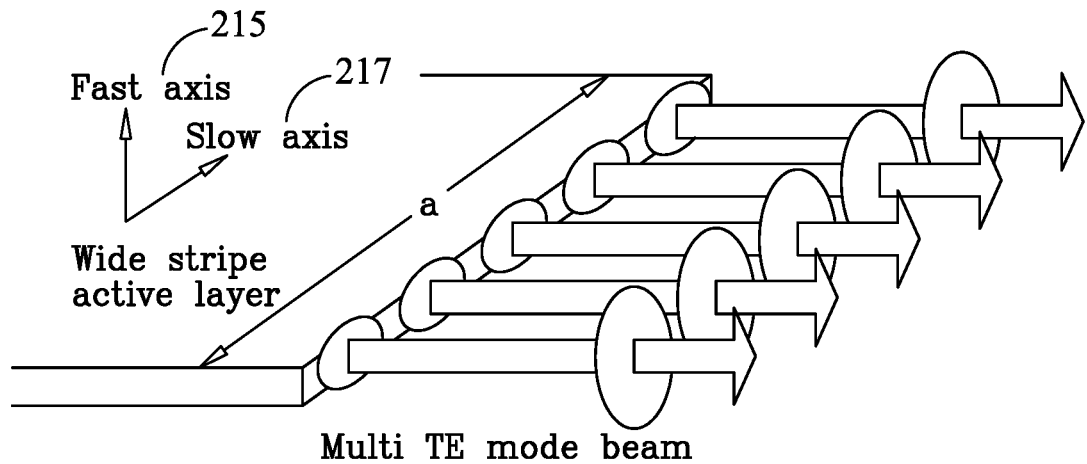
FIG. 2C-2D illustrate examples of multiple modes of a multi-mode laser diode and an example set of activities for an apparatus to calibrate illumination, in accordance with embodiments of the present disclosure.
Figure 2D:
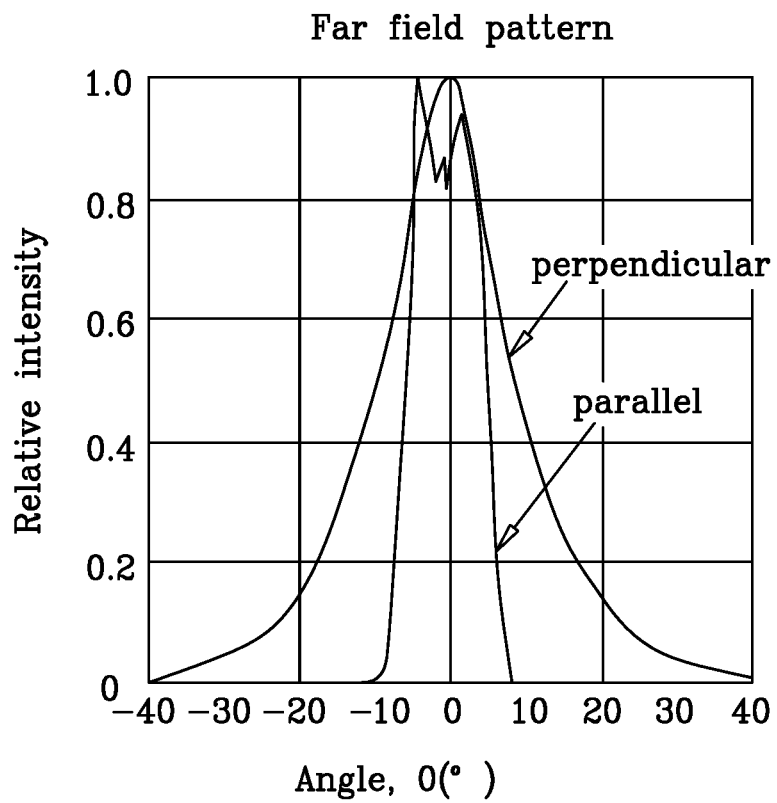

FIG. 2C-2D illustrate examples of multiple modes of a multi-mode laser diode and an example set of activities for an apparatus to calibrate illumination, in accordance with embodiments of the present disclosure. FIG. 2C illustrates an example of a light source having multiple light beams that have different intensities from a multi-mode diode laser. Because the hyperspectral imaging apparatus is fast (e.g., running at 1500 or more FPS), the exposure time of each frame that is recorded is very short (e.g., 1000 ms or less, such as 10 ms or less or 600 microseconds or less). The light sources used provide high power density (e.g., 100 mw to 6 W of power). One option is to use multi-mode laser diodes. As may be appreciated, the descriptor "multi-mode" refers to the fact that the laser diode is actually emitting several laser beams along the slow axis 217 of the diode. As a result, the pattern of the light beam is non-uniform, as illustrated by the far field pattern labeled "parallel" in FIG. 2D. After passing through a collimation lens and a cylindrical lens (or other line focusing optic), the intensity pattern of the illumination line remains non-uniform. Along the fast axis 215, however, the beam quality is nearly Gaussian and diffraction-limited, which makes these diodes an ideal candidate for line imaging.

When imaging a molecular sample with an image sensor, the resulting signal (e.g. fluorescence, transmitted light) that is detected by the image sensor is directly related to the intensity of illumination. Without any correction, the resulting hyperspectral image reflects the variations in illumination attributable to the light sources. To produce a corrected image that reflects the optical properties of the molecular sample, a post-processing step is performed on the images recorded by the image sensor, which is sometimes herein referred to as illumination calibration or non-uniform illumination correction and which is further described herein.

FIG. 3 illustrates an illustration of an efficiency of a diffraction grating and a prism, in accordance with embodiments of the present disclosure. As is illustrated, the efficiency of the prism is consistent and above a threshold for a range of wavelengths between 400-1000 nm. As previously described, the dispersion element used in the imaging spectrometer can impact the amount of fluorescent light that is collected by the sensor. The more light collected, the shorter image sensor exposure times that can be utilized while obtaining a good signal-to-noise ratio, and the faster the hyperspectral imaging system can acquire data from the sample.

Figure 4:
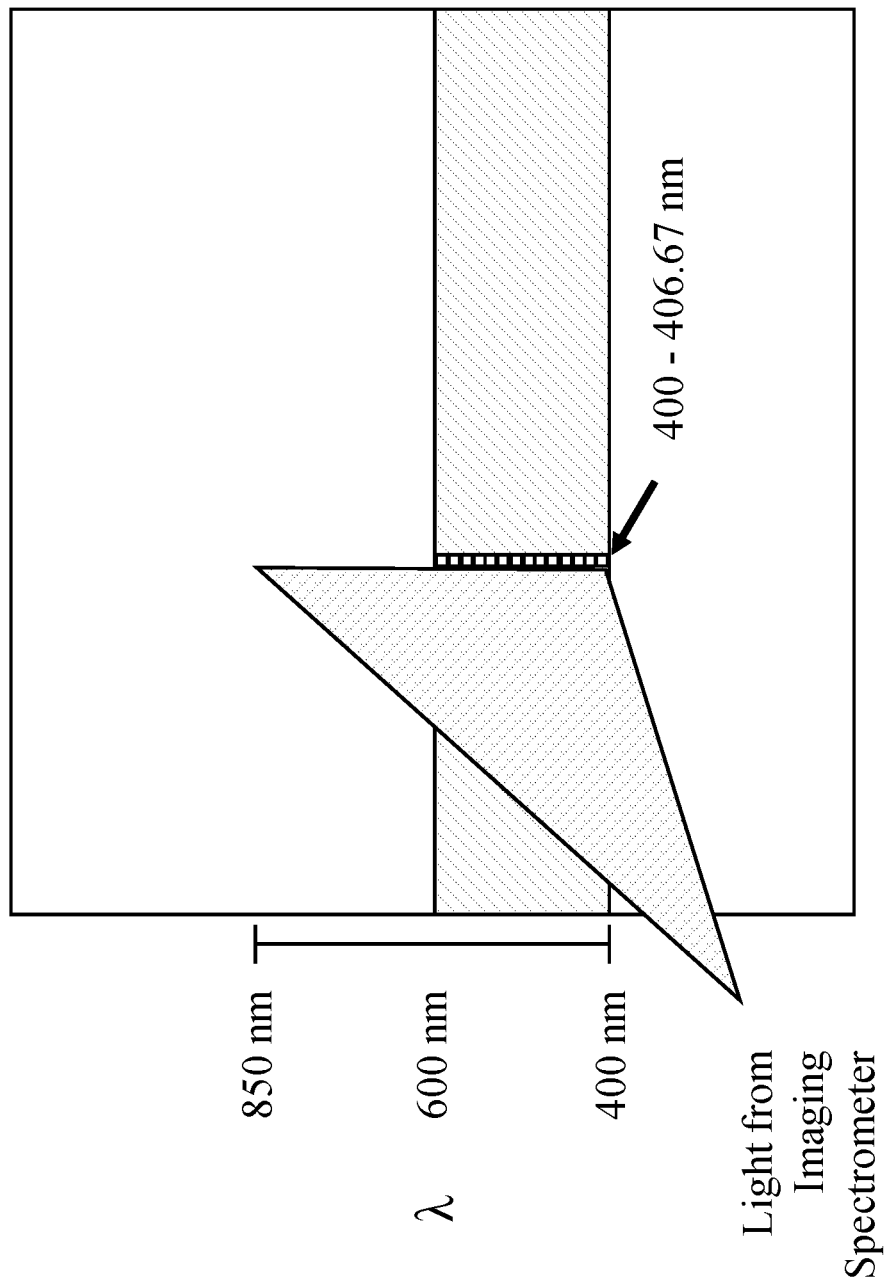
FIG. 4 illustrates an example graph of light from an imaging spectrometer for an imaging apparatus, in accordance with embodiments of the present disclosure.

FIG. 4 illustrates an example graph of light as separated by an imaging spectrometer of an imaging apparatus, such as a scanning apparatus, in accordance with embodiments of the present disclosure. As illustrated the imaging spectrometer separates input light into different component wavelengths. In various embodiments, a region of interest on the image sensor (e.g., a range of the plurality of component wavelengths) can be modified to increase the imaging speed of the imaging the sample.

Figure 5B:
FIGS. 5A-5B illustrate different examples of scanning patterns using an apparatus, in accordance with embodiments of the present disclosure.
Figure 5A:
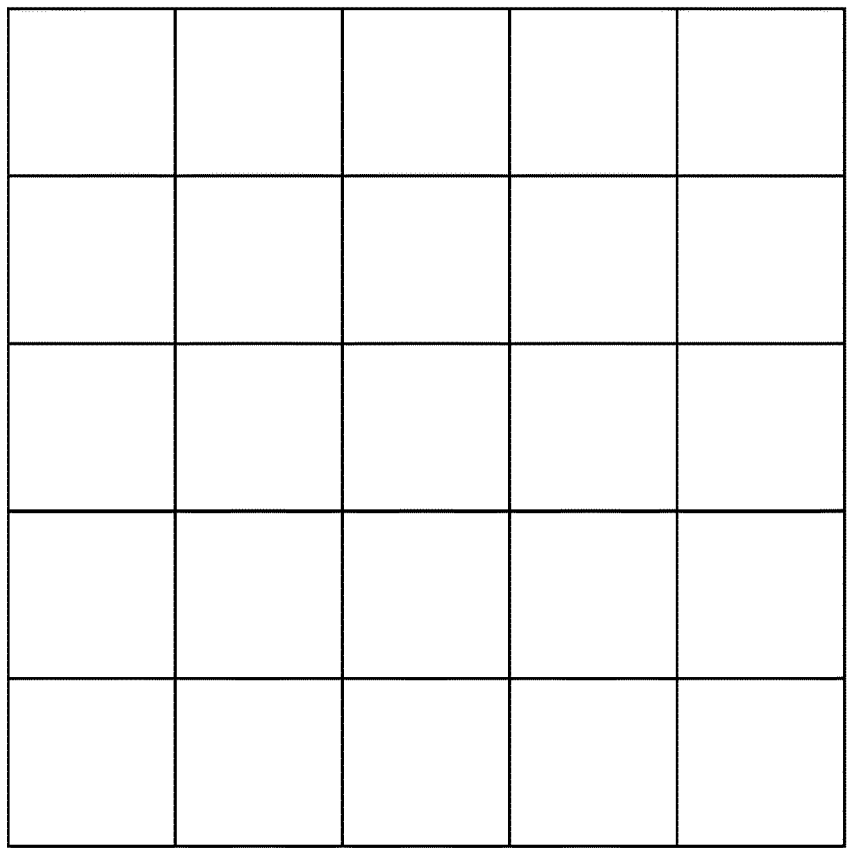

The imaging apparatus, in accordance with various embodiments, can be used to scan a variety of different types of molecular samples. Such molecular samples may be contained in microscope slide, petri dish, microtiter plate, tissue microarrays, etc. FIG. 5A-5B illustrate different types of scanning using an apparatus, in accordance with the present disclosure.

FIG. 5A illustrates an example pattern for performing a staring scan approach. Each square illustrates a section of the molecular sample that is scanned and then the molecular sample is moved relative to the optical objective to scan the next section. In various embodiments, the stage is moved to bring each square into the field of view, which can result in system overhead.

FIG. 5B illustrates an example pattern for performing a line-scanning based scan approach. Each rectangle illustrates a section of the molecular sample that is scanned by moving the stage to capture the entire section (e.g. a strip). The stage then moves to bring the start of the next section into the field of view.

As previously described in connection with FIGS. 1A-1D, hyperspectral imaging apparatuses in accordance with the present disclosure can perform autofocusing while scanning the biological image. Autofocusing is the process by which the imaging apparatus identifies the best focal plane for a given field of view of the sample.

Figure 6:
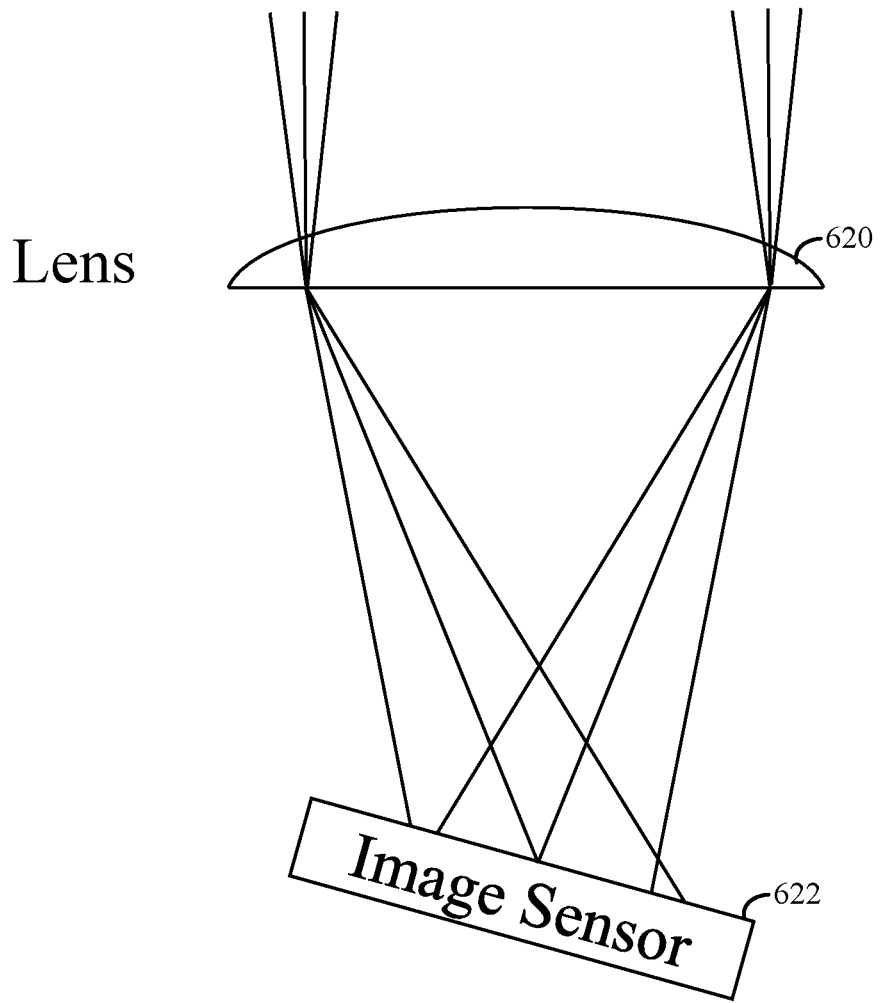
FIG. 6 illustrates an example autofocusing components of an apparatus for generating a hyperspectral image, in accordance with embodiments of the present disclosure.

FIG. 6 illustrates an example autofocusing components of an apparatus for generating a hyperspectral or other images, in accordance with embodiments of the present disclosure. In some embodiments, autofocusing can be performed using an additional image sensor 622 that is at a tilt. A line of light emitted from the molecular sample is directed from the emitted-light optical pathway and imaged onto the autofocusing control module using components, such as a beamsplitter. The autofocusing control module can include a cylindrical lens 620 (or a mirror in some alternative embodiments) and the image sensor 622 with a tilt (which is sometimes herein referred to as the "autofocusing module", for simplicity). The light profile from the emitted-light optical pathway is expanded using the cylindrical lens 620, which passes the light to the image sensor 622 with a tilt. For example, performing the line-scanning imaging, the light can leave the microscope in a line that is 2048 pixels long and 1 pixel wide. Using a cylindrical lens 620, the width of each line is expanded, such as from 1 pixel wide to 96 pixels wide. Other combinations of spherical and cylindrical lenses may also be used to spread the light profile in one direction. A tilt is applied to the image sensor 622, via a physical or optical mechanism, so that the optical path length from the expanded light profile (e.g., an illumination line) to the image sensor 622 is varied. As the image sensor 622 has a tilt, each line on the image sensor 622 is a different z-distance away from the image plane. The image 622 sensor with a tilt can effectively image the same line in the molecular sample onto multiple z-planes simultaneously, as illustrated by FIG. 6.

The autofocusing module can include autofocusing control circuitry that can then compute a one-dimensional focus metric or focus figure of merit for each z-plane (e.g., contrast, energy of the gradient), and choose the z-plane with the best focus metric value. In other embodiments, the autofocusing module can communicate the data to the control circuitry for processing. Instructions to move to this z-plane can be sent to the stage by the control circuitry to ensure that the hyperspectral imaging apparatus is always in-focus during the scanning process.

In various embodiments, as the hyperspectral imaging apparatus scans across the molecular sample, a z-stack of an area (as opposed to a line) can be built by storing subsequent line images in a buffer. The behavior of the buffer is first-in-first-out (FIFO). When acquiring a new z-stack of a line, that line z-stack becomes the "newest" line z-stack. If the buffer is full, then the "oldest" line z-stack is removed. The size of this buffer can be modified to adjust the autofocusing module's responsiveness to new data. The autofocusing can be performed in real-time as the hyperspectral imaging apparatus images the sample. This may mean additional time for acquiring z-stacks for autofocusing may not be necessary, reducing overhead. As the molecular sample is scanned, a running z-stack is stored (e.g., 2048× 2048×96 pixels), the optimal plane of focus is calculated based on a contrast or focus metric, and commands are issued to the microscope (e.g., via the control circuitry) to adjust its z-position accordingly. In various embodiments, this can be implemented as a hardware-based solution that has very low latency.

When autofocusing is performed in real-time, it is beneficial to determine the focal plane at a sample point or line before the stage reaches that point or line. In embodiments where the focal plane varies slowly, the hyperspectral imaging apparatus can use recent focal plane determinations to extrapolate to where in the focal plane can be at a later point, allowing time for the system to respond and set the correct focal plane. For the first strip in an image, there is only focal plane data available from that strip for extrapolation (e.g., far left rectangle in FIG. 5B). On the second and subsequent strips (e.g., the rectangles to the right of the far left rectangle of FIG. 5B), there is focal plane data available from both the prior lines in that strip as well as focal planes from neighboring strips already scanned. In such instances, extrapolation can be performed in two dimensions to improve the focal plane estimate (e.g., both the vertical and horizontal directions in FIG. 5B). Using a larger dataset for extrapolation improves the focal plane estimation and reduces the effects of specular reflections or other noise in the images used for focal plane determination. In many implementations, where estimation of the focal plane is more challenging, it may be beneficial to perform a slower scan of the first strip or multiple passes on the first strip to provide a better focal plane estimate to compensate for the lack of two-dimensional extrapolation.

In specific embodiments, the autofocusing includes collecting a plurality of lines at the image sensor 622 with the tilt that each represents a line in the molecular sample. As previously described, each of the plurality of lines at the imaging sensor 622 are a different z-distance from an image plane of the system. Specifically, the image sensor 622 captures a z-stack of the line in the molecular sample using the plurality of lines of the imaging sensor 622. The z-stack can be acquired across the region of interest. A plane of focus for the line in the molecular sample can be determined based on a contrast or other focus metric. Based on the plane of focus, the imaging apparatus is autofocused by the autofocusing control circuitry instructing the control circuitry to adjust the z-position of the molecular sample relative to the microscopic lens.

In further specific embodiments, the image sensor 622 with the tilt (e.g., autofocusing image sensor) takes a z-stack of the molecular sample, along with the z-position that each image in the z-stack is taken. The contrast or other focus metric of each image is computed, and the image with the best focus metric value is selected. Then, if performing imaging immediately, the z-axis stage moves the biological sample to the corresponding z-position for imaging. Otherwise, the z-position is stored in an autofocus map for later use.

Figure 7:
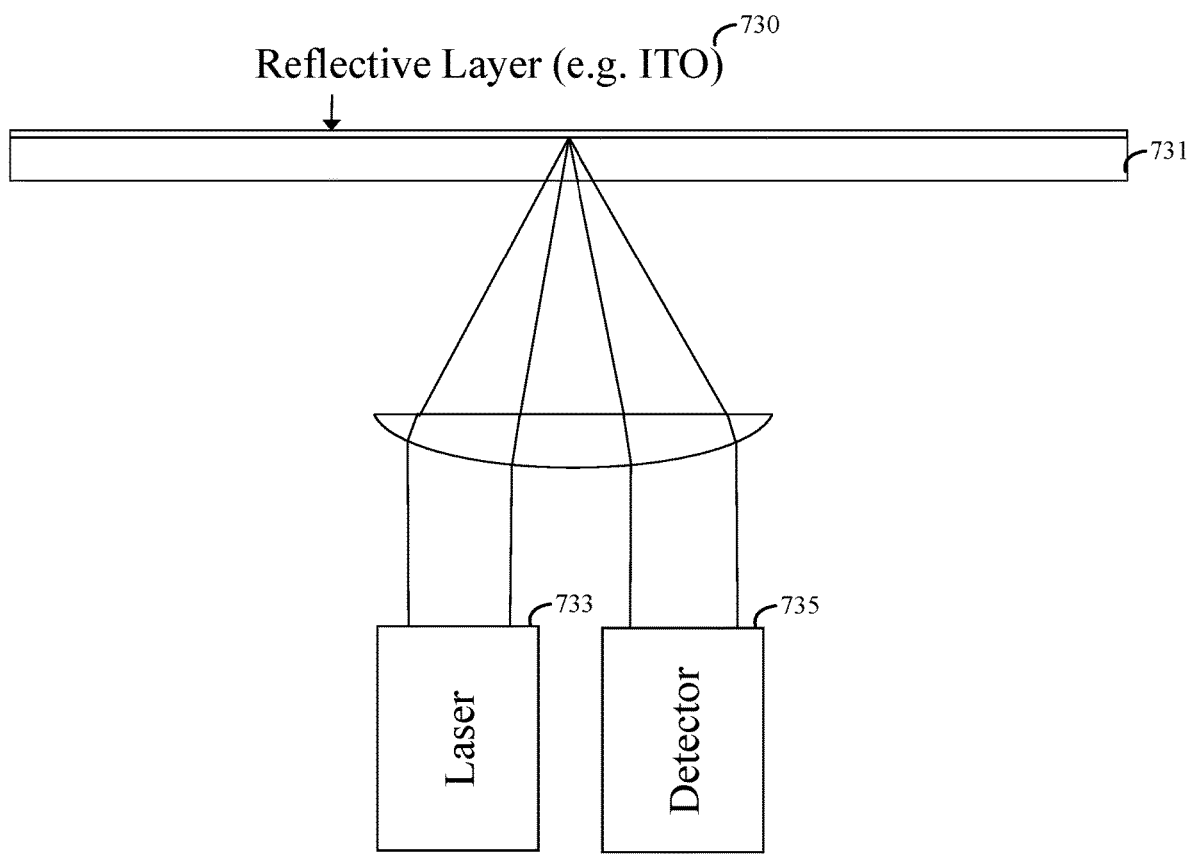
FIG. 7 illustrates an example autofocusing components of an apparatus for generating a hyperspectral image, in accordance with embodiments of the present disclosure.

FIG. 7 illustrates example autofocusing components of an apparatus for generating a hyperspectral or other image, in accordance with embodiments of the present disclosure. An alternative method of real-time autofocusing uses reflection of a laser beam from the sample to determine the focal plane for the substrate surface. As previously described, the sample can be contained in a substrate 731. The substrate 731 has a reflective coating 731 on a surface thereof. The control circuitry of the imaging apparatus can determine an optimal focal plane for the region and/or the other region of the molecular sample by using light reflected from the reflective coating. For example, the autofocusing module can include another light source (e.g., laser 733) that emits light which is directed toward the substrate 731 and another image sensor (e.g., detector 735) to detect the reflected light.

Monitoring the position of the reflected light spot provides an indication of when the substrate surface is in focus. Such laser reflection autofocus methods are well understood. Imaging at fixed points from the substrate surface is possible by adjusting or monitoring the position of the sensor monitoring the reflected laser. The primary limitation of these methods is that they do not perform well at the interface between a slide and water or slide and mounting medium, for example, because the strength of the reflected spot depends on the difference in refractive index between the two sides of the surface. To overcome this limitation, the reflective coating is reflective outside of an imaging spectral region and transparent inside of the imaging spectral region, and the additional light source (e.g., laser 733) generates optical power outside of the imaging spectral region for delivering at the substrate 731. For example, the substrate is coated with a layer that is highly reflective in the infrared but is highly transmissive at visible wavelengths. This provides a very strong reflection for robust autofocus control. An example of a material that is highly reflective in the infrared but highly transmissive in the visible/near infrared is a thin layer of indium tin oxide (ITO). An infrared laser is used for the substrate plane determination that is reflected by the ITO. With proper selection of optics and filters, neither the infrared laser nor the ITO interfere with the hyperspectral imaging.

In other related embodiments, phase detection autofocusing is performed by using a double pinhole to record two spatially offset images. In software or hardware, the spatial offset can be computed using phase detection. The amount of spatial offset corresponds to how much to move the Z-axis stage in order to achieve the best plane of focus. This method can be faster than conventional Z-stack image focus metric methods, as it requires one image per field of view instead of an entire Z-stack. Additionally, this can preserve the molecular sample and prevent photobleaching.

The autofocusing performed can be dependent on the molecular sample being imaged. The following provides a number of example samples, imaging types (as further described herein), and considerations for autofocusing. A first example sample type is a microscope slide in which the microscope is performing whole slide imaging. In order to perform the autofocusing process at a sufficient speed during the scan, the imaging apparatus can create a focus map. The focus map can be used to identify where best focal plane for a set number of fields of view, and interpolate the best focal plane for other fields of view based on this focus map. Another example sample type is a microscope slide in which the imaging apparatus is performing live imaging. The user, in such an example, may be interested in imaging a single field of view, but the focal plane may change over time as the molecular sample moves. This change may be very rapid, and also may require real-time object detection as the sample might move out of the field of view. The microscope also may be used to image one image per well of a microtiter plate. Depending on the sample preparation protocol, each of the wells in a microtiter plate might have a different focal plane. As a result, the focal plane for each well may be determined somewhat independently. In other instances, the microscope images multiple images per well of a microtiter plate. As described in the one image per well case, each well's best focal plane may be independent of the others. However, adjacent fields of view in the same well may have focal planes that are in close proximity, which is the same assumption used when performing whole slide imaging on microscope slides. Further, the microscope can perform whole well imaging on a microtiter plate.

Figure 8:
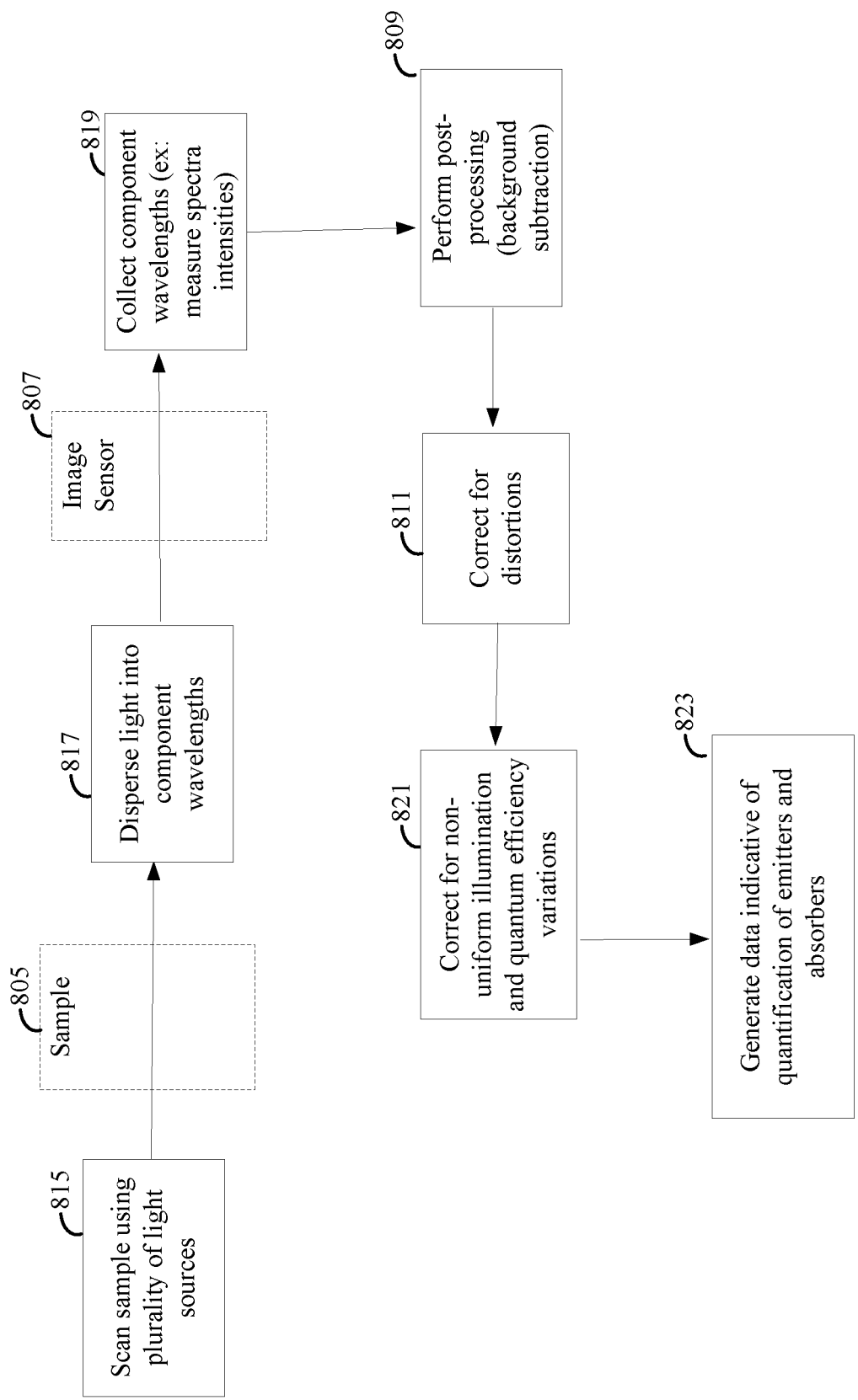
FIG. 8 is a flow chart illustrating an example set of activities for an apparatus of the type implemented in a manner consistent with FIG. 1A, in accordance with embodiments of the present disclosure.

FIG. 8 is a flow chart illustrating an example set of activities for an imaging apparatus of the type implemented in a manner consistent with FIG. 1A, in accordance with embodiments of the present disclosure. As illustrated, at 815, the process includes scanning a molecular sample 805 using hyperspectral imaging apparatus including at least one light source, an imaging spectrometer, an image sensor and control circuitry. The imaging apparatus can include a light source arrangement having a plurality of light sources. One or more of the light sources, as previously described, emits a plurality of light beams at non-uniform light intensities and/or otherwise has a non-uniform light pattern. In specific embodiments, the plurality of lights sources illuminate the sample concurrently (e.g., together or at the same time). In other embodiments, the plurality of light sources illuminate the sample sequentially. The molecular sample 805 can be continuously scanned to collect the image data by controlling a plurality of positions of the sample relative to an optical objective of the apparatus using a stage and the control circuitry, in some specific embodiments.

In some embodiments, the process can include autofocusing during the scan of the molecular sample 805. Samples are often not perfectly planar. As a result, the distance between the optical objective and the sample can be adjusted to keep the sample in focus as the sample is scanned. This is particularly beneficial for high magnifications because those lenses (e.g., objectives) have a smaller depth of field. The consequence of not performing autofocusing can result in an image that is blurry and out-of-focus. There are several methods of performing autofocusing, as previously described.

In a specific embodiment, the sample can be autofocused by determining a plane of focus in a z-stack of a line in the molecular sample 805 and adjusting a z-position of the molecular sample relative to the objective lens based on the plane of focus. The plane of focus in the z-stack can be determined by capturing a z-stack of the line in the molecular sample 805 using a plurality of lines collected at an additional image sensor. The additional image sensor can be placed at a tilt, as previously illustrated and described. The z-stack can include a plurality of vertical images (as opposed to a horizontal images). In various embodiments, the z-stack is captured by collecting a plurality of lines at the additional image sensor (at the tilt) that represent the same line in the molecular sample 805. Each of the plurality of lines at the additional image sensor are a different z-distance from an image plane. The plane of focus for the line in the molecular sample 805 can be determined based on a focus metric, such as contrast, and the apparatus is autofocused by the control circuitry causing a z-position of molecular sample 805 to change relative to the optical objective and based on the determined plane of focus.

At 817, the light emitted from the molecular sample along an emitted-light optical pathway is separated into a plurality of different component wavelengths using an imaging spectrometer. The different component wavelengths are passed along the emitted-light optical pathway and are then incident upon the image sensor 807. The light emitted that corresponds to the plurality of different component wavelengths in a region of interest are collected at an image sensor 807, at 819. The image sensor can store the collected light emitted corresponding to component wavelengths and/or transfer hyperspectral image data directly to external processing circuitry. At 809, post processing can be performed using the hyperspectral image data, such as data compression and background subtraction.

At 811, further post processing is performed including the previously-described smile and keystone correction or phase correction, as well as data compression and background subtraction. And, as further previously described, at 821, the illumination of the hyperspectral image data with the non-uniform light intensities is calibrated using non-uniform intensity patterns which are attributable to the light source arrangement. The calibration can include identifying the non-uniform intensity pattern (of laser power) for each of a plurality of light sources. In specific embodiments, identifying a non-uniform intensity pattern includes controlling movement of the molecular sample in a direction of an illumination line of the respective light source and, for each pixel in the direction, collecting the plurality of different component wavelengths associated with the molecular sample. The non-uniform intensity pattern corresponding to the light source can be identified (and reconstructed) using the collected plurality of different component wavelengths of each pixel in the direction of the illumination line.

At 823, the data representative of a quantification of emitters in the molecular sample is generated and/or otherwise output responsive to the calibration of the illumination of the hyperspectral image. The post processing can include the use of the non-uniform intensity patterns to output a quantification of fluorophore or other labels in the sample. For example, the post processing can include performing decomposition of measured spectra intensities of the different component wavelengths into partial label (e.g., fluorophore) quantifications and performing decomposition of the partial label quantifications into the label quantifications by adjusting for laser power of the plurality of light sources based on the non-uniform intensity patterns (e.g., the illumination calibration), among other techniques.

Figure 9B:
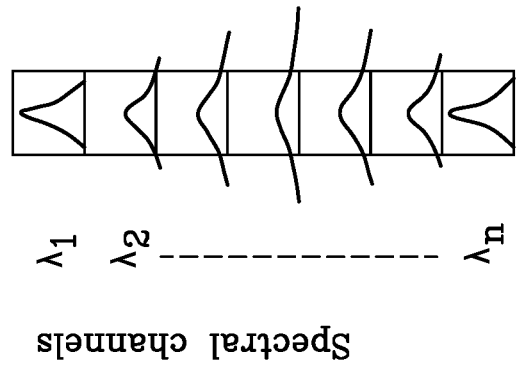
FIG. 9A-9B illustrate example distortions corrected for by an apparatus, in accordance with embodiments of the present disclosure.
Figure 9A:
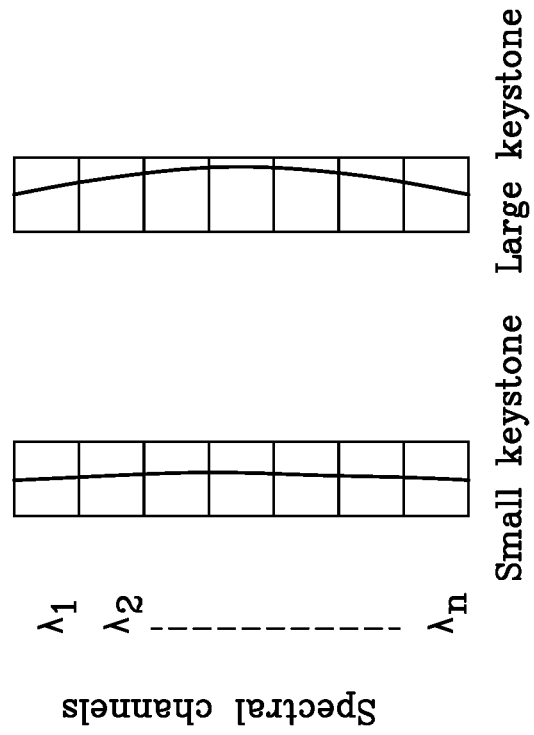

FIGS. 9A-9B illustrates example distortions corrected for by an apparatus, in accordance with embodiments of the present disclosure. More specifically, FIG. 9A illustrates example keystone phenomena and FIG. 9B illustrates example pixel misregistrations. Keystone and smile involve wavelength-dependent distortions. Keystone refers to variation in spatial magnification as a function of wavelength. Smile refers to a displacement of the center wavelength position along the spatial position on the image sensor. In various embodiments, optical blurring in the system, which can be described by the point spread function, may vary spatially and spectrally, resulting in further pixel misregistrations.

Figure 10:
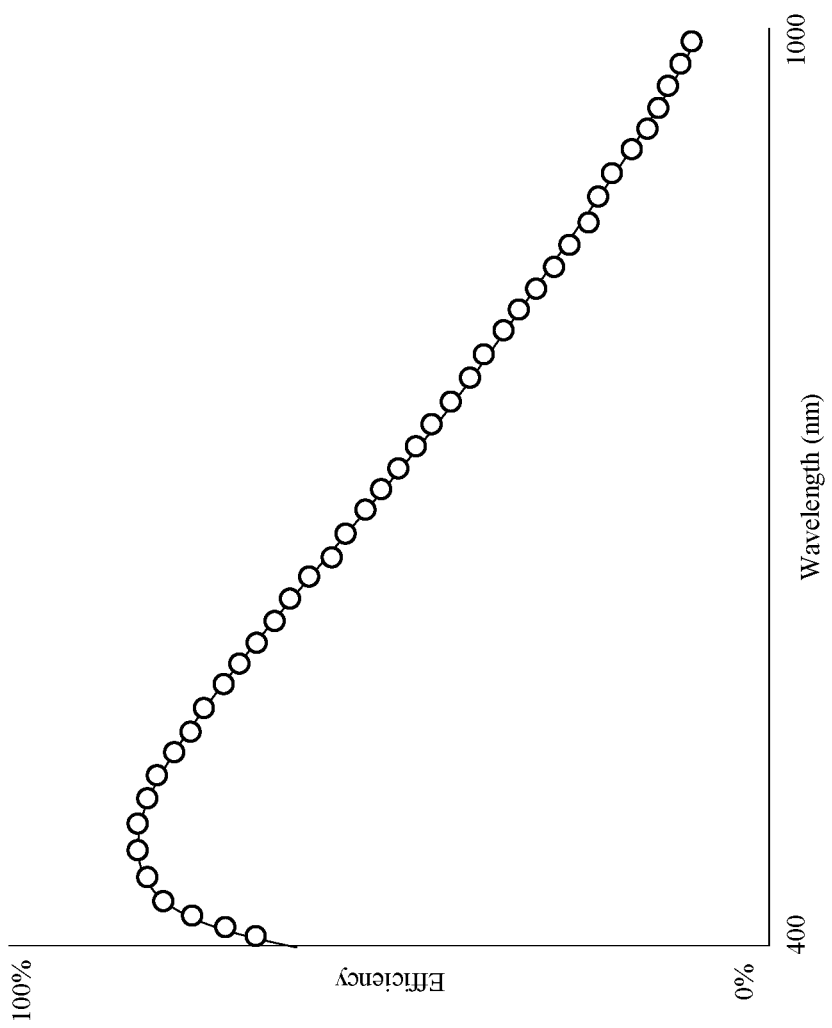
FIG. 10 is a graph illustrating a representation of oversampling, in accordance with embodiments of the present disclosure.

FIG. 10 is a graph showing a representation of oversampling, in accordance with embodiments of the present disclosure. As previously described, image sensors generally have quantum efficiencies that vary with the wavelength of light measured. Each of the dots show in the graph illustrated by FIG. 19 represents a discrete sample of the continuous quantum efficiency versus wavelength. The more samples obtained, the greater accuracy for correcting quantum efficiency in the collected data.

As previously described, values between 0.0 and 1.0 for the quantum efficiency of the image sensor can be obtained at the spectral region that is measured by each spectral pixel in the image sensor's region of interest. These values can be normalized, and then the inverse of these values can be stored in a vector q, and used to correct for quantum efficiency. In an example embodiment of the hyperspectral line scanning apparatus, the image sensor's x-axis corresponds to various spatial points on the sample, while the y-axis corresponds to various spectral measurements for a given spatial point on the sample. Once this data is corrected for optical distortions, such as keystone and smile as described above, an element-wise multiplication of each column of the hyperspectral data by q can be performed, the quantum efficiency correction factors. This procedure can be conducted in parallel, as each column of the hyperspectral data can be element-wise multiplied by q by different threads concurrently. Correction for spectral dependence of the emitted light optical pathway can be performed in the same manner. The combined spectral dependence of the quantum efficiency and emitted light optical pathway may be measured using a calibrated light source.

As discussed above, illumination using multi-mode or single mode light sources can result in non-uniform illumination across the length of the illumination line. To produce an image that reflects the optical properties of the molecular sample, the variation in illumination is corrected. A single mode light source may also have non-uniform laser intensity, albeit less than a multi-mode light source. The following discussion utilizes multi-mode laser diodes as an example, but this can apply to any other form of a non-uniform light source including a single mode light source (e.g., laser diode).

In various embodiments, the processing circuitry performs the calibration. The processing circuitry can assume that at a set temperature and output power for the laser, the illumination pattern produced by the laser is constant over time. The calibration can be performed for each light source and used to identify non-uniform intensity pattern of the respective light source.

The following illustrates an example of how to identify a non-uniform intensity pattern of a respective light source. First, a scan of the molecular sample is performed of at least one line. After scanning the molecular sample, the following is performed for each light source. A section of the molecular sample with a label excited by the respective light source is identified from the image data captured using during the scan. The molecular sample is moved in a direction along the length of the illumination line and, for each pixel in the direction, the plurality of different component wavelengths associated with the section of the molecular sample are collected. Using the collected plurality of different component wavelengths of each pixel in the direction of the illumination line, the non-uniform intensity pattern corresponding to the respective light source is identified (e.g., constructed and stored for later post-processing use).

FIGS. 11A-11F illustrate an example process for calibrating illumination in a hyperspectral image generated in accordance with various embodiments. As discussed above, illumination using multi-mode or single mode light sources can result in non-uniform illumination across the length of the illumination line. To produce an image that reflects the optical properties of the molecular-based sample, the variation in illumination is corrected.

In various embodiments, the processing circuitry performs the calibration. The processing circuitry can assume that at a set temperature and output power, the laser beam illumination pattern is constant over time. The calibration can be performed for each light source and used to identify non-uniform intensity pattern of the respective light source.

The following illustrates an example of how to identify a non-uniform intensity pattern of a respective light source. First, a scan of the molecular sample is performed. After scanning the molecular sample, the following is performed for each light source. A section of the molecular sample with a label excited by the respective light source is identified from the image data captured using during the scan. The molecular sample is moved in a direction along the length of the illumination line and, for each pixel in the direction, the plurality of different component wavelengths associated with the section of the molecular sample are collected. Using the collected plurality of different component wavelengths of each pixel in the direction of the illumination line, the non-uniform intensity pattern corresponding to the respective light source is identified (e.g., constructed and stored for later post-processing use).

More specifically, FIGS. 11A-11F illustrate an example scan of a section 1114 of a molecular sample as excited by a particular light source. As illustrated, at time=1, image data is captured of the section 1114 of the sample. At time=2, the relative position of the section 1114 of the molecular sample is moved in a direction along the length of the illumination line 1112 of the particular light source. The position can be moved via a stage 1116 and control circuitry. The process continues for time=3, time=4, time=5, and time=6. At each of the time segments, image data (e.g., component wavelengths) are recorded. In some embodiments, only the particular light source is used to illuminate the molecular sample while capturing the image data used to identify the non-uniform intensity pattern. Accordingly, the process may be repeated for each light source. After the process is complete, a set of images have been collected in which the same section 1114 of the molecular sample is imaged and each point on the illumination line 1112 images the exact same section 1114 once. The intensity of the pixels can be used to reconstruct the intensity across the illumination line.

In some embodiments, such as those where only one light source is used, these intensities are normalized to values between 0.0 and 1.0, and the inverse of the normalized values can be stored as correction factors in a vector n, where the length of n corresponds to the number of pixels in the line that is imaged by an image sensor. In some embodiments, the image sensor's x-axis corresponds to various spatial points on the sample, while the y-axis corresponds to various spectral measurements for a given spatial point on the sample. Once this data is corrected for optical distortions, such as keystone and smile as described above, an element-wise multiplication of each row of the hyperspectral data by n can be performed, the vector of non-uniform illumination correction factors. This procedure can be conducted in parallel, as each row of the hyperspectral data can be element-wise multiplied by n by different threads concurrently.

In other embodiments, such as those where multiple light sources with non-uniform illumination are used concurrently, correction requires knowledge of each light source's contribution to the aggregate emission spectrum for a fluorophore or other label. Using the correction factors that are obtained as described above, a distinct matrix C is generated for each point along the illumination line, such that when spectral decomposition is performed, each point along the illumination line uses its own version of the matrix C, that is compensated for non-uniform illumination at that specific point, to transform hyperspectral data into label quantifications.

Calibration of the illumination, however, is not so limited and can be performed in a variety of ways. In some embodiments, if the light source illumination pattern is (only) dependent on power and temperature (and not on wear and tear), the calibration can be performed in the factory and prior to specific applications and/or uses. Since the setting of the temperature of the light sources are constant, in specific embodiments, (and not changeable by the end user), the calibration prior to specific application can be iterated over each of the different options for the light source powers (e.g., laser powers). As a specific example, for a laser diode with laser powers between 0 and 1,000 mW, the imaging apparatus can be used to record the illumination pattern in 1 mW increments. This can result in the storage of 1,000×60 Correction Factors/Laser×4 Lasers=240,000 data points, which is equivalent to 2 MB of data. Alternatively, the laser power can be adjustable in increments of 5 or 10 mW, which would reduce the time for calibration.

The above example refers to fluorescence imaging, but the similar steps can be used for other types of imaging and illumination sources. Furthermore, instead of having each pixel image a single point of the molecular sample, it is also possible to image a line and average the results. This can reduce the impact of noise and reduce external effects such as photobleaching. One other variation of this method to reduce noise is to take multiple camera frames for each point on the illumination line. The correction step for images that contain multiple fluorophores or other labels that are excited by different lasers is slightly more complex.

In some specific embodiments, the non-uniform intensity patterns can be used to support spectral decomposition. As previously described, when performing spectral decomposition, the emission spectra off labels (e.g., fluorophores) are used, as well as the sample autofluorescence. To construct these label emission spectra, the contribution of each light source (e.g., laser) to the emission spectra is identified. An example equation for determining the contribution can include:

$$E_{f,total} = P_{405\ nm} E_{f,405\ nm} + P_{462\ nm} E_{f,462\ nm} + P_{520\ nm} E_{f,520\ nm} + P_{638\ nm} E_{f,638\ nm}.$$ EQ. 4

In EQ. 4, $E_{f,total}$ is the aggregate emission spectrum used in the spectral decomposition when all lasers are present. $E_{f,405\ nm}$ is the emission spectrum of the label, when only a first light source (e.g., the 405 nm laser) is used for excitation. This is calculated during the label emission spectrum acquisition process, using standard laser power. Similarly, the emission spectrum of the label as excited using each of the remaining light sources is calculated (e.g., $E_{f,462\ nm}$, $E_{f,520\ nm}$, and $E_{f,638\ nm}$). $P_{405\ nm}$ is the relative laser power used when performing hyperspectral imaging, relative to the standard laser power used during the label emission spectrum acquisition process.

The following is an example experimental embodiment for acquiring $E_{f,405\ nm}$, $E_{f,462\ nm}$, $E_{f,520\ nm}$, and $E_{f,638\ nm}$. A user can insert a sample containing a fluorophore of interest onto the imaging apparatus (e.g., via the stage of the microscope). The sample, in specific embodiments, only includes the fluorophore of interest. The imaging apparatus performs a scan of the center of the sample using one light source of the light source arrangement. The scan can be used to acquire a hyperspectral cube (image) of the sample. In a number of embodiments, the imaging apparatus performs a 2048×2048 pixel scan of the sample using the first light source, such as the 405 nm laser and resulting in a 2048× 2048×60 pixel hyperspectral cube.

To reduce the data (e.g., the hyperspectral cube) into an emission spectrum, a running intensity sum of each of the 60 spectral pixels is kept. For each spatial pixel, processing circuitry can determine whether or not there is a signal (e.g., above a threshold amount) in its respective spectral pixels. If there is a signal above a threshold, the intensity values of each of the spectral pixels is added to the respective running spectral pixel sum. If not, the spatial pixel is discarded or not used. This is performed for each of the spatial pixels (e.g., 2048×2048 pixels). Further, this process of acquiring the hyperspectral cube for the same region of the sample and building a running intensity sum is repeated for each of the light sources of the light source arrangement.

In response to acquiring a running intensity sum for the light sources, the above-described calibration process can be performed (e.g., calibration or normalization of the illumination using the non-uniform intensity patterns). In the above-described specific experimental embodiment, sixty intensity sums are acquired per laser, so with four lasers, that is 240 sums in total. Each of the intensity sums (e.g., spectral sums) can be divided by the largest intensity sum of the total sums (e.g., of the 240 spectral sums). This can effectively transform each of the intensity sums into a normalized value between 0.0 and 1.0, as described above.

In specific embodiments, the calibration of the illumination is performed after acquiring data for each of the light sources of the light source arrangement, and while imaging the same region of the sample. If the calibration is performed after acquiring data for each light source independently, the different emission spectra of the different lights sources may be more difficult to compare relative to one another. For example, the processing circuitry may not be able to compare the 405 nm emission spectrum to the 462, 520, or 638 nm emission spectrum.

The following illustrates a specific experimental embodiment for calibrating illumination reflected in a hyperspectral image. As the power varies across the pixels of the illumination line of each active light source (e.g., laser power varies across the 2048 pixels of the laser line) during hyperspectral imaging, the emission spectrum for the emitters (e.g., fluorophores) $E_{f,total}$ varies across the illumination line. An example equation for identifying the emission spectrum for an emitter is illustrated above by EQ. 4. When performing spectral decomposition, it can be beneficial to obtain the illumination line correction factors (e.g., the non-uniform intensity pattern of a light source represented by a single 2048-element vector that contains how much to adjust the observed intensity by, given the observed intensity's position on the illumination line) before performing hyperspectral imaging. If the imaging apparatus stores the raw hyperspectral data on a solid state drive, and then performs spectral decomposition after acquiring the hyperspectral data, the entire process is slower than obtaining the illumination line correction factors prior to acquisition of the hyperspectral data. This can be due to the fact that the SSD has limited read speeds (e.g. 400-450 MB/s). The imaging apparatus can acquire data at roughly 370 MB/s and can read off data for spectral decomposition at approximately the same rate it is acquired, although embodiments are not so limited and can include variety of speeds and rates. For example, if acquiring the hyperspectral data takes 15 minutes, it can also take almost 15 minutes to perform the spectral decomposition. Obtaining the illumination line correction factors (e.g., the non-uniform intensity patterns represented by a single 2048-element vector that contains how much to adjust the observed intensity by, given the observed intensity's position on the illumination line) prior to imaging can allow for performing the spectral decomposition in real-time.

The imaging apparatus can perform spectral decomposition based on the assumption that at a set temperature and output power, the intensity pattern of a light source is constant over time. As previously described, the sample is scanned. For each light source after the scan, a section of the molecular sample with an emitter excited by the respective light source is identified from the image data captured during the scan. The molecular sample is moved in a direction of an illumination line and, for each pixel in the direction, the plurality of different component wavelengths associated with the section of the molecular sample are collected. Using the collected plurality of different component wavelengths of each pixel in the direction of the illumination line, the non-uniform intensity pattern corresponding to the respective light source is identified (e.g., constructed and stored for later post-processing use).

The section of the sample with the label can be identified from the scan, as previously described. The following is an example process for identifying the section of the sample and identifying non-uniform illumination intensity patterns (e.g., the correction factors) before hyperspectral imaging is performed. First, using the label (e.g., fluorophore) specified by the user, the imaging apparatus performs a (z-stack) autofocusing in a region of the sample in which a label is present. In a specific embodiment, the region can include the center 2048×2048 region of the sample (or another region of the sample where the fluorophore or other label is known to be present). As a specific example, the emitter may have a primary excitation wavelength of 405 nm and the autofocusing is performed at the center of the 2048×2048 region of the sample. As a further specific example, a 4× objective lens can be used to perform the autofocusing, and using the peak emission wavelength of the emitter (which is known or identified), the imaging apparatus can use a 2048×2 pixel region on the image sensor, where the 2 pixels measure the peak emission wavelength of the emitter. Second, the correction factors are acquired as described above, for the particular light source (e.g., the 405 nm laser). Since the imaging apparatus autofocused using the particular emitter, there should be no issues in finding the section of the sample with label and/or acquiring the correction factors. Third, the acquisition of correction factors is repeated for each of the light sources that are active (e.g., to be used) for the imaging (e.g., the 405 nm, the 462 nm, 520 nm, and 638 nm lasers). Since the presence of emitters that are excited by these light sources is not guaranteed, the imaging apparatus may additionally search other regions of the sample to find said emitters. If an additional search is performed, the imaging apparatus can repeat steps 1-2 for each light source that cannot find the emitter in the particular section (e.g., the center region) of the sample.

Figure 12A:
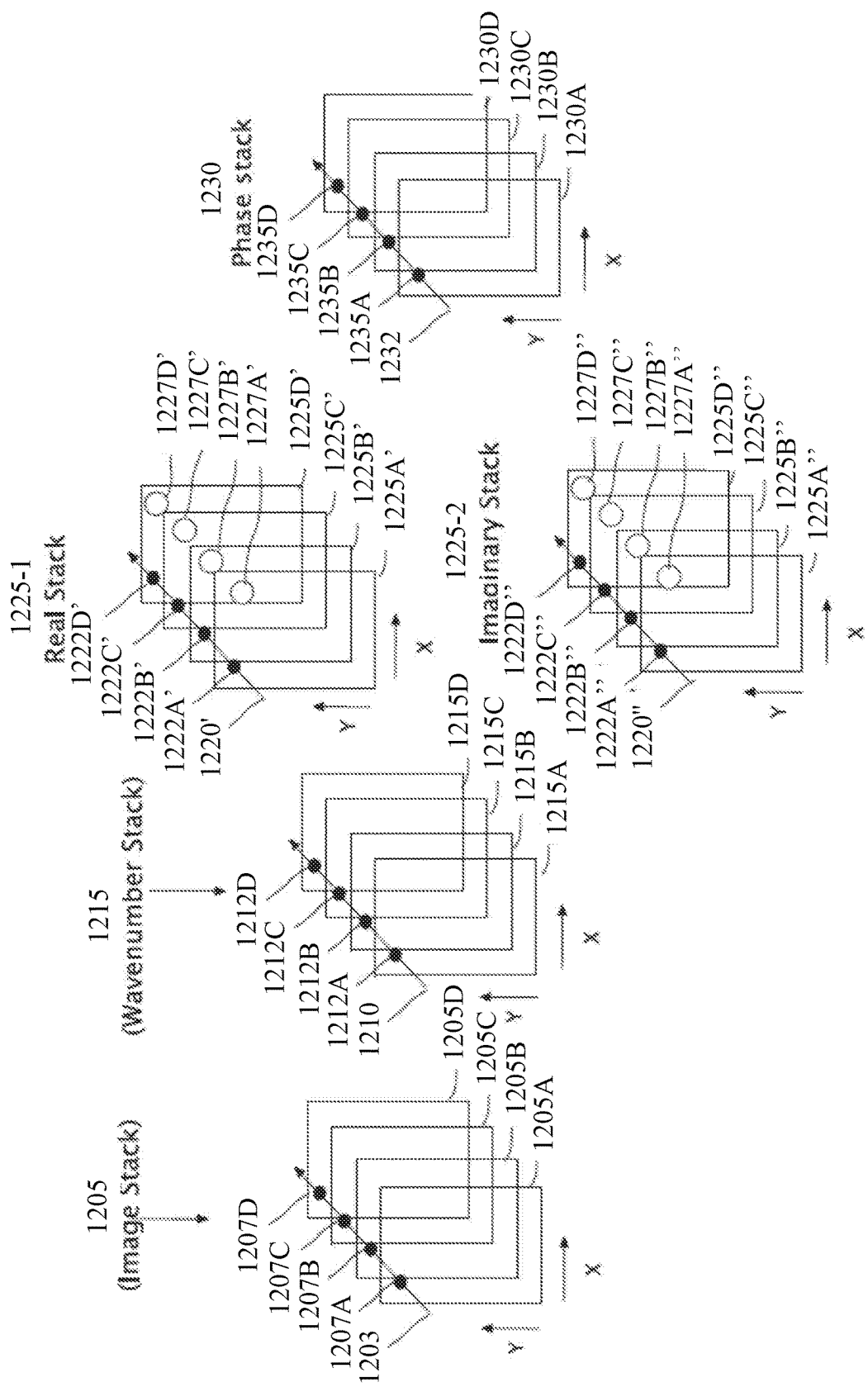
FIG. 12A illustrates an example of data processing performed by an imaging apparatus, in accordance with embodiments of the present disclosure.

FIG. 12A illustrates an example of data processing performed by an imaging apparatus in accordance with the present disclosure to perform phase correction during Fourier transform conversion of an interferogram image to a spectrum image. Fourier transform spectral imaging can provide a staring system for hyperspectral imaging. The image stack 1205 may consist of several frames of data, each frame associated with a specific distance of the adjustable mirror. Only a few frames, 1205A, 1205B, 1205C and 1205D are illustrated. The X and Y axis directions are shown towards the bottom left of the stack; these directions correspond to the X and Y direction in the slide containing the molecular sample. Each frame consists of a number of pixels. One such pixel in frame 1205A is illustrated as 1207A. Pixels 1207B, 1207C and 1207D in frames 1205B, 1205C and 1205D appear at the same coordinate location as of pixel 1205A. The arrow 1203 through all the frames in the imaging stack depicts that an interferogram may be constructed with the pixel values along this line. If each stack consists of m×n pixels, then m×n interferograms may be constructed, one for each pixel location. The next step in the data processing chain is to calculate the wavenumber stack 1215. The wavenumber stack is generated by taking the Fourier transform of each of the m×n interferograms. As a reference, it is to be noted that the Fourier transform of the interferogram can generally have the same number of data points as the interferogram. If the number of imaging stacks is "P", then each interferogram can have "P" points or ordinates and each Fourier transform can have "P" points or ordinates. The number of points may be padded to reach a power of 2 to perform a fast Fourier transform or to reduce artifacts. Each point or ordinate corresponds to a specific wave number. Thus, the wavenumber stack 1215 can have "P" frames—only a few frames 1215A, 1215B, 1215C and 1215D are illustrated. The line 1210 represents the Fourier transform of the interferogram where each pixel in each frame represents a wavenumber. The Fourier transform consists of complex numbers, thus the next step in the processing illustrated by the two stacks 1225-1 and 1225-2, illustrates the separation into real and imaginary components. Stack 1225-1 is the real part of the Fourier transform and stack 1225-2' is the imaginary part of the Fourier transform.

Figure 12B:
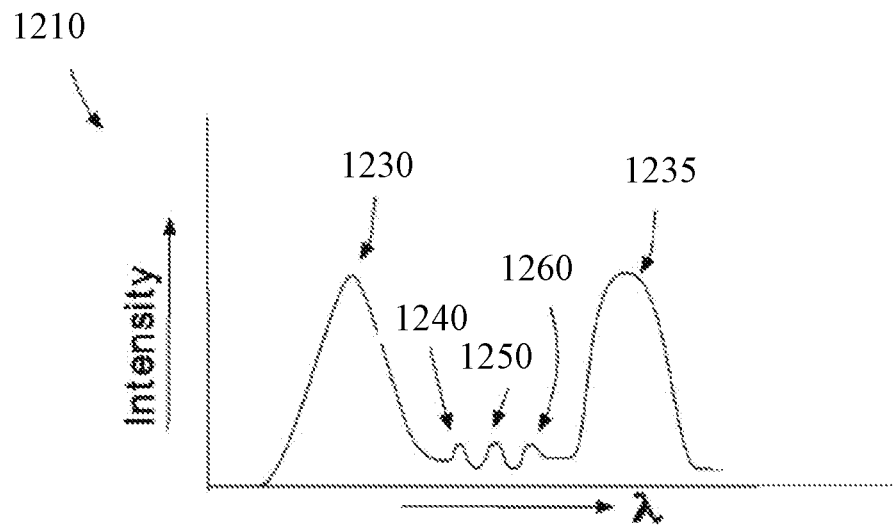
FIG. 12B illustrates an example spectra of fluorescent labels in the presence of noise, in accordance with embodiments of the present disclosure.
Figure 12C:
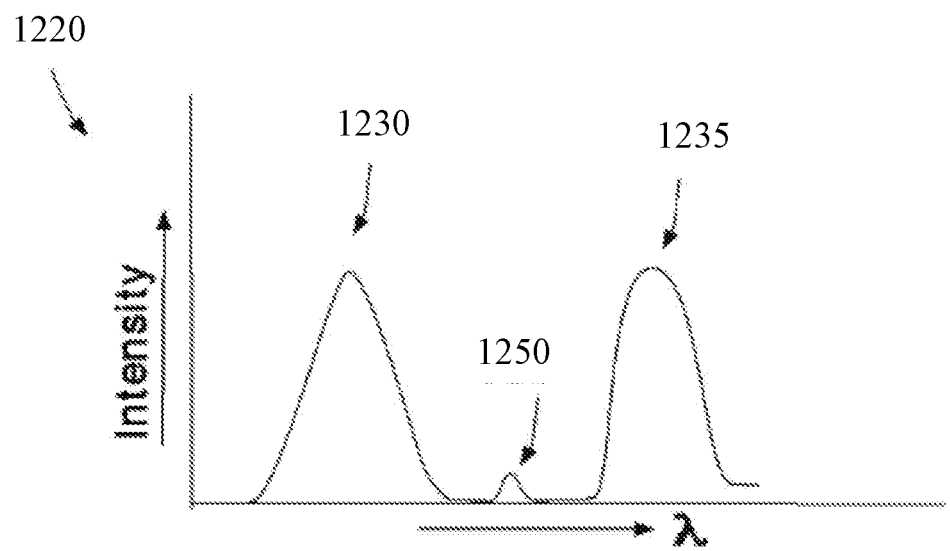
FIG. 12C illustrates an example spectra of fluorescent labels when noise is reduced or removed, in accordance with embodiments of the present disclosure.

One advantageous aspect of the data processing is now explained. Due to the natural variation of the fluorescence received from the specimen, the image stack may contain regions or pixels from areas of varying signal-to-noise ratio. Some regions may result from areas where the signal-to-noise ratio is good but other regions may result from areas where the signal-to-noise ratio is poor. Several criteria may be utilized to distinguish regions of good SNR from regions of poor SNR. One such criterion may be signal strength as measured by the value of the pixel. Assuming a maximum value of 255 for the pixel value, a value of 128 or above may be considered a pixel with good SNR. Other criteria may also be utilized. The technique below describes a method to perform the data analysis when there are regions of poor SNR. In particular, the technique applies to a phase correction step, commonly utilized in systems that use the interferometer-based imaging spectrometer. The phase correction step is applied to the complex Fourier Transform with the objective to improve the fluorescence spectrum in areas of poor SNR. FIGS. 12B and 12C illustrate this concept.

FIG. 12B illustrates an example spectra of fluorescent labels in the presence of noise, in accordance with embodiments of the present disclosure (e.g., graph 1210). In this specific example, two peaks 1230 and 1235 are clearly seen, however multiple smaller peaks 1240, 1250, 1260 are also seen. As the intensity level is low for these peaks, it may not be easy to make a determination if these peaks were created due to the presence of fluorescent labels or if these were due to noise.

When phase correction is applied, it is possible to reduce the noise floor as shown in FIG. 12C (e.g., graph 1220); now the presence of a fluorescent label can be determined with more confidence.

Phase correction to reduce noise is a well-known technique. For general and specific information regarding phase correction and a specific application of phase correction in the area of magnetic resonance imaging, reference is made to D. Prah, E. Paulson, A. Nencka, K. Schmainda "A simple method for rectified noise floor suppression: phase corrected real data reconstruction with application to diffusion weighted imaging", *Magn Reson Med,* 2010 August 64(2): 418-429, which is herein fully incorporated by reference for its teaching. As described in connection with FIG. 12A, a Fourier transform is performed for every pixel in the imaging stack 1205 along the direction of the line 1203. The Fourier transform of the interferogram is real only when the interferogram is symmetric around the zero path difference (ZPD), or point at which the two paths of the interferometer are the same. In general, the interferogram is not symmetric because (1) the ZPD is not the same at all wavelengths because of dispersion or other type of separation in the optics and (2) the interferogram sample points do not align exactly with ZPD. Thus the Fourier transform of each interferogram is a complex number and the wavenumber stack is complex. Each point or sample in the Fourier transform includes the effect of white noise having a zero mean Gaussian probability distribution. The noise in the real and imaginary stacks also can retain this characteristic of zero mean and Gaussian probability distribution. The fluorescence spectrum is a real quantity. The simplest method of obtaining a real spectrum at each pixel is to take the magnitude of the Fourier transformed points. The magnitude images are calculated by taking the root sum of squares of the real and imaginary images, which is a nonlinear operation that combines the noise distributions. Thus taking the magnitude, the noise gets transformed into a parameter with a Rician probability distribution. A variable with a Rician probability distribution has a positive expectation value resulting in the non-zero and an elevated noise floor. The elevated noise floor results in the ambiguity such as shown in FIG. 12B with the multiple peaks 1230, 1250 and 1235. FIG. 12D through FIG. 12H illustrate one advantageous way to mitigate or remove the effect of noise.

FIGS. 12D-12H illustrates an example method to remove or reduce the impact of noise, in accordance with embodiments of the present disclosure. For the purposes of clarity of explanation, it will be mentioned now that FIG. 12D-FIG. 12H are signal and noise vectors in the Fourier space. The term "in the Fourier space" will not be repeated but should be understood for these figures. With this understanding, in FIG. 12D, the signal vector is illustrated by 1251 and the noise vector is illustrated by 1255. The resultant (measured) vector is illustrated by 1245; it can be seen from the figure that 1245 is approximately equal to 1251. Taking the magnitude of the Fourier transform yields vector 1251. With phase correction, the selected value is the dot product of a unit vector in the direction of the true phase (direction of vector 1251). In other words, if the signal is strong and the noise is small, the resultant vector is a good approximation of the original signal vector and the phase of the measured vector is a good approximation of the true phase. FIG. 12E illustrates that if the signal 1259 is small and the noise 1255 is the same as in FIG. 12D (as an example), there is more effect on the resultant vector 1264. The result is that the phase of the measured vector is a poor estimate of the true phase. Furthermore, using the magnitude of the measured vector 1264 (no phase correction) incorporates both in-phase and quadrature phases of the noise into the measurement, resulting in noise that is always positive and increased by as much as a factor of $2^{\wedge}\frac{1}{2}$ for small signals. This example shows the value of phase correction. Performing phase correction using an incorrect phase can reduce the noise since only a single phase quadrature contributes. However in this case, the signal is reduced proportionally to the dot product between the true phase and the incorrect phase angles.

FIG. 12F-FIG. 12H illustrate the concept of how the effect of the phase noise on estimation of the true phase may be mitigated or removed. For the purposes of explaining the concept, an assumption is being made that the signal and noise vectors illustrated in FIG. 12F, FIG. 12G and FIG. 12H are associated with three consecutive pixels, although in practice, it can be many pixels. As can be seen the SNR in FIG. 12F is poor compared to the SNR in FIG. 12E and FIG. 12H. However, as happens in any environment including on the glass slide containing a specimen to be analyzed, rapid spatial changes, at least at a pixel level, does not usually occur. Thus applying this generalized observation to the phase estimation, if phase correction is applied to the resultant 1282 in FIG. 12G, then it may be possible to mitigate or remove the effects illustrated in FIG. 12B with the multiple small peaks. To do so, the phase correction is calculated by examining the phase of the pixels in FIG. 12F and FIG. 12H and interpolating between these phases to estimate the phase of the pixel in FIG. 12G. Once the phase of FIG. 12G is estimated, phase correction can be applied, which in effect projects the resultant vector 1282 onto the direction of 1278 (the actual signal). Thus the phase corrected value is closer to the actual signal. When pure noise is present in FIG. 12G, the expected value of the phase corrected noise is zero so the multiple peaks in FIG. 12B may be reduced or eliminated.

The application of the phase correction step to the imaging stacks is now explained. Referring to 1225-1 and 1225-2 in FIG. 12A, due to the variation in the fluorescence image, the signal-to-noise ratio may vary across the image. In particular, in some regions, the SNR may be poor and it may be difficult to determine if a fluorescence peak exists in these regions. To improve the detectability of fluorescence peaks, phase correction is applied as explained below. In this method, the phases from regions where the SNR is good, are used to calculate the phases of regions where the SNR is poor. As one example of how this can be implemented, a spatial average of the phases from regions where SNR is good can be used to infer the phase of a region where the SNR is poor, if the region with the poor SNR is located within the region of good SNR. Referring to 1225A' through 1225D' and 1225A" through 1225D", circular regions are indicated by 1227A' through 1227D' and 1227A" through 1227D". These regions are the base support or kernels for the processing described below. For the purposes of providing an explanation, on the assumption that the pixels on the circular kernel have good SNR and the pixel or pixels inside the circle have poor SNR, a linear two-dimensional interpolation or Gaussian smoothing may be carried out to find the phases of the inside pixels. This operation is carried out in the real and imaginary stacks separately. Once the interpolation has been performed, modified real and imaginary stacks (not shown in the figure) are generated. From these stacks, the phase for each pixel is calculated and a phase stack 1230 is calculated. Thus with this technique, the phases of the regions where the SNR is poor is calculated. It is to be noted that the kernel shape may not be limited to circular only—other shapes such as rectangular, square or other shapes may be used. Further, the method to find phases of regions with poor SNR does not need to be limited to linear interpolation; other types of interpolation methods such as but not limited to cubic spline interpolation may be carried out. Even further, the size of the kernel may be adjustable and may be automatically derived. Thus if the regions of adequate SNR are not the immediately next pixel away, then pixels that are two pixels away (in all directions) is used; this process may continue till an adequate region is found or till a determination is made that the regions are so far away that interpolation is not beneficial. An advantage of the smoothing operation on the two quadratures is that the final phase is dominated by the regions where the signal is stronger. That is, smoothing has large contributions from the regions with a strong signal and small contributions from the regions with small signal.

Once the phase stack is calculated for all pixels, this phase stack is applied to the wavenumber stack. In other words, the phase of the Fourier spectrum is modified. The inverse Fourier transform is then performed and a modified spectrogram (or modified image stack) is then calculated. In a subsequent step, the modified image stack is apodized with an apodization function. In a final step, a Fourier transform is again found. This step then reveals the fluorescence peaks where the phase correction has been applied. After this step, the data reduction techniques described earlier may be applied.

The parallelized processing can also be used to provide feedback. Feedback can improve the data results in a number of ways, including dynamic range correction, event detection, sample mapping, and illumination/exposure control (another version of dynamic range correction using a fast pre-scan), missing element correction, and others. Event detection and dynamic range correction are discussed elsewhere. For sample mapping, a fast pre-scan determines where the sample is on the slide so that only that region is imaged in the slow mode. Sample mapping can be done in a conventional rectilinear scan, or a modified scan where the scan tries to find the edges of the sample only (border mapping). For various types of border mapping during a fast pre-scan, the imaging apparatus can move first to the center of the sample, then outward to find the edge of the sample, then repeat to fill in the border. In other examples, the imaging apparatus starts at either the center or edge of the slide, moves to find the edge of the sample, then traces the edge using feedback to adjust the tracing motion. For illumination/exposure control, a fast pre-scan finds the brighter and dimmer regions of the sample and adjusts the illumination/exposure appropriately during the slower subsequent scan. This is the reverse of dynamic range correction that does the slow scan first then an abbreviated scan of saturated regions. In various embodiments, fast mode scanning could be performed in a "blur" mode where the laser is on all the time (e.g., no pulsing) and the stage scans faster than 1 resolution element per frame. This mode emphasizes speed at the expense of resolution and the scanning speed is not determined by the spatial resolution. Autofocus can also be performed as on a sparse grid during a pre-scan; focus positions are determined by interpolation between the sparse grid focal positions.

For missing element feedback, there is a step in spectral decomposition wherein errors or residuals are checked to see whether there is indication of missing labels (e.g., fluorophores, chromophores or scatters). If an element is missing, methods are used to extract the missing element (e.g., blind spectral decomposition including a priori spectra as appropriate or a spectral library search), and data is reprocessed using that element. Feedback control can implemented via software, although it can also generate a message to the operator asking how to proceed.

Example hyperspectral imaging apparatuses in accordance with the present disclosure can be used to perform more accurate relative and absolute quantification of samples that have one or more labels. The following discussion is described with application to imaging fluorophores, but can be applied to other types of labels as well.

When imaging fluorophore-based labels in a sample, background fluorescence interferes with the fluorescence signal from the labels is measured. One source of this background is autofluorescence, which may come from the molecular sample, sample vessel substrate, or from imaging media. For the described hyperspectral apparatuses, given a set of known emission spectra for the fluorophores in the sample, spectral decomposition is able to transform hyperspectral data into quantification of fluorophores. In order to compensate for autofluorescence, the autofluorescence spectra for each source of autofluorescence can be measured, and these spectra can be added as additional "fluorophores" to the spectral decomposition process. The end result is a set of quantifications for each fluorophore label that are independent of the autofluorescence sources. The accuracy of these quantifications is higher for hyperspectral systems that obtain a large number of wavelengths per sample point. In other words, any background autofluorescence is reduced or eliminated by the spectral decomposition process. In some embodiments, the quantification of the autofluorescence sources may be preserved for downstream applications. For example, in tissue samples, the autofluorescence can be used to help identify different regions of tissue.

The autofluorescence spectra can be measured in any number of ways, of which the following is one approach. In general, the spectra can be obtained by imaging a control sample that is known to only exhibit autofluorescence, and using blind spectral decomposition methods to determine the emission spectrum. For example, autofluorescence of the sample vessel substrate can be obtained by imaging the empty sample vessel. If only the imaging media exhibits autofluorescence, the emission spectrum of the imaging media can be obtained by imaging the sample vessel with only the imaging media present. If there is autofluorescence of the sample, its emission spectrum can be obtained by imaging an unlabeled sample in the sample vessel. This approach also works if there are multiple sources of autofluorescence, for example when there are multiple proteins that each exhibit their own fluorescence emission spectra.

In fluorescence imaging of tissue, it is common to use secondary or even tertiary labeling of molecules of interest in order to perform signal amplification to improve signal to noise ratio. However, negating the effect of autofluorescence can allow for detection of these fluorescent labels without signal amplification. The ability to detect directly-conjugated labels is enhanced if the hyperspectral imaging apparatus has high light collection efficiency, as previously described.

The benefit of using directly-conjugated labels is twofold. First, the proportion of the molecule of interest to the fluorescent labels that are measured by an imaging apparatus is more likely to be linear, as compared to secondary or tertiary labels, which involve amplification. Second, in the case of antibodies, which are used to bind to a molecule of interest, secondary methods of labeling limit the number of labels that can be used in the same sample because of cross-species reactivity. Being able to image directly-conjugated labels gives dual benefits of more accurate quantification, as well as the ability to perform higher degrees of multiplexing from an experiment design perspective.

When the hyperspectral imaging apparatus acquires data from the sample, the collected signal is susceptible to non-uniformities in the illumination as well as the variable quantum efficiency of the image sensor as a function of wavelength. These can cause spatial and spectral imperfections in the data, respectively. By applying non-uniform illumination and quantum efficiency correction, as previously described, hyperspectral imaging systems in accordance with the present disclosure are able to correct for these imperfections, and generate estimates of label quantifications that more accurately represent the true value in the physical sample. Hyperspectral imaging is superior to multispectral and conventional imaging methods for quantum efficiency correction or emitter light optical pathway spectral correction, as the spectral resolution is finer and results in more accurate modeling of the quantum efficiency variation of the image sensor as a function of wavelength.

Given the ability of hyperspectral imaging to more accurately measure label quantifications, it is possible to measure the absolute concentration of a molecule of interest. In a number of embodiments, a control sample with a known concentration of a molecule is bound to by a directly-conjugated label. The control sample is imaged by the hyperspectral imaging apparatus with a pre-defined set of image acquisition settings, such as light source intensity and image sensor exposure time. Then, the sample with the molecule of interest with unknown concentration is imaged. Corrections for non-uniform illumination and quantum efficiency are made, and spectral decomposition is performed to negate the effect of any background fluorescence. Finally, compensation for any changes in the image acquisition settings are made. For example, if ½ the light source intensity is used to image the test sample, and the measured signal is equal to the signal of the control sample, then it is expected that the concentration of the unknown sample is double that of the control sample.

In various embodiments, a label is applied with a known concentration and used to quantify the concentration of another label. Correction is made for the fluorescence collection efficiency of the optics, slit, and image sensor. The label with known concentration may be part of the sample substrate or is applied without a wash step so that the total concentration of the label is known. If a known concentration of a label is applied, but the concentration is not uniform, an image of the label over the entire slide may be used to quantify the label.

Figure 13A:
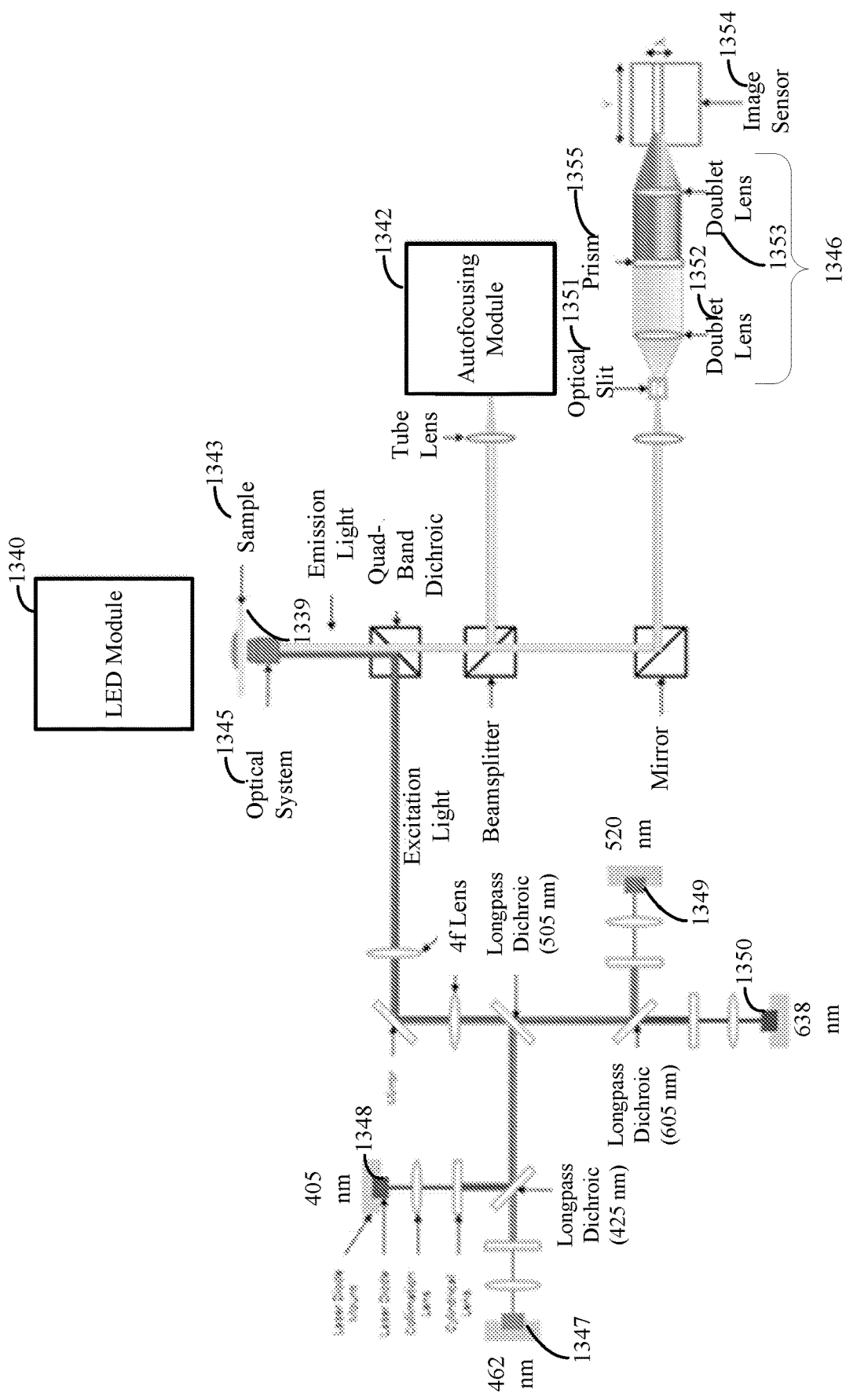
FIG. 13A is an example apparatus for generating a hyperspectral image, in accordance with embodiments of the present disclosure.

FIG. 13A is an example apparatus for generating a hyperspectral image, in accordance with embodiments of the present disclosure. The apparatus includes a microscope, and in various embodiments, can include the imaging apparatus illustrated by FIGS. 1A-1D.

As illustrated and previously described, the imaging apparatus includes the stage 1339, molecular sample 1343, optical system 1345, spectrometer 1346, imaging sensor 1354, the autofocusing module 742, and various other optional components. The spectrometer 1347 can include a lens 1352—prism 1355—lens 1353 arrangement and an optical slit 1351, as previously described. FIG. 13A also illustrates an example of a light source module 1340 including a light source arrangement and the configuration thereof in accordance with various embodiments. In the specific example illustrated, the four light sources 1347, 1348, 1349, 1350 are laser diodes that emit at 405 nm, 462 nm, 638 nm, and 520 nm, as previously illustrated and described, although embodiments are not so limited.

The light source arrangement can include a set of light sources 1347, 1348, 1349, 1350, which are focused into a line onto the molecular sample 1343. The emission light from the sample response to excitation by the light sources is separated by the spectrometer 1346 onto the image sensor 1354. The image sensor 1354 continuously captures new frames, which records spatial pixels in the y-axis of the molecular sample 1343, and spectral pixels (e.g., wavelengths) in the perpendicular axis on the image sensor 1354.

The illumination lines optionally may be imaged by a set of 4f lenses onto the plane of the molecular sample 1343. To maintain near-diffraction-limited resolution in the fast direction, fast axis collimation is performed with an aspheric or a cylindrical lens with a high numerical aperture (NA) of around 0.60 in order to prevent or mitigate spherical aberrations and beam truncation. Typically, the fast axis collimation is performed to provide a beam diameter that nearly fills the back pupil of the objective lens. Separate tailoring of the slow axis is required in order to match the illumination line width to the image width of the dispersive imaging spectrometer along the slit. This tailoring can be performed with cylindrical lenses. In one option, fast axis collimation is performed with an aspherical lens and one or more cylindrical lenses are used to make the laser diverge and/or converge in the slow axis direction to provide the necessary width of the illumination line. In another option, fast axis collimation is performed with an acylindrical lens and one or more cylindrical lenses are used to provide the necessary width of the illumination line. Longpass dichroics can be used to combine the beams from multiple lasers so that they share the same optical path. In a four-laser setup, three dichroics can be used. In a three-laser setup, two dichroics can be used. The 4f lenses may be achromatic doublet lenses that effectively relay an image of the laser beams onto the plane of the sample. These are optional in the design.

In specific embodiments, each light beam of the light sources 1347, 1348, 1349, 1350 is collimated by a lens, and then is expanded in one axis by one or more positive and/or negative cylindrical lenses to form an illumination line. A single positive cylindrical lens may be used to focus all lasers through the objective to broaden the laser in the slow axis. Precise angular alignment of this lens is required to align the illumination line with the spectrometer slit. Another optical slit or iris may be used at approximately one focal length before this final cylindrical lens to crop the edges of the light beam so there is little light outside the imaging region of the dispersive imaging spectrometer. This minimizes photobleaching by wasted light. The light sources can be used to illuminate the molecular sample 743 at the same time in various embodiments. For example, a longpass dichroic (425 nm cutoff) can be used to combine the 405 nm and 462 nm laser beams, while a second longpass dichroic (605 nm cutoff) is used to combine the 520 nm and 638 nm laser beams. Finally, the outputs of these dichroics are combined by a third longpass dichroic (505 nm). In other embodiments, the light sources are used to illuminate the molecular sample 743 sequentially (e.g., one at a time) or at different locations on the molecular sample.

Figure 13B:
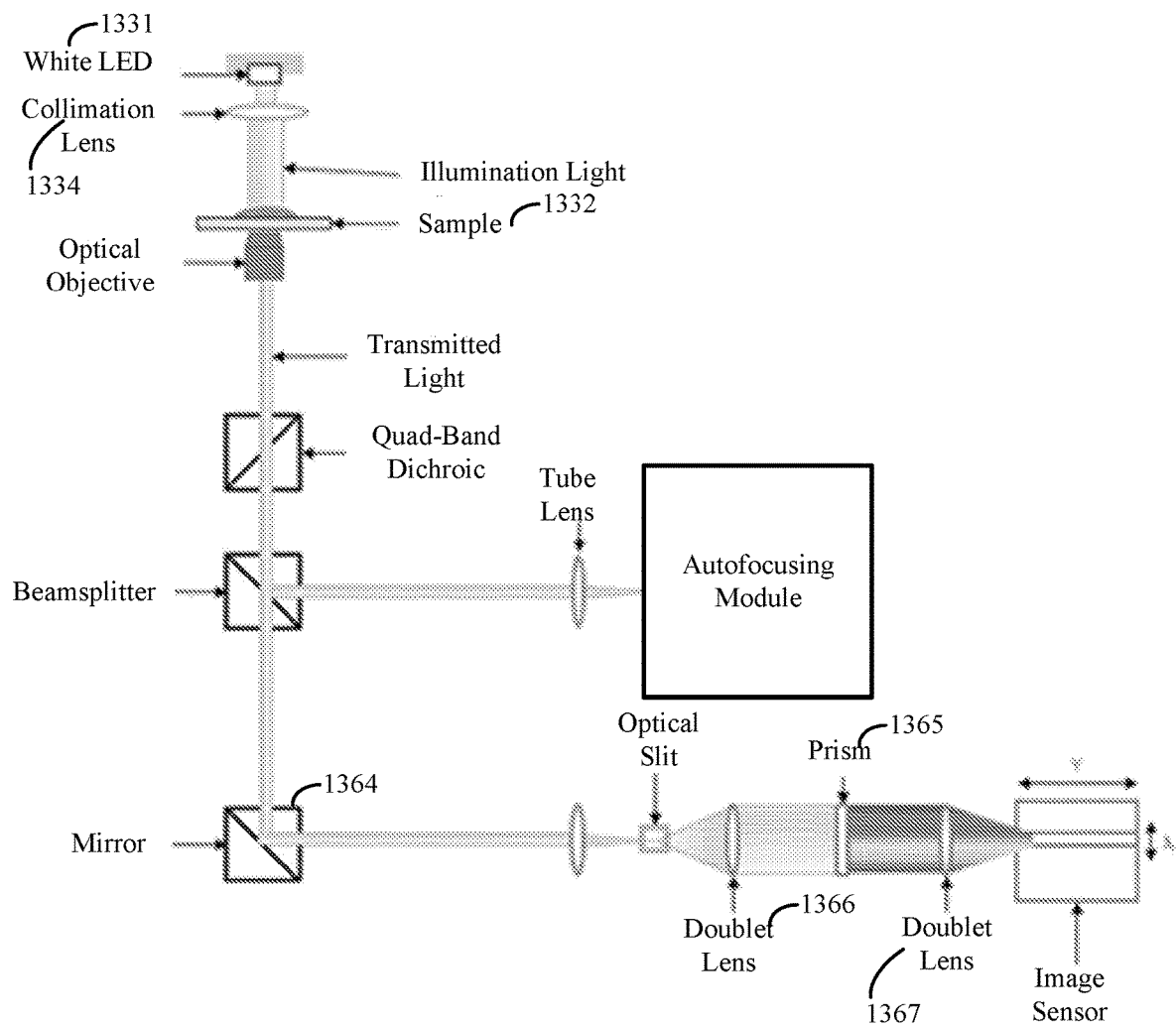
FIG. 13B is an example apparatus for generating a hyperspectral image, in accordance with embodiments of the present disclosure.

FIG. 13B is an example apparatus for generating a hyperspectral image, in accordance with embodiments of the present disclosure. More specifically, the apparatus illustrated by FIG. 13B is operating in a brightfield mode, in accordance with the present disclosure. The brightfield mode of the imaging apparatus can be used for various applications, including visualizing hematoxylin and eosin (H&E) stains in pathology; imaging cells, for example using enzymatic color staining; and autofocusing. The apparatus includes an imaging apparatus, and in various embodiments, can include the imaging apparatus illustrated by FIGS. 1A-1D. In this figure, the light source can include a white LED, multiple LEDs, or an incandescent lamp that is positioned on the opposite side of the molecular sample 1332 as the imaging spectrometer (e.g., prism 1365 and lenses 1366, 1367).

In various embodiments, a white LED is used to provide illumination for the brightfield imaging mode. Although embodiments are not so limited and various embodiments can include a lamp used to provide the illumination. The LED arrangement can consist of a surface-mount diode 1331, a collimation lens 1334, and passive cooling. The brightness and on-off state of the LED can be controlled by a LED controller or custom electronics. An advantage of an LED is that it can be pulsed on and off quickly to minimize motion blur, for example. An advantage of an incandescent lamp is that it provides broad and nearly continuous spectral illumination from a single light source.

Figure 14:
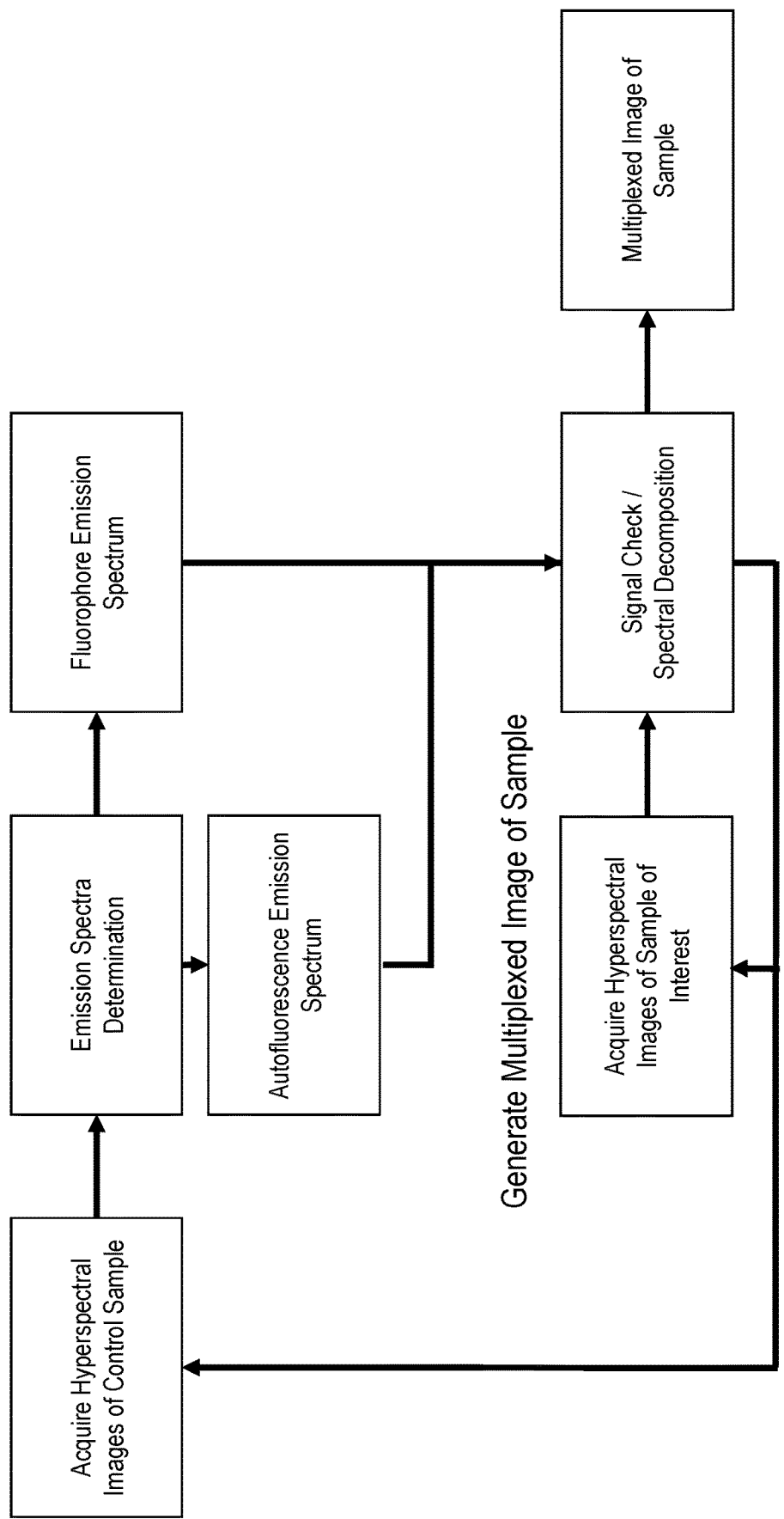
FIG. 14 illustrates an example process for generating a multiplexed image of a molecular sample, in accordance with embodiments of the present disclosure.

FIG. 14 illustrates an example process for generating a multiplexed image of a molecular sample, in accordance with embodiments of the present disclosure. As previously described and would be appreciated by one of ordinary skill in the art, when imaging fluorophore-based labels in a sample, background fluorescence interferes with the fluorescence signal from the labels is measured. The autofluorescence spectra can be measured in any number of ways, of which the following is one approach. In general, the spectra can be obtained by imaging a control sample that is known to only exhibit autofluorescence, and using blind spectral decomposition methods to determine the emission spectrum. For example, autofluorescence of the sample vessel substrate can be obtained by imaging the empty sample vessel. If only the imaging media exhibits autofluorescence, the emission spectrum of the imaging media can be obtained by imaging the sample vessel with only the imaging media present. If there is autofluorescence of the sample, its emission spectrum can be obtained by imaging an unlabeled sample in the sample vessel.

In various specific embodiments, the above-described imaging apparatuses can be used to generate a multiplexed image of a sample. The multiplexed imaged can be of four or more biomolecules. For example, antibodies, aptamers, peptides, and other specific binding reagents can be used to directly conjugate to fluorophores. The imaging apparatus collects the hyperspectral image data, as described above, and performs spectral decomposition to negate background fluorescence and to quantify the amount of each biomolecule.

Figure 15:
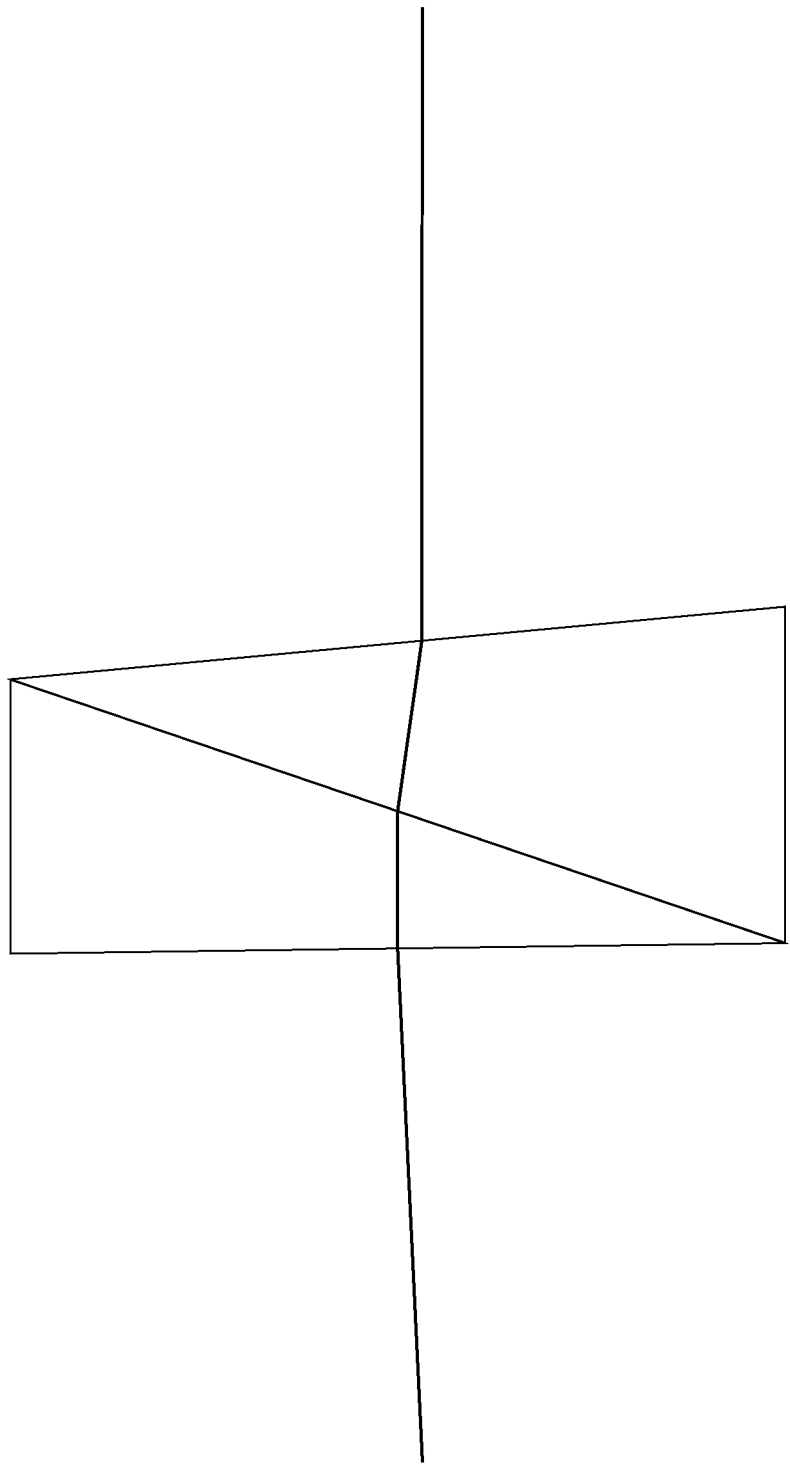
FIG. 15 illustrates an example of a two-component prism, in accordance with embodiments of the present disclosure.

FIG. 15 illustrates an example of a two-component prism, in accordance with embodiments of the present disclosure. As illustrated the prism can include two components that can provide improved dispersion linearity, as previously described.

In various embodiments, the hyperspectral imaging apparatus can include one or more optical slits. Precise alignment between the line illuminated by the laser and the entrance slit of the dispersive imaging spectrometer can be beneficial. For example, with a slit width of 3.5 microns and a tube lens focal length of 75 mm, the angular tolerance is less than 3.5/75,000 or 47 microradians. The following describes two example ways to achieve this tolerance, although embodiments are not so limited. The first is to design the system with mechanical and thermal stability such that once the system is initially aligned, it remains aligned. The other option is to make the system self-aligning. The alignment can be in one direction, perpendicular to the slit. For self-alignment, a motor or other servo is used to move a mirror or other means to vary the position of the laser with regard to the slit. Feedback from the image sensor behind the dispersive imaging spectrometer is used to drive the motor or servo to optimize the signal from a fluorescent test slide or a reflection from any slide, resulting in an optimal alignment. This procedure may be performed with the fluorescence or reflective surface in focus on the slit.

As previously described, various embodiments include an imaging spectrometer that can be used to filter the light emitted to an illumination line at different portions of the molecular sample. For example, the apparatus includes a light source arrangement, an imaging spectrometer, an image sensor, and control circuitry. The light source arrangement has at least one light source to generate optical power for delivering a plurality of illumination lines at a molecular sample. In response to the at least one light source generating the optical power, the imaging spectrometer separates light emitted from the molecular sample illuminated by the plurality of illumination lines into a plurality of different component wavelengths. The imaging is spectrometer is configured and arranged to filter the light emitted, which can be at or associated with different portions of the molecular sample. The imaging spectrometer can include an optical slit to filter the light emitted reflected, transmitted or scattered into different wavelength positions on the image sensor. In other embodiments, the light source arrangement includes a plurality of light sources, and at least two of the plurality of light sources have non-overlapping sets of wavelengths. The image sensor, which includes circuitry, collects the light emitted along an optical pathway from the molecular sample that corresponds to the plurality of different component wavelengths. The control circuitry is arranged with the image sensor to scan the molecular sample by causing the image sensor to scan the molecular sample while the imaging spectrometer is aligned with the image sensor, and collecting hyperspectral image data of the molecular sample from the light emitted that corresponds to the plurality of different component wavelengths.

In some embodiments, as described below, an optical slit can filter the light emitted to a line at one or more regions imaged. For example, the imaging spectrometer can include a plurality of optical slits used to filter the light emitted, reflected, transmitted or scattered. The light source arrangement can include a set of light sources per optical slit of the plurality. For example, the light source arrangement includes two light sources per optical slit of the plurality. In related and specific embodiments, the apparatus includes a plurality of image sensors, with each image sensor being arranged with one of the plurality of optical slits or with a set of the plurality of optical slits. In other embodiments, the light source arrangement includes a plurality of light sources, and at least two of the plurality of light sources have non-overlapping sets of wavelengths which are used to filter the light emitted to the different component wavelengths at the image sensor. Similar to other embodiments, one or more of the light sources can generate sufficient power for delivering at least 100 mW of optical power for each of the plurality of illumination lines at the molecular sample.

Figure 16A:
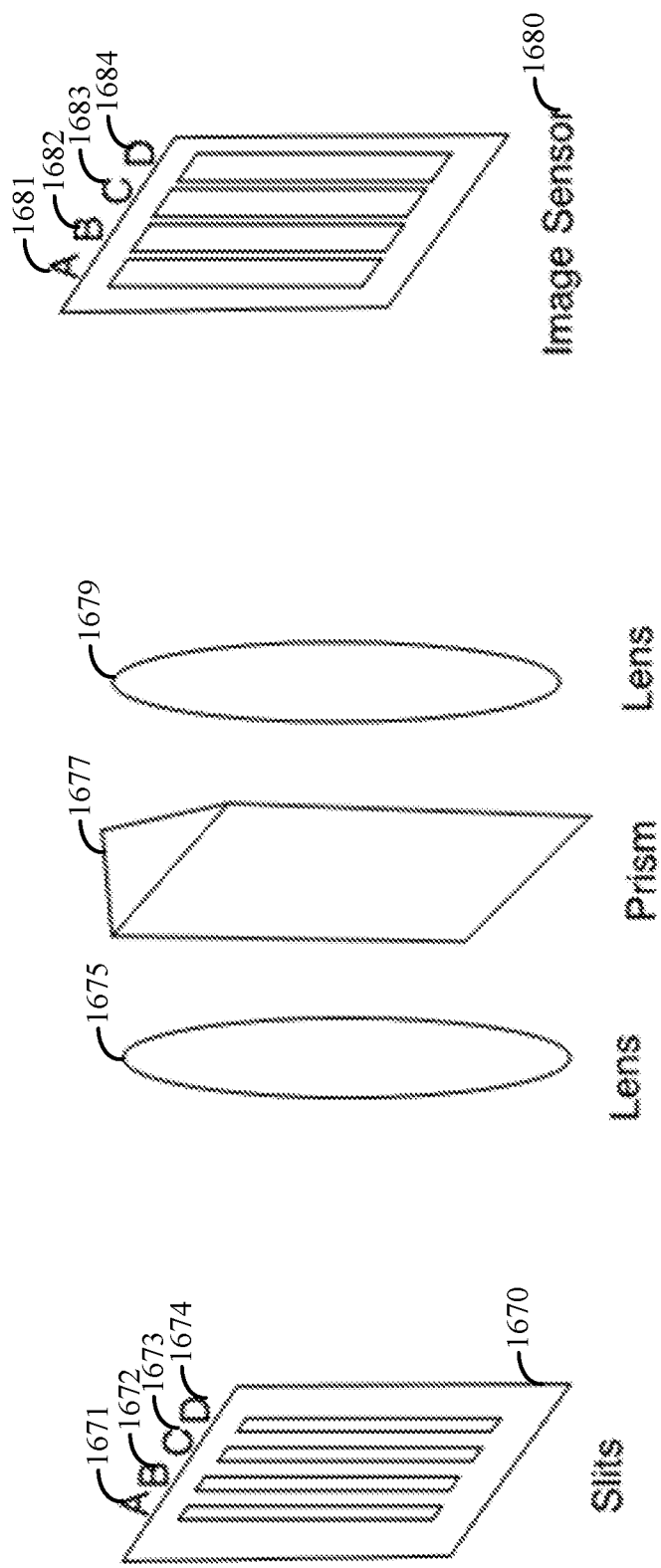
FIGS. 16A-16B illustrate an example optical slit with multiple slits, in accordance with embodiments of the present disclosure.
Figure 16B:
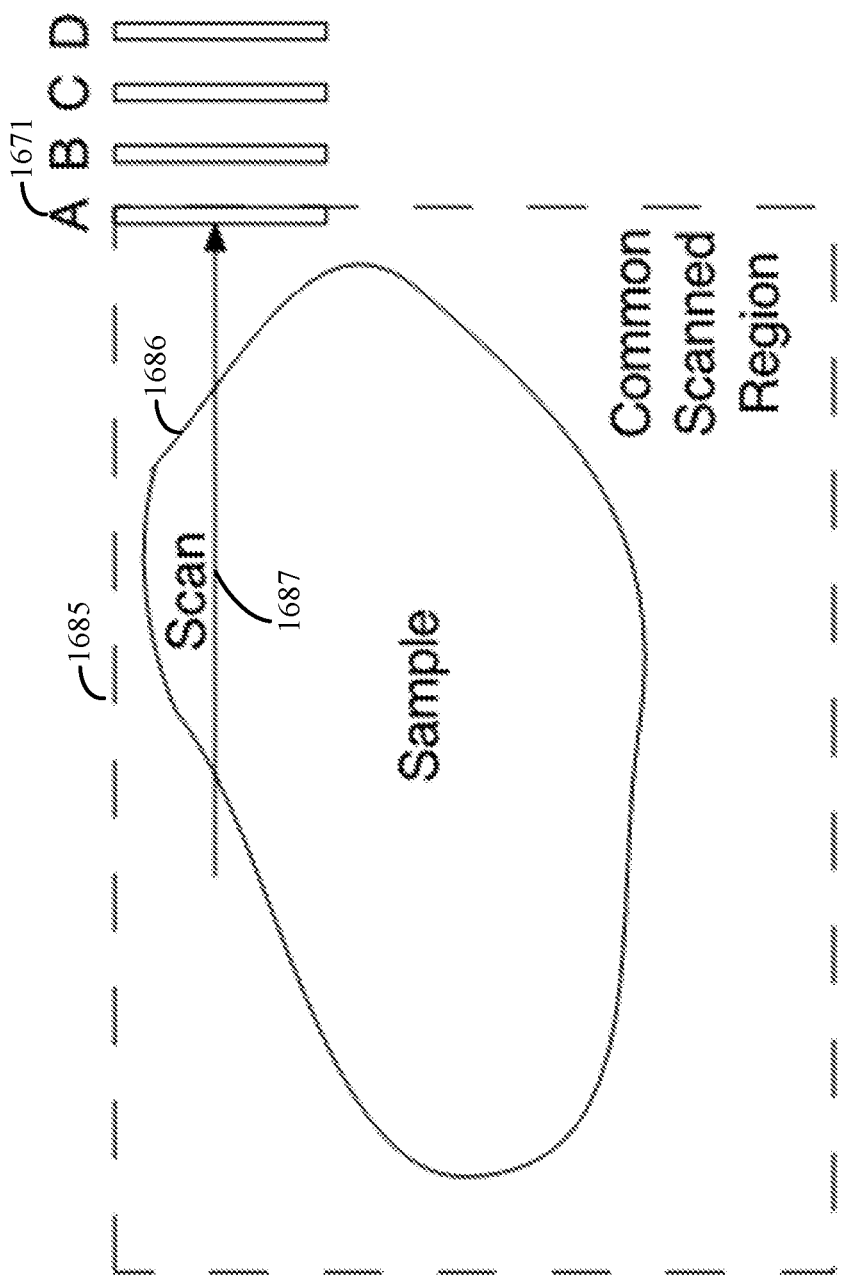

FIGS. 16A-16B illustrate an example optical slit with multiple slits, in accordance with embodiments of the present disclosure. To increase the number of simultaneous labels that can be imaged, improve the dynamic range, and reduce crosstalk, a multi-slit geometry may be used for high-speed hyperspectral imaging instead of a single slit. FIG. 16A illustrates an optical slit 1670 having multiple slits 1671, 1672, 1673, 1674.

The multiple slits 1671, 1672, 1673, 1674 are parallel to each other as shown in FIG. 16A. Each of the four slits 1671, 1672, 1673, 1674 (A-D) is imaged onto the image sensor 1680 at a different position 1681, 1682, 1683, 1684 (positions A-D) by lenses or curved mirrors 1675, 1677, 1679. The prism (or a grating) of the spectrometer separates the light to form a spectrum at each position 1681, 1682, 1683, 1684 (A-D) on the image sensor 1680. The slit positions and dispersion of the prism or grating are selected such that the spectra do not overlap. If necessary, long or short pass filters may be placed in the imaging path to reduce overlap between the spectra. Not shown are the light sources used for illumination. Each light source can be focused onto a separate line on the molecular sample at an appropriate spacing such that the imaging apparatus images the appropriate illumination line onto the appropriate slit 1671, 1672, 1673, 1674. Because the fluorescence from each light source is spread into a separately-detected spectrum, the overlap between labels (e.g., fluorophores) excited by different light sources can be reduced or mitigated. This can allow for a larger number of fluorophores or other labels to be imaged concurrently. For example, short wavelength blue light may be used to excite a broad range of colors from quantum dots without overlap from dyes that are excited by longer wavelengths. In an alternate configuration, one or more image sensors may be used, with one slit per image sensor (e.g., four image sensors) or multiple slits per sensor (e.g., four slits and two sensors). Mirrors, gratings, and/or prisms may be used to split the beam paths before or after the slits onto the different spectrometers or image sensors.

When using the optical slit 1670 having multiple slits, each of the slits can image a different portion of the molecular sample, as is illustrated by FIG. 16B. During a scan 1687, the light sources or regions imaged onto each slit are scanned perpendicularly to the light sources/slits, such that each slit images the same portion of the molecular sample 1686 at different times. The imaged regions for each slit can be slightly different because of the different light source and/or slit positions. The region imaged by all slits can be referred to as the common region 1685. Image registration of the assembled images for each slit in the common region 1685 can compensate for the slightly different imaging times. This registration may be performed based on the known slit spacing and stage speed, based on imaged features in the image of the molecular sample 1686, or by registration marks. At the end of the scan of the entire molecular sample, some slits may extend beyond the common region 1685. For example, in FIG. 16B, a scan to the right is just ending. Slit A 1687 is still in the common region 1685, while slits B-D extend beyond the common region 1685. Because of this extension beyond the common region 1685, the scanned region can be larger than a scanned region using a single slit. The spacing between the slits is small compared with the size of the common imaged region 1685 (a few hundred µm as compared with many mm), and only a very small additional time is required for the wider scan with multiple slits. If there is concern about illuminating regions beyond the common region 1685, the light sources may be turned off once each slit leaves the common region 1685. Similarly, when using multiple image sensors, image acquisition may be halted when leaving the common region 1685.

Figure 17B:
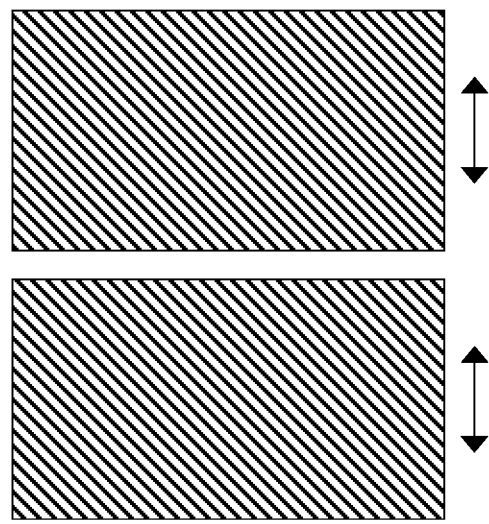
FIGS. 17A-17B illustrate an example optical slit that is adjustable, in accordance with embodiments of the present disclosure.
Figure 17A:
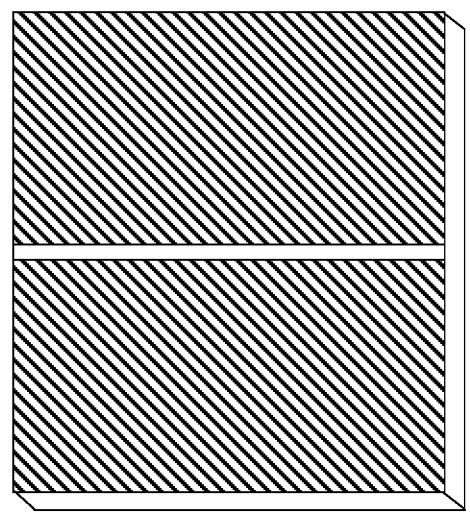

FIGS. 17A-17B illustrate an example of a fixed optical slit and an adjustable optical slit, respectfully and in accordance with embodiments of the present disclosure. The fixed optical slit (FIG. 17A) can have edges of the slit fabricated photolithographically to a very high tolerance, which can be an advantage. As previously described, the width of the adjustable optical slit can be varied manually or using control circuitry of the imaging apparatus. The width of the slit is controlled to provide an amount of light that is sufficient to recognize target objects in the molecular sample. For example, the greater the width of the optical slit, the more light that is collected, whereas a smaller width reduces out-of-focus light. As illustrated, FIG. 17B illustrates a wider width of the optical slit than the width illustrated by FIG. 17A.

Figure 18:
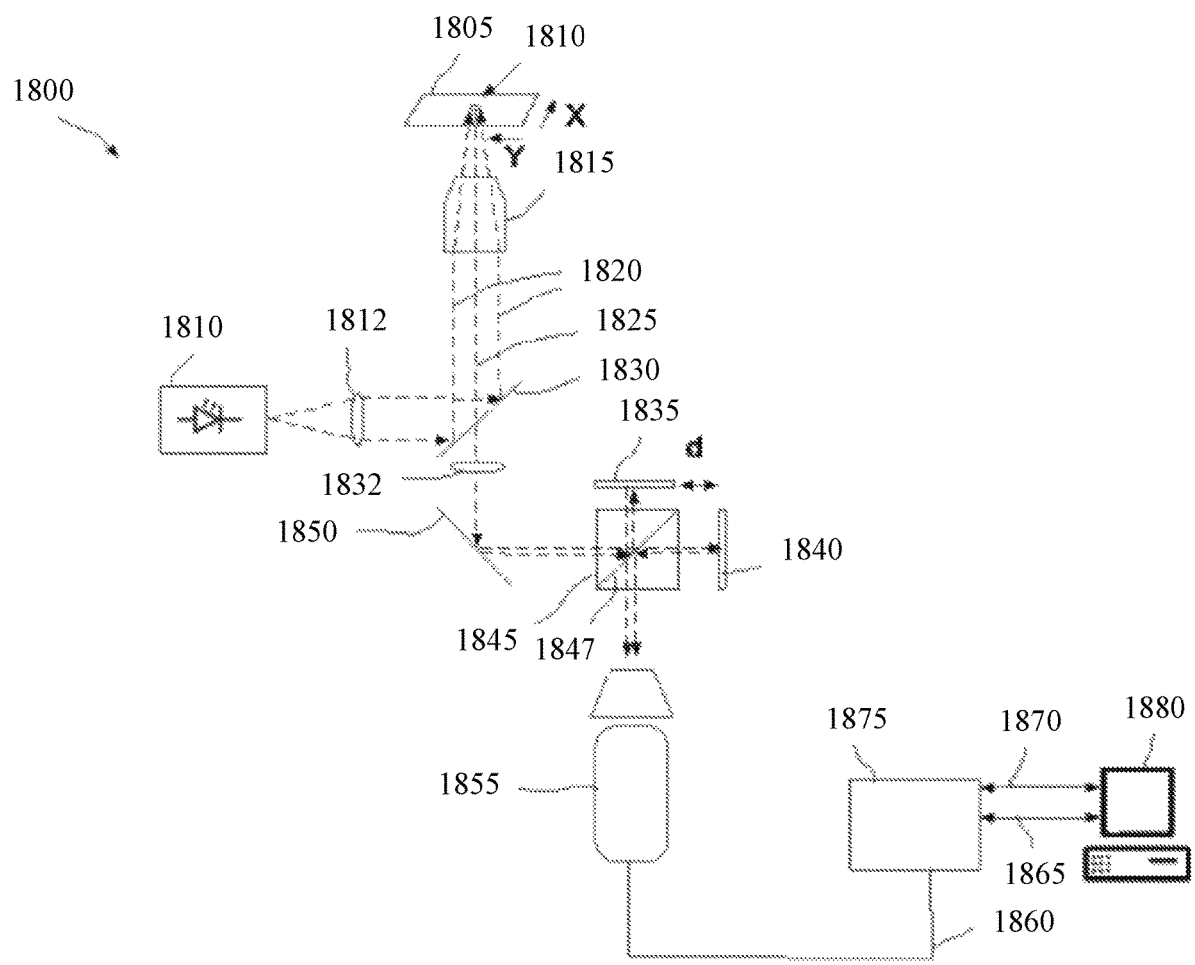
FIG. 18 illustrates another configuration of an imaging apparatus, in accordance with embodiments of the present disclosure.

FIG. 18 illustrates another configuration of a staring imaging apparatus based on Fourier transform spectral imaging, in accordance with embodiments of the present disclosure. As shown in FIG. 18, the light source for fluorescence or reflectance/absorbance measurements may be a light emitting diode (LED) 1810, lamp, and/or laser. Although fluorescence measurements are described in the following, measurements of reflectance, absorbance, and/or scattering are also possible with modifications to the illumination and detection light paths. The beams of light are shown as dashed lines in this figure. Through a lens(es) 1812 and a dichroic mirror 1830 and a microscope objective 1815, light is focused onto a spot 1810 on the slide 1805 which contains the specimen that needs to be analyzed. Dashed lines 1820 depict the path of light from the LED or lamp to the specimen. Dashed line 1825 depicts the path of light associated with the fluorescence signal from the specimen. This light travels through focusing optics such as lens 1832 and is arranged to be incident on mirror 1850. This light then enters the interferometer 1845. Although a Michelson interferometer is shown, other types of interferometers such as Mach Zender or Fabry Perot interferometers may also be used. The components of the interferometer such as the dichroic mirror 1847, the fixed mirror 1835 and the adjustable mirror 1840 are shown. The parameter "d" illustrated in the figure depicts the distance of the adjustable mirror from a known reference location. The interferometer is well described and is not described further here. The output of the interferometer, called an "interferogram", is then captured by the camera 1855. As before, the camera 1855 may contain a 2D CCD array. Thus the interferogram associated with a specific spot such as spot 1810 and a specific distance d of the adjustable mirror 1840, may be captured by a single pixel on the camera in sequential frames. The CCD readout flows out through a cable, such as a fiber optic cable 1860.

The interferometer may be scanned using a servo or piezoelectric crystal. The linearity of the scan may be controlled through a calibrated drive signal to the servo or piezo or by using feedback from an additional signal such as the interference fringes from a light source or an electrical displacement sensor. An option for an interference fringe signal is to use a laser that is not detected by the image sensor. For example, with a silicon-based sensor, one can use a near infrared light source such as a laser or lamp near 1.5 microns and detect the interference fringes using a near infrared detector such as those based on InGaAs or germanium. Computations are then performed on the data by a computation device 1875. A number of computation devices may be utilized, such as but not limited to an FPGA. Finally, the processed data is output to a computer for display or further analysis. The data processing, which includes some advantageous concepts for spectral decomposition and phase correction, as previously described.

Figure 19B:
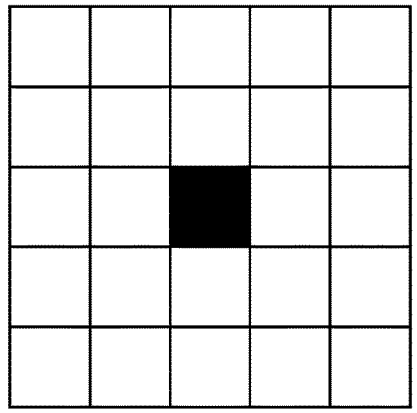
FIG. 19A-19C illustrate examples of pixel saturation and corrections of the same, in accordance with embodiments of the present disclosure.
Figure 19C:
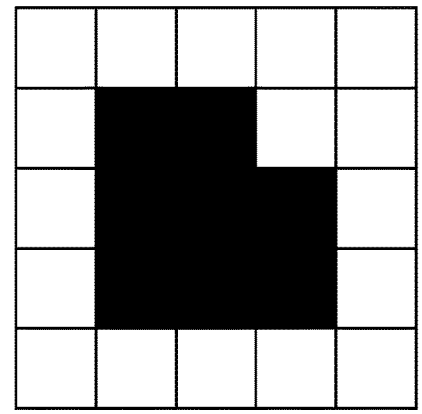
Figure 19A:
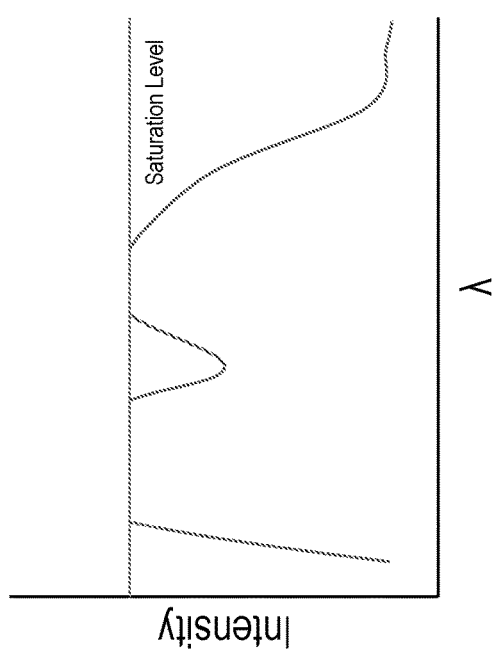

FIG. 19A-19C illustrate examples of pixel saturation and corrections of the same, in accordance with embodiments of the present disclosure. In any image sensor, each pixel collects electrons in a well that has a specific well depth, which is also known as saturation capacity. Throughout the course of the imaging process, pixel(s) that collects light from the sample may become saturated due to a large light signal that is concentrated at a point or region in the sample. This saturation may occur for a single spatial point, a spatial region, or for the entire field of view. Further, the saturation can vary versus wavelength. In the event that these scenarios occur, the hyperspectral imaging system can course-correct for the saturation.

In embodiments in which the measured spectra for a spatial point in the sample is partially saturated, see FIG. 19A as an example, the underlying label quantification from the measurement can be retrieved. This is possible because the system is measuring the emission of a label across its entire emission spectrum, and not just at its peak. Therefore, in many situations when the measurement is saturated in the peak of the emission spectrum, the left and right tails of the emission spectrum may not be saturated. Thus, when performing spectral decomposition, saturated spectral points can be omitted and still have an overdetermined system of equations. This can result in a set of label quantifications that are combined with the emission spectrum of each label, and can be used to reconstruct the measurement if saturation had not been present. In other words, the unsaturated data can be used to effectively interpolate the saturated data.

In other embodiments, when the saturated region encompasses the entire emission spectrum of a label, the above method no longer applies. This results in the use of spatial data, such as information from neighboring spatial points, and/or re-imaging of the sample point with modified image acquisition settings.

In some embodiments, such as when a saturated spatial point (e.g., FIG. 19A) is surrounded by a set of unsaturated spatial points, a two-dimensional interpolation algorithm, such as cubic spline interpolation, may be used to predict the quantity of a specific label. The remaining label quantifications can be determined using normal spectral decomposition methods where the saturated data is omitted.

In other related embodiments, where accurate quantization is critical, or an entire spatial region is saturated (e.g., FIG. 19B), it may be appropriate to flag these point(s) for re-imaging with an adjusted set of image acquisition settings. Example setting adjustments include reducing the intensity or duty cycle of the light source, or decreasing the exposure time or gain of the image sensor.

In each of the above embodiments, the stage sends the current position of the saturated point to the control circuitry, which then builds a map of saturated points (in the case that a sample region, and not a single point, is saturated). Once imaging of the current region is completed, or when the sample scan is complete, the control circuitry issues a command to the stage to rescan this map of saturated points, with the adjusted image acquisition settings. If the acquired data is still saturated, then the process is repeated with a new set of image acquisition settings (e.g. with reduced image sensor exposure time) until the data is no longer saturated.

This set of re-acquired data can be aligned with the original image, using a series of image registration methods. Then, the numerical value of the data can be corrected for the change in image acquisition settings between the initial scan and the re-scan. For example, consider a 12-bit imaging system, where the intensity values coming off the image sensor are between 0 and 4095. If the recorded intensity of the re-scan is 2,400, but the re-scan used 50% of the exposure time of the initial scan, then the adjusted intensity can be 4,800, which is above the dynamic range of the 12-bit system. This new data can be substituted in for the saturated data, and spectral decomposition methods can be used to determine the quantity of each label in the sample.

Figure 20A:
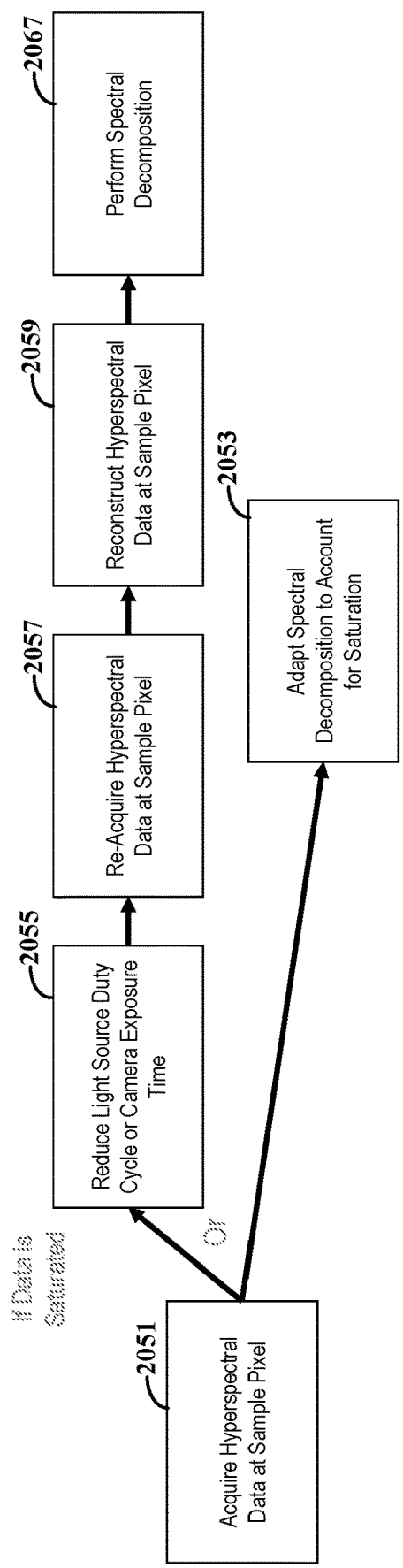
FIGS. 20A-20B illustrate an example process for generating hyperspectral image data, in accordance with embodiments of the present disclosure.
Figure 20B:
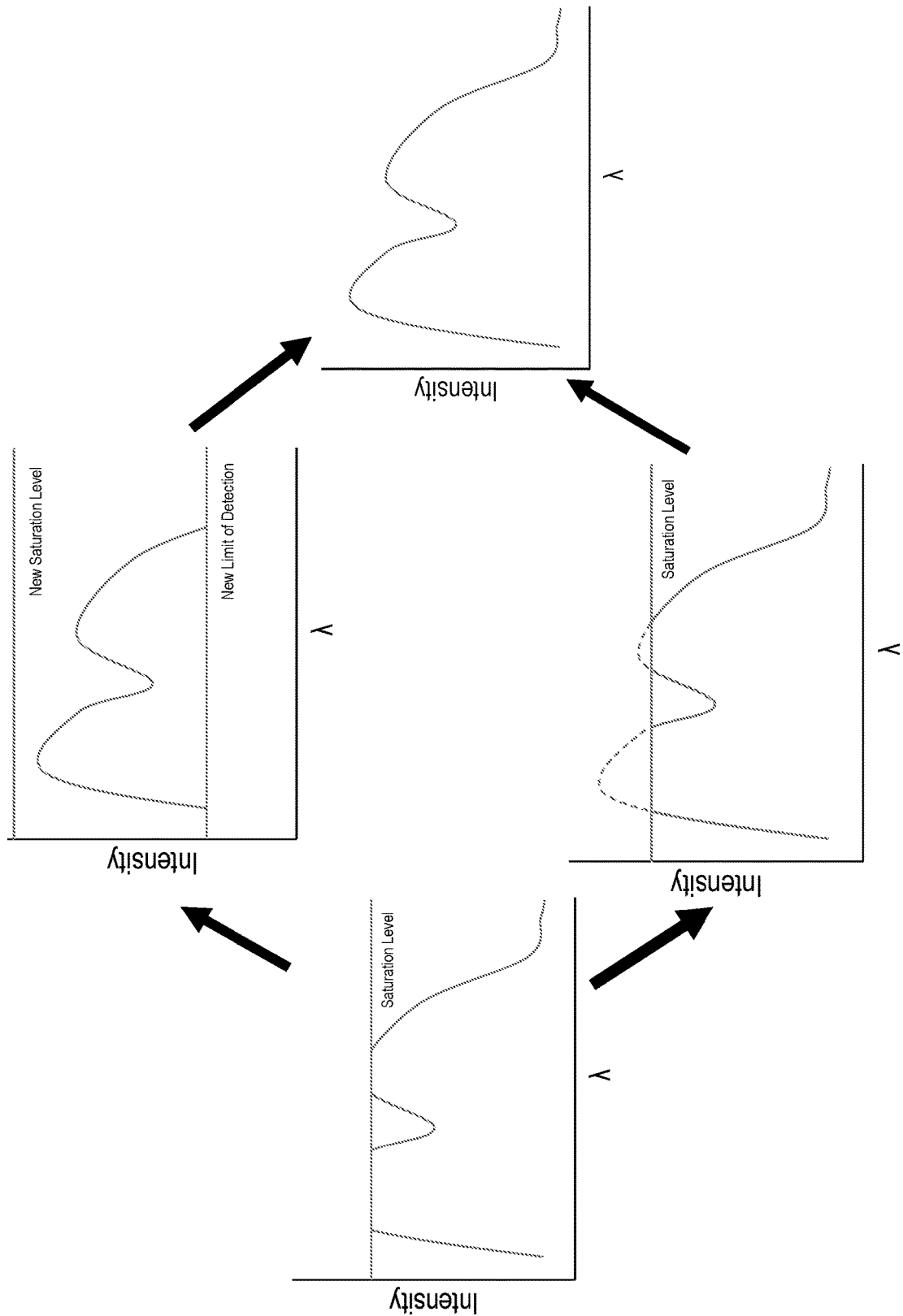

FIGS. 20A-20B illustrates an example process for generating hyperspectral image data by accounting for saturated pixels, in accordance with embodiments of the present disclosure. As illustrated by FIG. 20A, at 2051, hyperspectral image data for a sample pixel is acquired, as described above. The control circuitry (or other processing circuitry) can determine whether or not the data is saturated. In response to the data not being saturated, the data is decomposed as described above. In response to the data being saturated, two different process can occur. The first includes re-imaging, as further described below. The second includes, at 2053, performing spectral decomposition on the saturated pixels using information from adjacent sample points that are not saturated. In either process, the pixels that are saturated can be flagged for the further processing.

The re-imaging process can include, at 2055, adjusting the amount of light or exposure time. For example, the output power or exposure time can be reduced, and at 2057, the sample pixel is re-imaged to the re-acquired hyperspectral image data for the sample pixel. At 2059, the hyperspectral image data for the sample pixel is reconstructed and at 2067, spectral decomposition is performed. For example, the saturated hyperspectral image data can be replaced with non-saturated image data with appropriate correction for the different illumination and/or exposure time. The corrected data is then used to transform the hyperspectral image data into quantifications of the labels in the molecular sample. FIG. 20B illustrates an example of the adjustment of saturation level caused by adjusting the amount of light and/or exposure time.

Alternatively and/or in addition, various embodiments are directed to adjusting the laser intensity or pulse-width during the scan to avoid saturation through an on-the-fly illumination control. For example, the control circuitry may be used to maintain a measured peak signal from the image sensor in a threshold saturation range, such as 50 percent to 75 percent of saturation. If, in the course of the scan, the measured peak signal falls outside this range, the laser intensity or pulse-width can be varied to keep the peak image sensor signal within this range. Each frame from the image sensor can be divided by the varying intensity or pulse-width to maintain a constant image signal in counts per mW or counts per millisecond. This can allow for quantification throughout the scan in spite of the changing intensity or pulse-width. Because typical biological samples do not have discontinuous label concentration, the gradually varying label concentration can allow the system to respond before the image sensor reaches saturation. Furthermore, this approach can help improve the dynamic range by avoiding very weak signals through increased illumination (intensity or pulse-width).

Figure 21A:
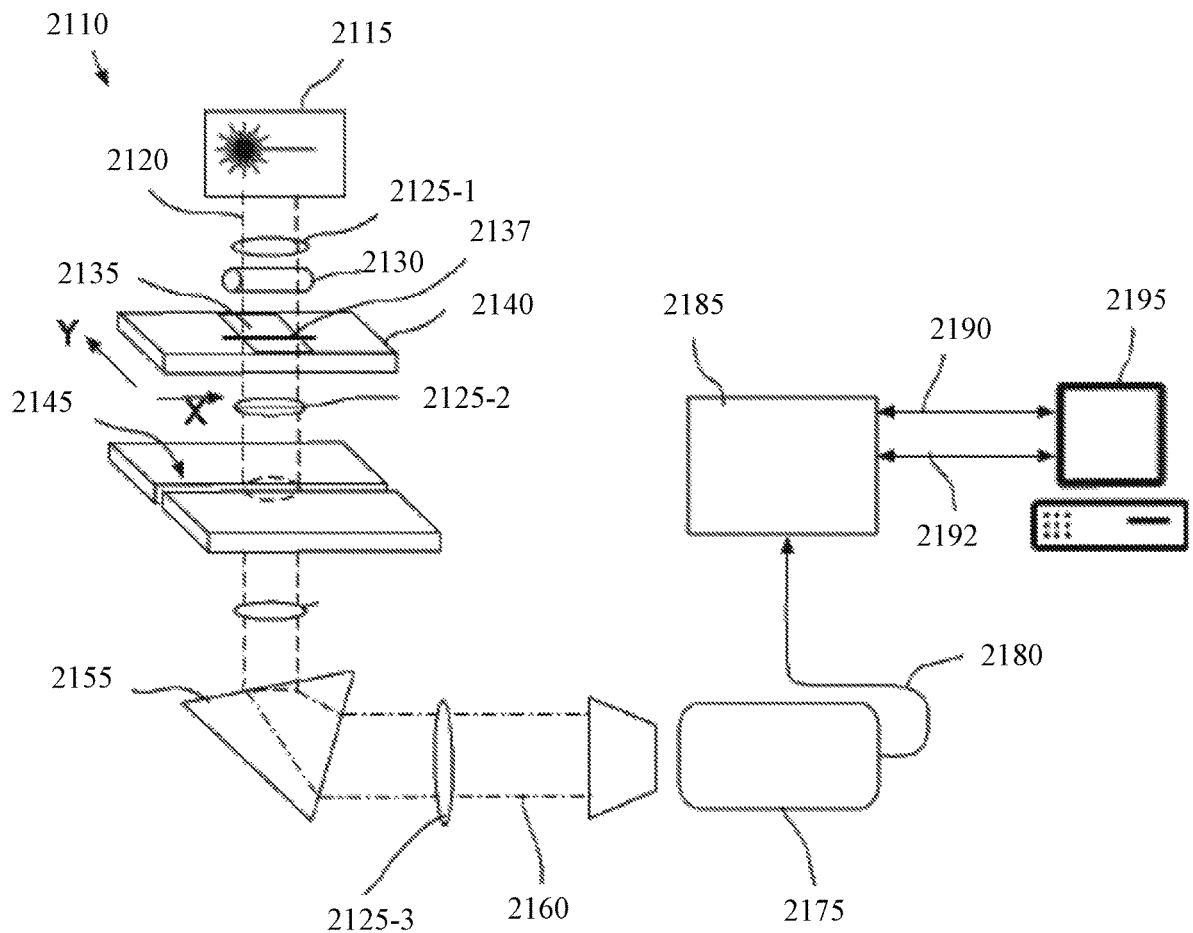
FIGS. 21A-21D show an example configuration of a high-speed, high throughput imaging apparatus in accordance with embodiments of the present disclosure.

FIGS. 21A-21D show an example configuration of a high-speed, high throughput imaging apparatus using a dispersive imaging spectrometer, in accordance with embodiments of the present disclosure. FIG. 21A shows an example configuration of a high-speed, high throughput imaging apparatus 2110. The laser is shown as 2115, from which laser energy emanates and is shown in dashed lines as 2120. The apparatus has multiple lenses generally enumerated as 2125-1, 2125-2, 2125-3. It is to be understood that each lens can have different focusing characteristics depending on its location in the path of the light. These details of choosing the various lenses are well known and will not be described here. The laser light is focused and converted to a line by the cylindrical lens 2130. Thus, through such focusing and filtering (not shown in the figure), the light illuminates a slide 335 along the line 2137. The slide may contain one or multiple biologic molecules that need to be analyzed. The slide is positioned and secured to a high-resolution stage, which can be translated in two degrees of freedom along the X and Y direction. The stage can be arranged so that the movement in the Y direction can be very fast and the movement in the X direction can be slower. Alternatively, the scanning in both directions may be fast. The slide should be reasonably flat. When scanning larger areas (e.g., around 86 mm×128 mm), it will be beneficial to use methods to keep the scan in focus. This is because (1) high numerical aperture lenses provide the best light collection from the fluorophore, and a high numerical aperture reduces the depth of field and (2) the line scan in FIG. 21A is confocal in one direction, also constraining the depth of field.

Methods to keep the lens in focus include those that use reflection of an infrared beam from the slide surface with feedback to maintain the focus. Alternatively, the focus can be tested at a coarse interval on the slide and interpolation between these x-y-z in focus points can be used to retain the focus. In various embodiments, the imaging apparatus can include the autofocusing control circuitry used to perform autofocusing as the scan of the molecular sample is occurring.

The slide can have cells, tissue sections, exosomes, or other objects on the surface. It is advantageous to ensure that the imaged sample adheres to the slide such as by physisorption, chemisorption, electric charge, chemical reaction, fixation, or binding medium so that it does not move during the scan. The light then is incident upon the slit 2145, which restricts the light along the Y axis before becoming incident upon the prism 2155. The prism separates out the light into its component colors as shown by the dashed dotted beam 2160. The component colors then are incident upon a monochrome camera that has a two-dimensional (2D) CMOS or CCD image sensor. The component colors are incident on different locations of the CMOS image sensor along one dimension of the image sensor.

Figure 21B:
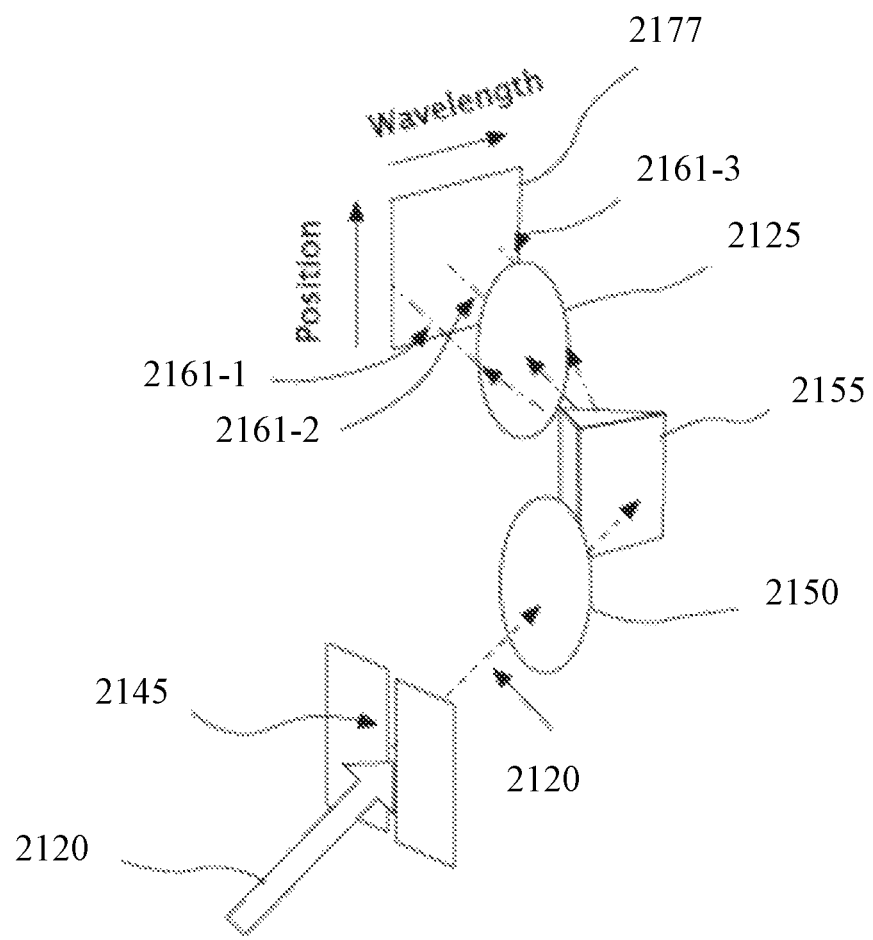

Although well known (commonly called a dispersive imaging spectrometer), this last concept is described in FIG. 21B to provide the background for the new concepts described herein. In FIG. 21B, the light is seen splitting into its component colors after it passes through the prism. Three components are illustrated as 2161-1, 2161-2 and 2161-3. In reality, depending on the fluorescence, there could be detectable power on none, one or multiple wavelengths incident on the image sensor. As evident from the figure, each wavelength falls at a different location along the "wavelength" dimension in the CMOS image sensor. By reading the position of the pixels that are excited, the wavelength is calculated. Thus, referring back to FIG. 21A, and noting that the light beam is focused along a line by the cylindrical lens 2130, objects along the X dimension that are fluorescing can excite pixels along the "Position" axis illustrated in FIG. 21B. Each position along line 2137 corresponds to the position along the "Position" axis and for each position, the component colors are located along the "Wavelength" axis. After the CMOS image sensor is read, the stage 2140 is translated to another position along the Y dimension and a spectrum analysis is performed for a different line of objects. It may be necessary to move the stage in the X dimension, depending on the usable width of the beam and the glass slide 2135. The CMOS readout flows out through a cable, such as a fiber optic cable 2180.

Some type of processing circuitry 2185 such as a field-programmable gate array (FPGA) then processes the data. The processed data can be output to external circuitry (e.g., a standalone central processing unit (CPU) such as a desktop computer, a laptop computer, a server) for display or further analysis. FIGS. 21A and 21B show an imaging spectrometer using lenses and a prism. Other spectrometers comprise mirrors instead of lenses or a grating instead of a prism. Although the laser in FIG. 21A is on the opposite side of the molecular sample from the spectrometer, in many cases the laser is on the same side so that the excitation and emission light pass through a single lens or microscope objective. In this case, dichroic filters or other means are used to separate the excitation and emission light.

For high-throughput imaging, there are two notable challenges involved that are addressed in this disclosure. The first is that the data must be acquired very rapidly since many wavelengths are required at each pixel. As an example, for an image with 512×512 pixels, with 128 wavelengths measured at each pixel at 30 frames/s, the overall acquisition rate is about 1 gigapixels/s or 1 billion measurements/s. The second challenge concerns the analysis and display of the large amount of data once it is acquired. In principle, it is possible to store the data. However the large data size makes storing, accessing and analyzing time consuming. In situations where quick results are required (low latency) or when such systems are utilized in a real-time imaging application, processing the data at a rapid rate in real time (as a pipeline) becomes advantageous. The concepts described below illustrate how this may be accomplished. However, one other background concept is now described that will clarify the advanced concepts. This background concept is now described with the help of FIG. 21C.

Figure 21C:
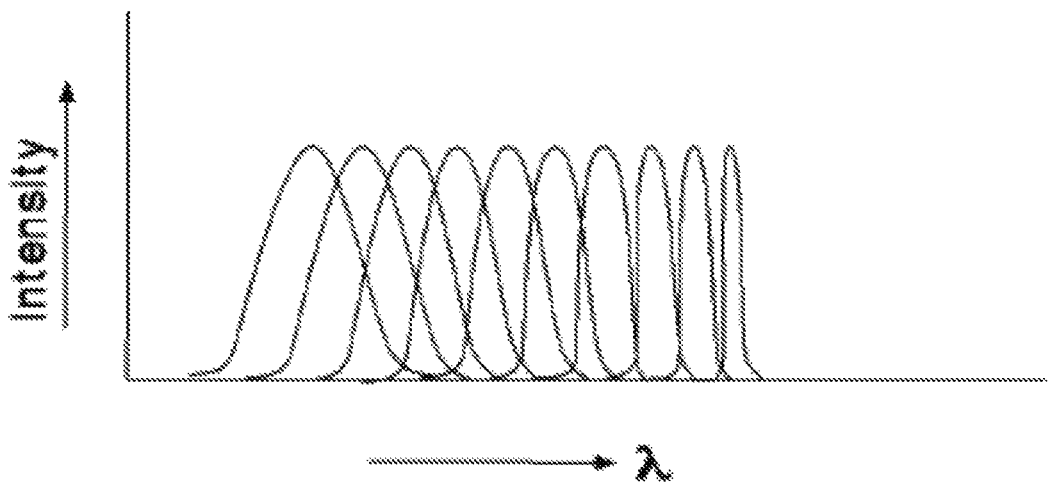

In FIG. 21C, the spectra of multiple fluorescent labels are illustrated. These labels may be fluorescent dyes or quantum dots or other labels. Each curve in the figure is associated with an individual spectrum from a label. A general goal in many molecular diagnostic instruments is to detect the presence or absence of these labels based on detection of specific wavelengths. Due to the limitations of those on-market systems, often only a few wavelengths may be detectable. As an example, conventional systems that use photo-multiplier tubes (PMTs) can only detect a limited number of wavelengths because the PMTs are tuned to a specific frequency such as with filters and generally the cost of the systems increases as more PMTs are added. Another limitation may be encountered in apparatuses that sample the wavelengths. The amount of data generated by these systems can become overwhelming for the architectures of these systems. Referring back to the example given above, for a 512×512 pixel or larger image, where for each pixel 128 wavelengths are measured, the amount of data generated is nearly 1 billion measurements. Thus conventional systems often accommodate this issue by limiting the number of wavelengths analyzed. There are several consequences of limiting the number of wavelengths that can be analyzed. One consequence is that it limits the number of fluorophores that can be analyzed. Another consequence is that the discrimination of fluorophores becomes more difficult with fewer wavelength measurements. In other words, as can be seen from FIG. 21C, if the emission spectra are closely spaced, it may be difficult to distinguish one fluorophore from another. This issue of course gets worse with more fluorophores since the available detection wavelength range is limited. A consequence of measuring many wavelengths, as noted above, is that if a system has an architecture that samples the wavelengths densely, the amount of data that needs to be analyzed and transferred across processing and display units become immense. The concepts below overcome the limitations above.

Figure 21D:
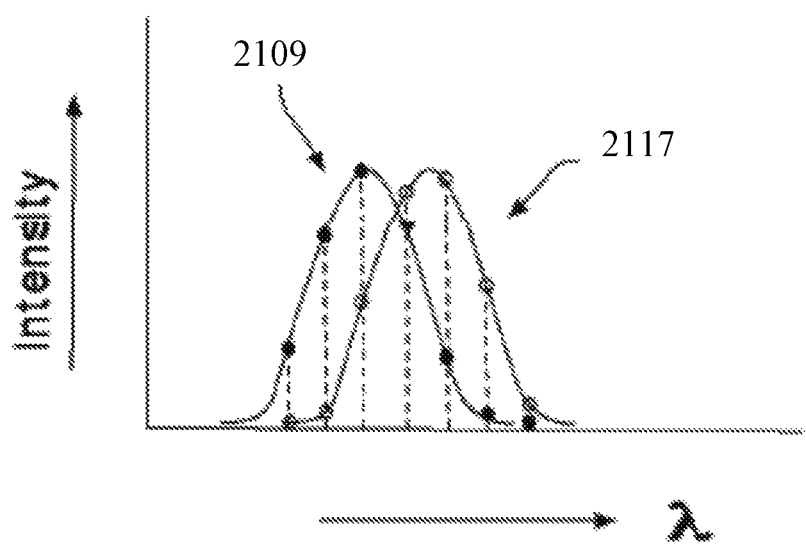

To overcome the limitations, the apparatus described in FIG. 21A utilizes the concepts of oversampling in the wavelength space along with the concept of data reduction. FIG. 21D illustrates the oversampling concept. This figure is similar to FIG. 21C, except only two spectra are shown for simplicity. These two spectra are labeled as 309 and 317. The vertical dashed lines illustrate the where the wavelengths are sampled. The filled circles on curve 309 represent the samples associated with the curve 309, whereas the empty circles on curve 317 represent samples associated with curve 317. Oversampling the wavelengths, results in several advantages. One advantage is that the underlying curves can be better estimated and identified properly. A second advantage is that it is easier to distinguish the curves from each other as necessary to remove overlap, which otherwise leads to crosstalk. The consequence of this advantage is that fluorophores that have emission spectra that are very close in wavelength to each other can be used. Thus more fluorophores can be used in the same wavelength range and more target molecules can be diagnosed. Finally, oversampling allows better correction for background signal levels such as from autofluorescence or scattered light. Referring back to FIGS. 21A and 21B, the sampling of the wavelength occurs in the CMOS array 77. This sampling occurs for every single location in the imaged object. For every location in the imaged object, the wavelength content, or the amount of energy in each wavelength that is sampled, is measured. Using the amount of energy in each sampled wavelength, a calculation can be carried out that estimates how much of each fluorophore is present at that specific location. The estimation procedure is explained further below.

Figure 22:
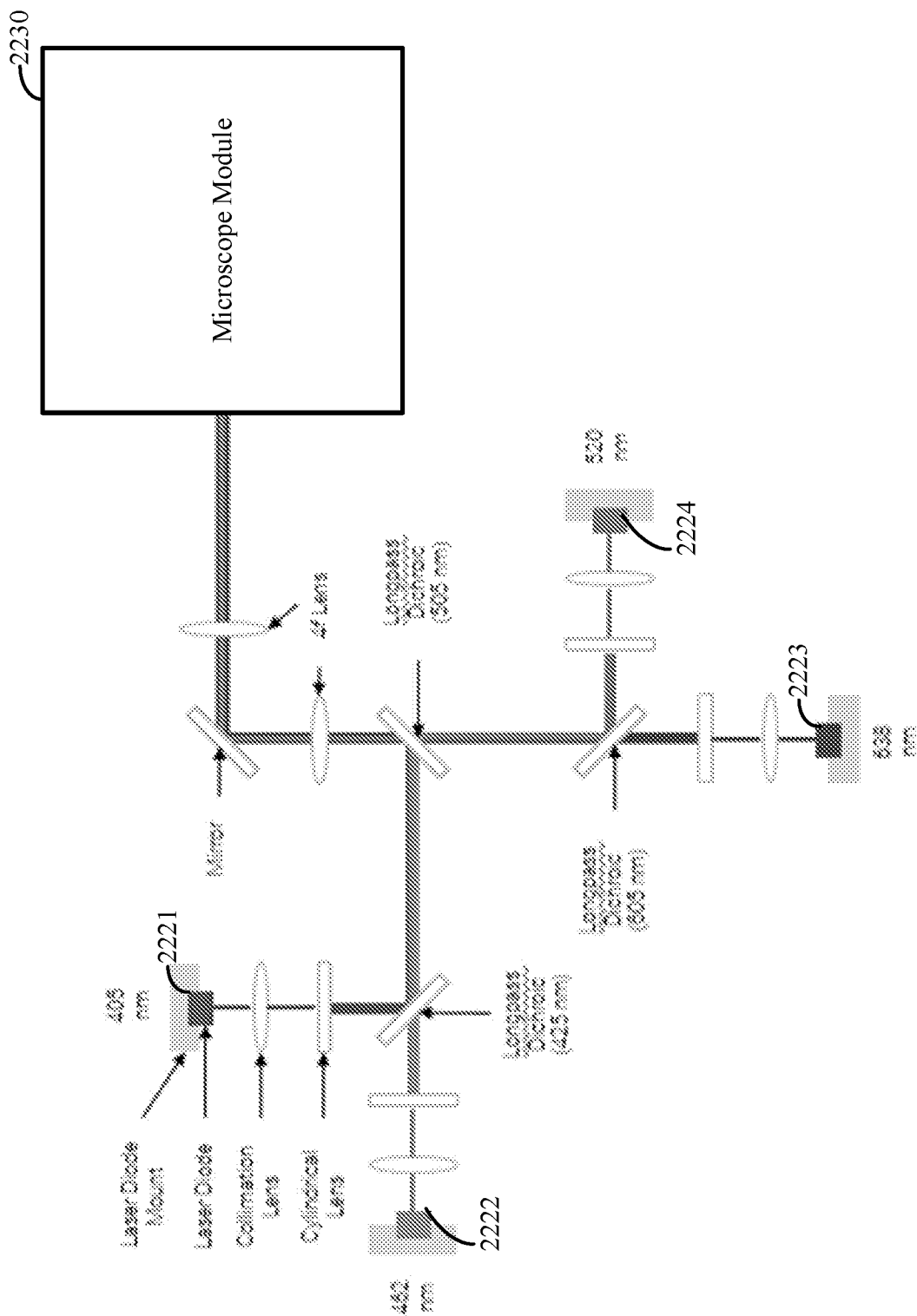
FIG. 22 is an example apparatus for generating a hyperspectral image, in accordance with embodiments of the present disclosure.

FIG. 22 is an example apparatus for generating a hyperspectral image, in accordance with embodiments of the present disclosure. The apparatus includes a hyperspectral imaging apparatus and processing circuitry, and in various embodiments, can include the imaging apparatus illustrated by FIGS. 1A-1D. This figure is similar to FIG. 1C, except the microscope components as previously described are illustrated as the microscope module 2230 for simplicity. The microscope module 2230 can refer to the stage, sample, optical lenses, spectrometer, imaging sensor, the autofocusing module, and various other optional components as previously described. FIG. 22 includes a more detailed example of a light source arrangement and the configuration thereof in accordance with various embodiments. Specifically, FIG. 22 can illustrate an example arrangement that includes a plurality of laser diodes.

As illustrated by FIG. 22, in various specific embodiments, the light source arrangement includes four light sources 2221, 2222, 2223, 2224. Each of the four light sources 2221, 2222, 2223, 2224 is configured to emit light at a different wavelength. In the specific example illustrated, the four light sources 2221, 2222, 2223, 2224 are laser diodes that respectively emit at 405 nm, 462 nm, 638 nm, and 520 nm, although embodiments are not so limited. The arrangement can include various lenses, dichroic filters, and mirrors used to pass the light from the light sources to the microscope module 2230. Each light source can be used to illuminate the molecular sample at the same time or sequentially. As previously described, control circuitry of the microscope module can be used to control the power, temperature, and optionally pulsing of the light sources during the imaging process.

Figure 23:
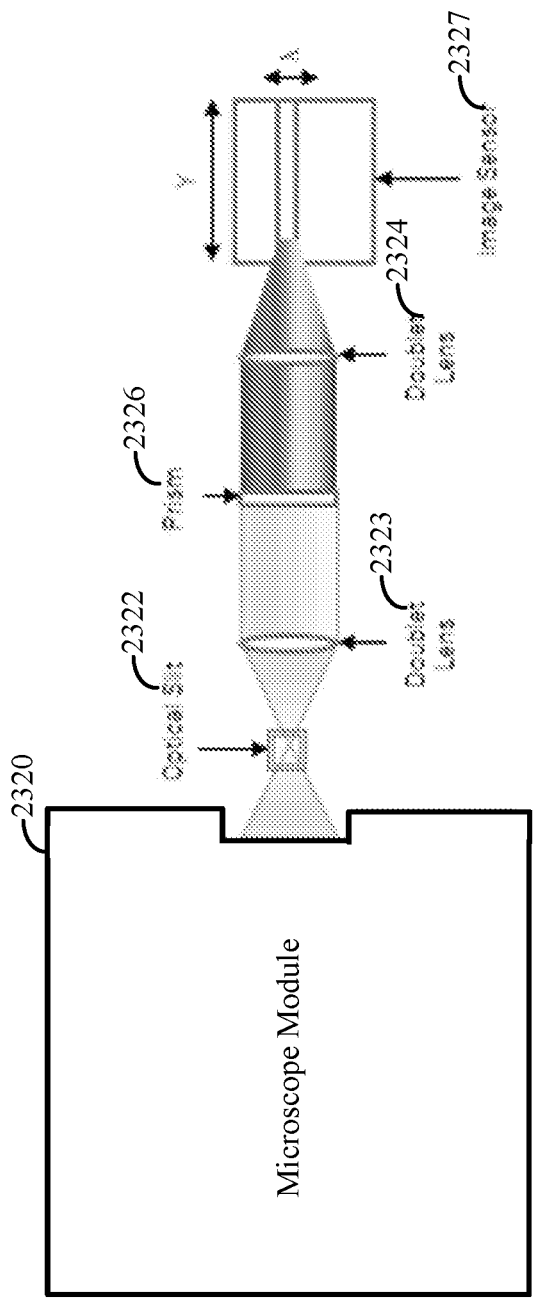
FIG. 23 illustrates an example spectrometer of an apparatus for generating a hyperspectral image, in accordance with embodiments of the present disclosure.

FIG. 23 illustrates an example spectrometer of an apparatus for generating a hyperspectral image, in accordance with embodiments of the present disclosure. As illustrated, the emitted light is passed along the emitted-light optical pathway from the microscope module 2320 to the spectrometer. The stage scans in a zig-zag (serpentine or boustrophedon) or raster fashion until the entire sample is scanned. As the microscope module 2320 scans across the molecular sample, the line images are separated using the spectrometer, and the separated light is collected by an image sensor 2327. In a particular configuration, the imaging spectrometer consists of an optical slit 2322, a pair of doublet lenses 2323, 2324, and a prism 2326 that acts to separate the light.

The raw images recorded by the image sensor 2327 are uncorrected for variations in light intensity along the illumination line, as well as hyperspectral phenomena such as smile and keystone. Furthermore, the light collected is across many (e.g., 60) intervals in the entire visible spectrum, which are then decomposes into the distinct labels that the user imaged. The end result is an illumination, smile, and keystone-corrected image with nine channels, each of which corresponds to a quantity of each label, as previously described in connection with FIG. 1A.

The imaging spectrometer is responsible for spatially separating the various wavelengths of light onto the image sensor 2327 so that the spatial line across the width of the image sensor 2327 is collected and recorded (labeled "Y"), and the wavelengths are recorded in the orthogonal axis (labeled "λ"). In other words, to continue the concrete analogy above, 2048 pixels wide (the spatial line) by 60 pixels (the wavelengths) are imaged. The image sensor 2327 records the Y-axis in one dimension and the wavelengths in the other dimension. Then, as the XY stage (described above) continually scans in the X-axis, the imaging apparatus is able to accumulate a hypercube that consists of the X, Y, and λ dimensions.

In the spectrometer, an optical slit 2322 is located at the imaging plane of the microscope module 2320. Its function is to reduce out-of-focus light at the imaging plane and improve spectral resolution. The slit is followed by a pair of achromatic doublet lenses 2323, 2324, with a wedge prism 2326 in between that acts to separate the wavelengths.

Figure 24:
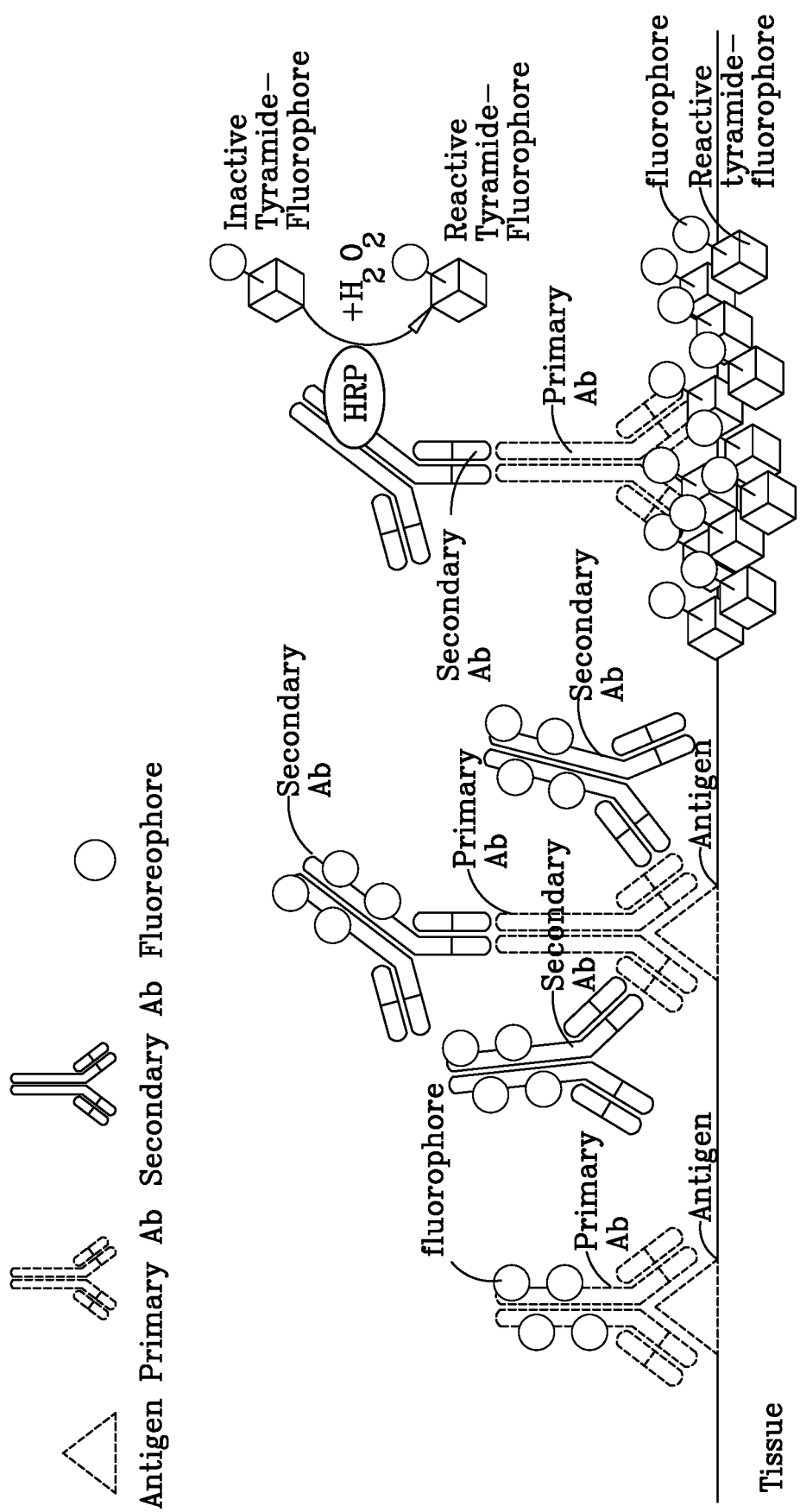
FIG. 24 illustrates an example of targets within a molecular sample that are labeled with fluorophores, in accordance with embodiments of the present disclosure.

FIG. 24 illustrates an example of targets within a molecular sample that are labelled with fluorophores, in accordance with embodiments of the present disclosure. Specifically, FIG. 24 illustrates an example experimental embodiment in which an imaging apparatus is used to perform multiplexed immunofluorescence staining of a breast cancer tissue sample. In this application, eight unique protein targets in the sample have been identified to image, plus DAPI, which stains the nuclei in the sample. Examples of such protein targets include PD-L1, CD3c, CD8α, FoxP3, ER, PR, Ki-67, and Her-2/neu. In total, the imaging apparatus is imaging 9 distinct fluorophores.

To label the protein targets, fluorescent labels are conjugated to antibodies that target each of these proteins. The methods for conjugation are known in the prior art, and include methods such as primary antibody conjugation, secondary antibody conjugation, or Tyramide-based conjugation.

FIGS. 25A-25E illustrate examples of excitation of the fluorophores illustrated by FIG. 24 by light sources of an apparatus, in accordance with embodiments of the present disclosure. Specifically, FIGS. 25A-25E illustrate example experimental results from the experimental embodiment described and illustrated by FIG. 24. For each antibody selected, a fluorophore with a unique spectrum is used. This is beneficial for spectrally separating these fluorophores as part of the hyperspectral imaging process. For example, the following commercially available fluorophores can be used, although embodiments are not so limited, DAPI, Alexa Fluor 488, Alexa Fluor 514, Alexa Fluor 532, Alexa Fluor 546, Alexa Fluor 633, Alexa Fluor 660, Alexa Fluor 700, and Alexa Fluor 750.

Figure 25A:
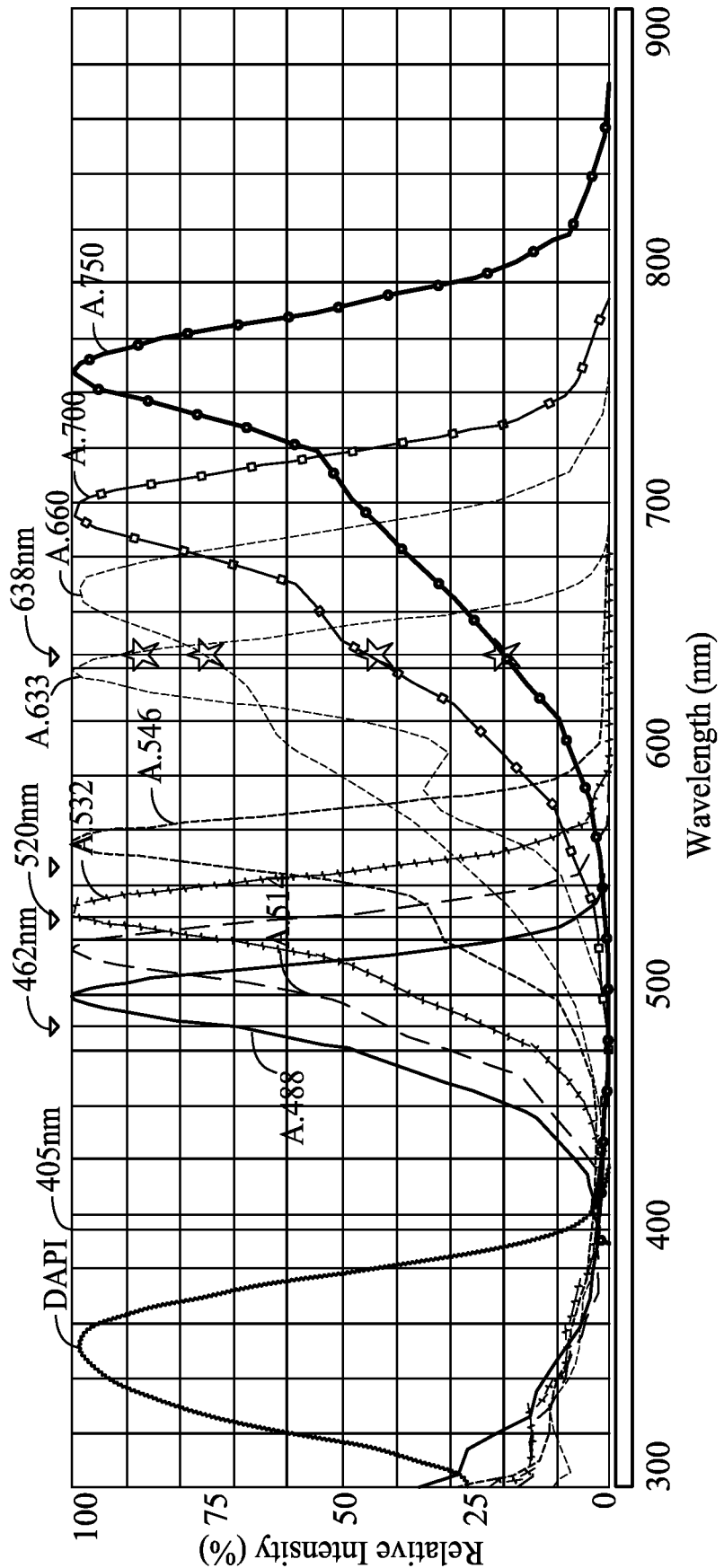
FIGS. 25A-25E illustrate examples of excitation of the fluorophores illustrated by FIG. 24 by light sources of an apparatus, in accordance with embodiments of the present disclosure.

The excitation spectra for these fluorophores is shown in FIG. 25A, and can be excited by the suite of lasers in the hyperspectral imaging apparatus (e.g., microscope). Specifically, laser diodes are used that emit light at 405 nm, 462 nm, 520 nm, and 638 nm (vertical lines in FIGS. 25A-25E). Note that the chosen fluorophores are merely examples, it is possible to use any fluorescent label, including quantum dots.

The excitation efficiency of each fluorophore can be defined as the intersection between its spectrum and the lasers. As shown in FIG. 25A, the excitation efficiency of each of the fluorophores is variable. A few examples are shown by the stars along the red laser wavelength (e.g., 638 nm). The efficiency may vary from 20 percent all the way to 90 percent for the fluorophores that are excited by the red laser.

Figure 25B:
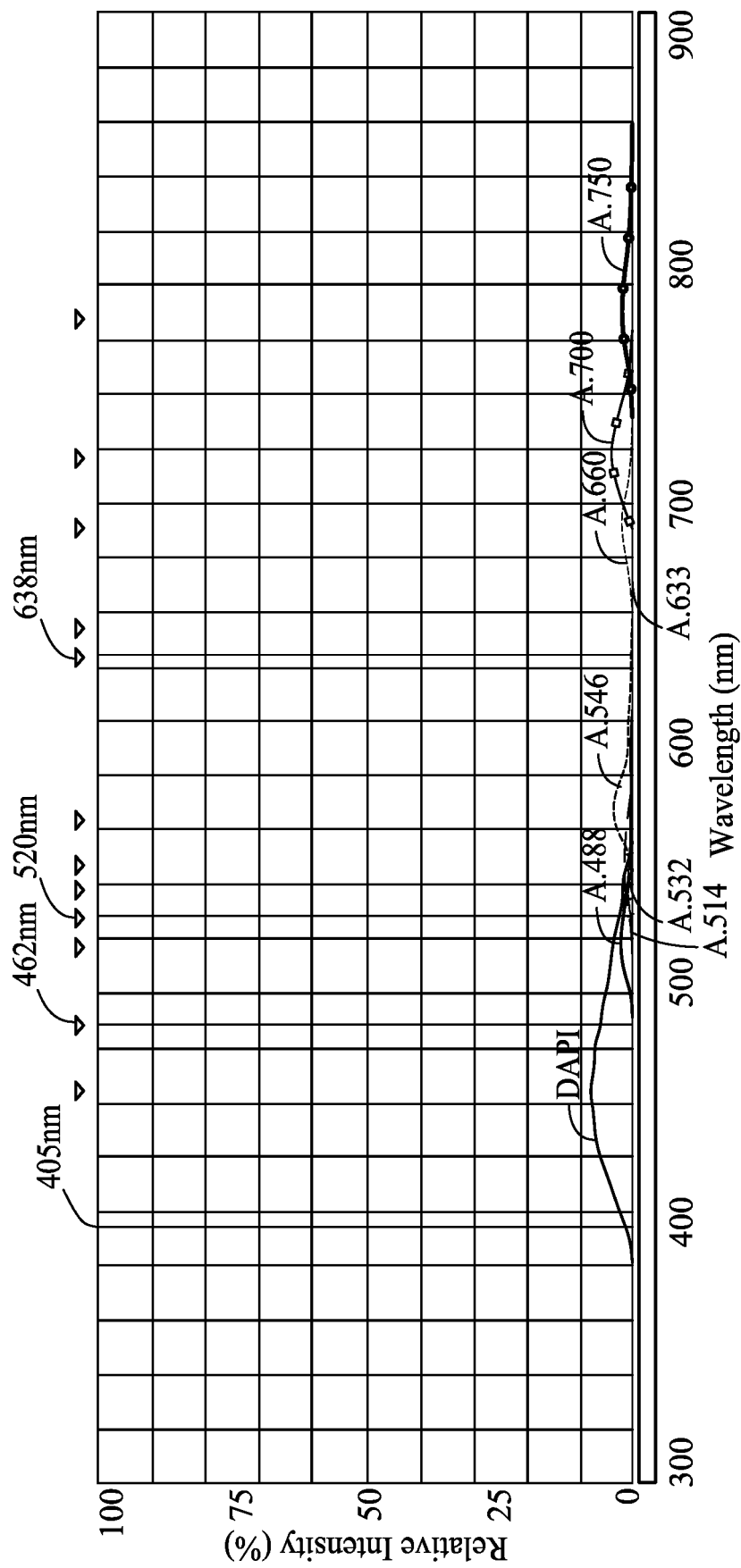

FIG. 25B demonstrates the resulting emission spectra for all nine fluorophores for the 405 nm laser. As illustrated, the signal is extremely weak for all fluorophores, and only DAPI gives any significant signal.

Figure 25C:
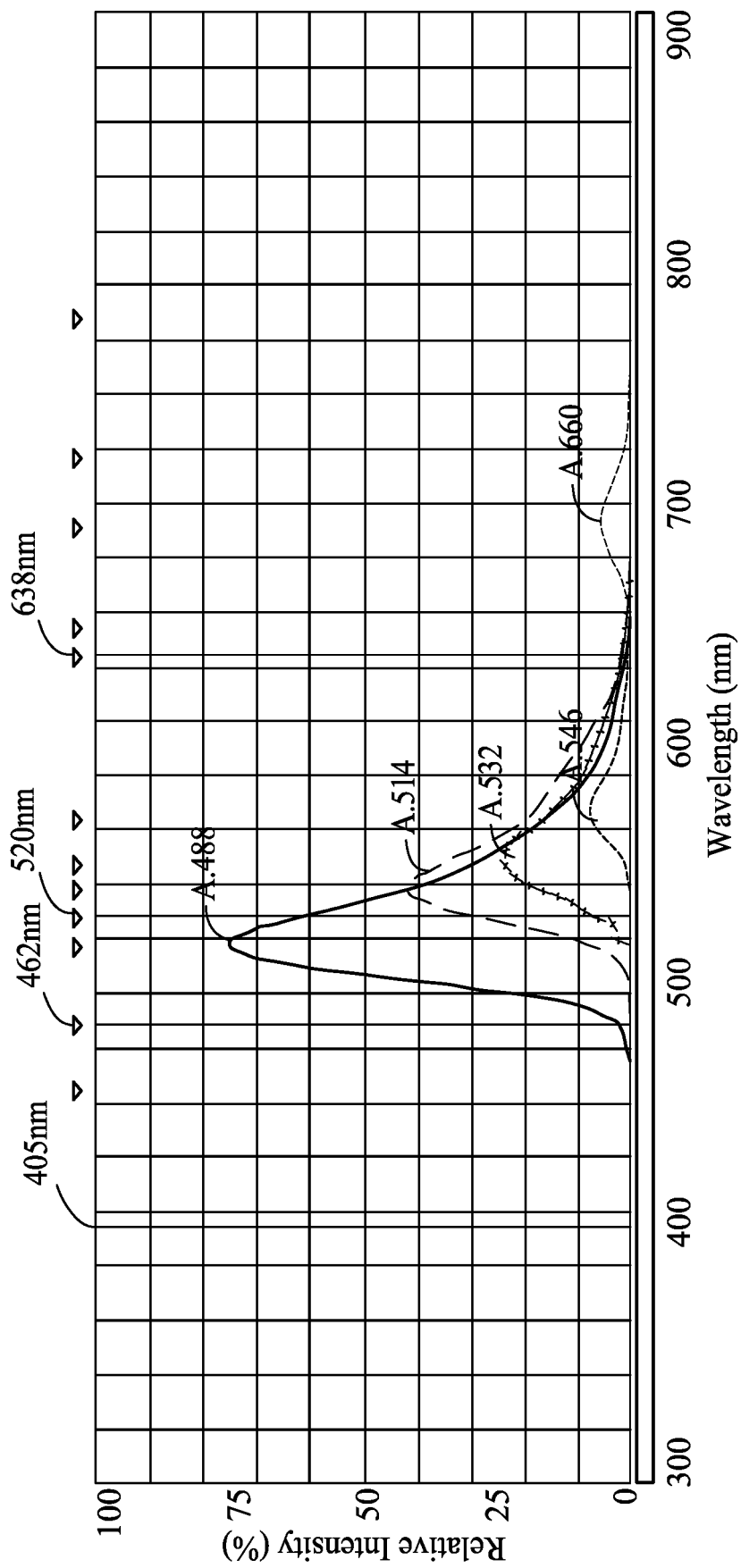

FIG. 25C demonstrates the resulting emission spectra for all nine fluorophores for the 462 nm laser. Relatively high intensity for Alexa 488 is shown, and subsequently lower intensities for Alexa Fluor 514, 532, and 546.

Figure 25D:
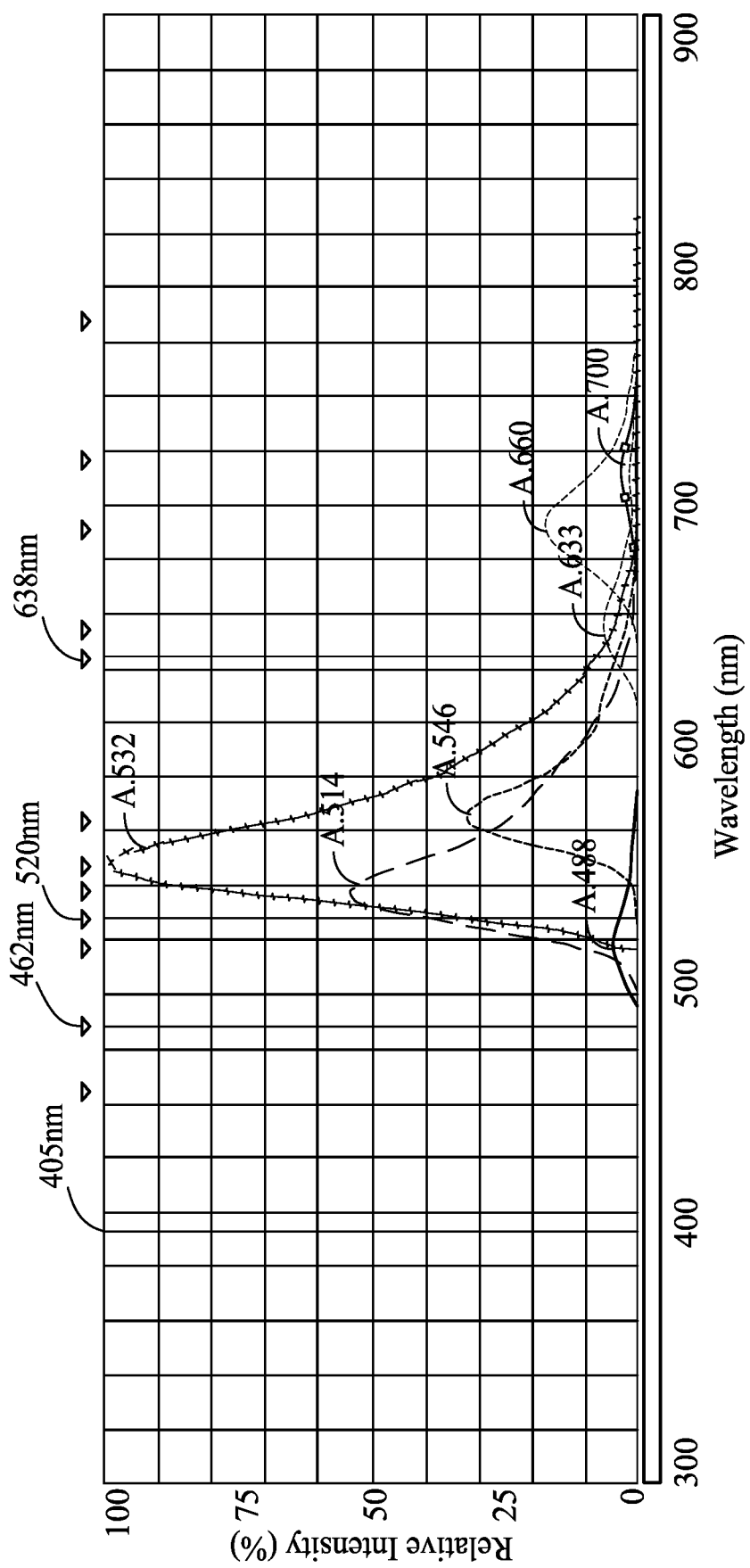

FIG. 25D demonstrates the resulting emission spectra for all nine fluorophores for the 520 nm laser. A stronger signal shows from Alexa Fluor 514, 532, and 546, as well as a weaker signal for some of the red fluorophores.

Figure 25E:
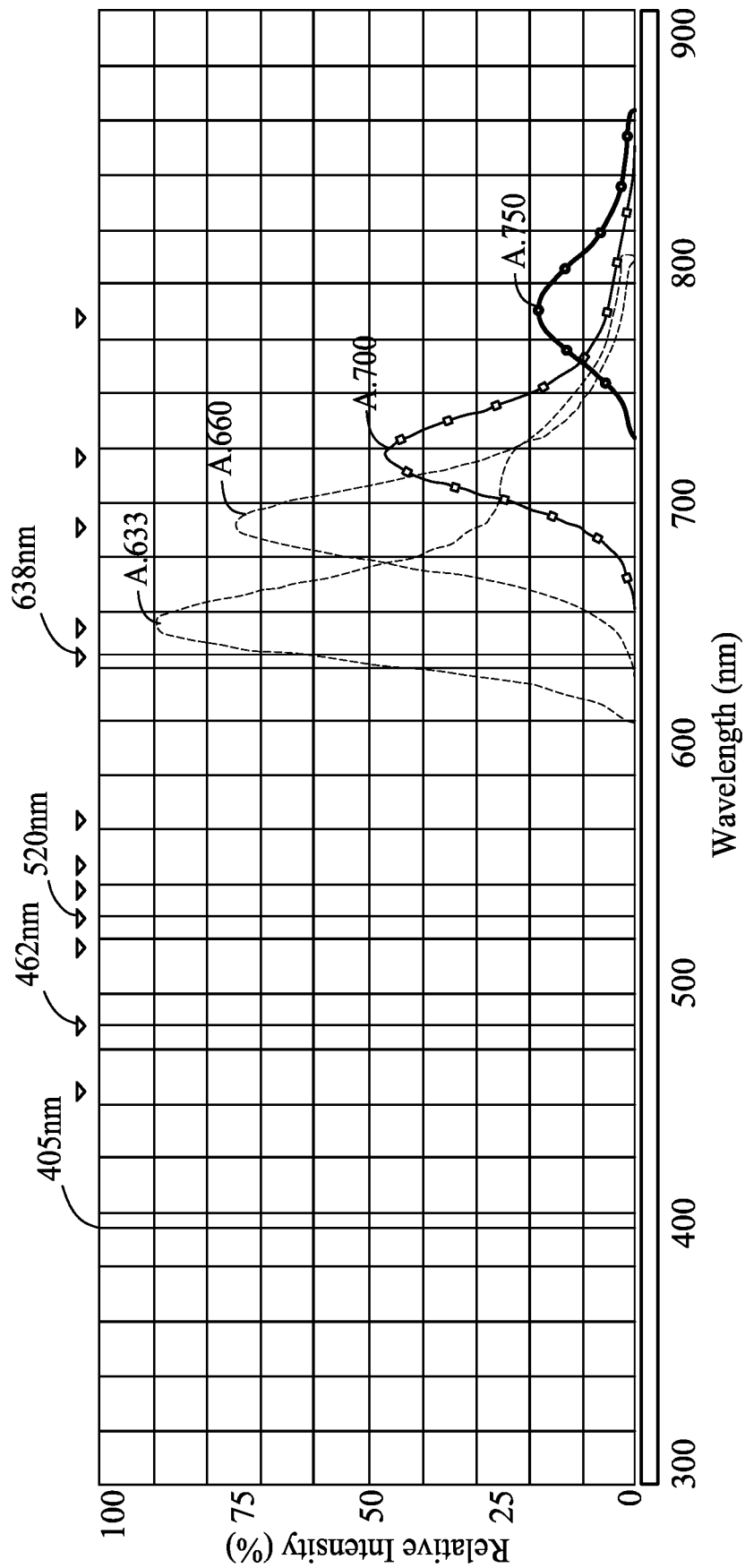

FIG. 25E demonstrates the resulting emission spectra for all nine fluorophores for the 638 nm laser. A strong signal for Alexa Fluor 633 is shown, and subsequently weaker signals for Alexa Fluor 660, 700, and 750.

In order to produce an image with satisfactory signal to noise ratio, it is imperative that the user chooses to match the right fluorophore with each protein target. Specifically, the user should match low-efficiency fluorophores with the proteins that are most abundant in the molecular sample of interest.

For example, in FIG. 25E, the relative intensity of Alexa 750 is about 18%. If the quantum efficiency of silicon-based CMOS image sensors is considered, it is shown that the quantum efficiency at 780 nm is around 25%. That means that the relative intensity of light recorded by the image sensor is 4.5%. However, this issue can be mitigated by choosing to conjugate it to an antibody that targets the most abundant protein in the set of proteins that the user would like to image. This matching process can also be recommended by software associated with the microscope, if the user selects the proteins and fluorophores of interest.

Once the fluorophores are chosen and conjugated, the user can stain the sample using known methods. At this point, the molecular sample can be imaged, as described above. For example, for pushbroom imaging of the molecular sample, the imaging apparatus (such as illustrated by FIG. 1A) expands the light beam from each light source into an illumination line, such as an illumination line that is 2048 pixels long and 1 pixel wide for a region of interest that is 2048 pixels long. Since the region of interest is 2048 pixels long, the light source power is spread out to cover each one of these pixels. This is in contrast to a point-scanning microscope (such as a confocal microscope), which focuses the entire output power of a laser into a single pixel.

The imaging apparatus is used to image the sample at a high frame rate (e.g., 1500 or more frames per second), and the exposure time for each spatial line in the molecular sample is short (e.g., 600 microseconds or less) to accommodate the high frame rate. As a specific example, at a frame rate of 2,000 frames per second, the maximum exposure time is 1/2000 fps or 0.5 ms (500 μs). To avoid or mitigate motion blur, the exposure time of the pixel is reduced further, such as down to around 100 μs. Although, as may be appreciated, embodiments are not limited to the frame rate and exposure times as described above and can include a variety of frame rates and exposure times.

Using the above provided experimental example of imaging proteins, the protein concentrations in the molecular sample can be in low concentrations. Because of the low concentration in the molecular sample, it can be expected that fewer antibodies are available to bind to the proteins (than other proteins present) and consequently less fluorescent signal. Additionally, the user's choice of fluorophore may be excited inefficiently by the light sources of the imaging apparatus. And, there are a limited set of light/laser wavelengths available. Furthermore, the particular fluorophore used may be collected inefficiently by the image sensor. Specifically, silicon-based image sensors are most efficient at collecting wavelengths in the green region, and are lower in the violet, red, and infrared regions. Normally, the second and third points can be mitigated by choosing a better fluorophore. However, if the user is interested in imaging numerous fluorophores, for example 8, the entire visible spectrum may be used. That means that in specific embodiments the apparatus is working with lower-efficiency fluorophores.

As previously described, the imaging apparatus scans the molecular sample, such as in a zig-zag or raster pattern, until the whole sample is scanned. As the molecular sample is scanned, the line images are separated into component wavelengths using an imaging spectrometer and collected by an image sensor. The raw images recorded by the image sensor are uncorrected for variations in light intensity along the illumination line, as well as hyperspectral phenomena such as smile and keystone. Furthermore, the image sensor is collecting light across 60 intervals in the entire visible spectrum, which are then decomposed into the distinct fluorophores that the user imaged. After calibrating illumination (e.g., correcting for non-uniform intensity patterns), correcting for hyperspectral phenomena, and performing spectral decomposition, the end result is an illumination, smile, and keystone corrected image with nine channels, each of which corresponds to a quantity of each fluorophore (and consequently protein) that the user selected.

In various embodiments, the imaging apparatus performs autofocusing in real-time (e.g., as on-the-fly scanning the molecular sample) by measuring the focus metric of the illumination line in multiple Z-planes simultaneously, which can be referred to as X-stack autofocusing (assuming scanning in an x direction and acquiring successive YZ images. By contrast, if scanning the y direction and acquiring XZ images, the autofocusing can be referred to as Y-stack autofocusing. When the imaging apparatus is performing line-scanning imaging, the light leaves the microscope module (to the autofocusing circuitry) in a line that is 2048 pixels long and 1 pixel wide. Using a cylindrical lens or mirror, the width of the illumination line is expanded to 60 pixels. This is equivalent to stretching the line image in one dimension. The tilt of the imaging sensor effectively varies the optical path length from the expanded illumination line to the image sensor, such that each row on the image sensor is imaging the illumination line on a different Z-plane. The imaging apparatus, via the processing circuitry and/or autofocusing control circuitry, determines a 1D focus metric for each Z-plane (e.g. energy of the gradient, such as normalized variance), and identifies the Z-plane that maximizes the contrast. This best Z-plane is fed back into the stage to ensure that the imaging apparatus is always in-focus during the scanning process.

The above-described experimental embodiment can include performing a whole slide imaging of the molecular sample at high resolution, where each pixel in the image represents less than 1 μm on the molecular sample. The example image sensor has 3.45 μm pixels, and the microscope lens is a 10× microscope objective and a 0.56× camera adapter, a pixel resolution of 0.62 μm/pixel is achieved. The typical sample size for a tissue sample is 15 mm×15 mm, which corresponds to an area of 225 mm². That means in order to image the entire sample using the 10× objective, 584.4 million spatial pixels are imaged. Further, if performing hyperspectral imaging and collecting 60 distinct wavelengths per spatial pixel on the sample, 35 billion total pixels are imaged for a single slide. If the image is saved as a 16-bit image, a single whole slide image is 70 GB uncompressed. Using conventional imaging techniques, this molecular sample can be scanned in under 5 minutes. Various hyperspectral imaging apparatuses, in accordance with various embodiments, are capable of imaging this entire slide in just over 3 minutes. This speed is achieved due to the line-scanning approach, which separates the light emitted at the illumination line into its respective wavelengths onto the image sensor, increasing the overall frame rate of the image sensor by reducing the region of interest from full resolution (e.g., to 2048×60 pixels), light sources providing high amounts of light (e.g., output power of 100 mW to 6 W each), and/or the stage continuously moving while scanning the molecular sample.

A number of methods in accordance with the present disclosure can be used for generating a four-dimensional reconstruction of a sample by using optical sectioning with a hyperspectral line scanning apparatus. Using such methods, the sample can be constructed in X, Y, and Z with four or more labels (e.g., in some embodiments, six or more, twelve or more).

In confocal microscopy, a spatial pinhole is commonly used to eliminate out-of-focus light. This results in better resolution in the axial direction, and facilitates optical sectioning, which is a process by which the imaging apparatus acquires images at multiple z-positions that are in close proximity.

In various embodiments, the hyperspectral line scanning apparatus can include an optical slit which reduces out-of-focus light in one direction, thus achieving partial confocality. This aspect of the system can be used with the following approach to generate the reconstruction.

First, a region of interest of the sample is identified in X, Y, and Z, and the spacing (in microns) between successive optical sections is determined. Next, the control circuitry of the system issues a command for the microscope to move to the z-position of the first optical section, and scan the xy-plane of the region of interest. In another embodiment, the control circuitry moves an x-position, and scans the yz-plane of the region of interest. Alternatively, it moves to a y-position, and scans the xz-plane of the region of the interest. The control circuitry then scans the next optical section, and repeats this process until the entire three-dimensional sample has been imaged according to the image acquisition settings specified in the beginning of the process.

At this point, the individual optical sections have been acquired by the imaging apparatus. However, in many embodiments of the system, the motorized stage does not have perfect repeatability. For example, the ThorLabs MLS203 motorized stage has a repeatability of 0.25 μm. When imaging with high magnification objectives (e.g. a 60× microscope objective), which is common for optical sectioning, each pixel in the acquired image may correspond to a pixel on the sample that has a length and width on the order of 0.05 μm. As a result, the stack of optical sections can undergo image registration, which is unique to the line scanning system because it performs a line scan of each optical section as opposed to acquiring an image for the entire region of interest as many staring-based apparatuses do.

This image registration problem can be addressed with a set of algorithms that utilize image intensity or image features to perform alignment. The a priori knowledge that the image registration can utilize a translation operation, as well as the large number of channels in the optical section images, and can be used to enhance the accuracy of the registration process.

In some biological applications, it is useful to sift through a large population to identify a single or few cells, beads, or other objects of interest. These applications, which can be referred to as "rare object detection", can utilize high-resolution imaging for only the rare object itself, as the remainder of the population is considered normal.

Consider the application of circulating tumors cells (CTCs), where the objective is to find a tumor cell from a blood sample that contains billions of cells. One way to speed up detection for these applications is to allow the user of the imaging apparatus to identify a set of criteria to the control system before the scan begins. In the case of circulating tumor cells, a simple set of criteria might be a cell that is positive for cytokeratin, but is negative for CD45. Then, the control circuitry can issue a command for the stage to scan at a faster rate than it may normally scan to acquire images of the sample. Additionally, the light source has a duty cycle close to or equal to one (that is, it is no longer pulsed), and the exposure time of the image sensor is maximized, given its operating frame rate. The imaging apparatus can then obtain a pseudo-image of the sample that experiences linear blur in the direction of the scan.

Consider the case where the stage scans the sample twice as fast. This can effectively double the number of cells scanned per second, at the cost of image quality. However, the regions where the criteria is met can be flagged, and re-imaged at higher resolution.

In a number of embodiments, the re-imaging occurs after the completion of the scan. In another, the flagging of the criteria happens in real-time, and the stage stops, and re-images the flagged region. The benefit of this approach is that results are shown to the user more quickly, and the overhead of moving the stage between flagged regions is reduced. In addition, this takes advantage of the line scanning capability of the apparatus, as only the width of the flagged region needs to be re-imaged as opposed to an entire field of view.

The ability of an example image processing pipeline to process the data acquired from the scan in near to real-time makes it possible to perform the computation required to see if the most recently acquired data matches the set criteria. Furthermore, the ability to image many labels in the same scan allows the user to design much more advanced sets of criteria before the scan begins.

In various embodiments, the imaging apparatuses described herein can be sued for various sample scanning applications. As previously described, the control circuitry can be used to control the position of the molecular sample relative to the optical objective. The control, in some embodiments, includes an X and a Y direction and in other embodiments includes X, Y, and Z directions. The scan includes a line-scan in which the molecular sample in scanned, using a scanning pattern, to obtain strips or lines of images across the molecular sample. The line-scanning approach effectively obtains image lines that are 2048×1 pixel. To scan the sample using the line-scanning approach, the molecular sample or region of interest is divided into strips that are 1 pixel wide, although embodiments are not so limited and can include different sized strips. The scan of the molecular sample in various embodiments can move from top-left of the sample and scans left-to-right until the end of the row is reached and then two movements can occur.

In various specific embodiments, the scan patterns can be used to perform whole sample or slide imaging. Whole sample or slide imaging is generally performed at high resolutions, such as 20× or 40×. This is because, if the user would benefit from a high-resolution look at a specific area of the molecular sample, the imaging apparatus does not have to re-image the sample. Using a line-scanning approach, the imaging apparatus images lines of the molecular sample, such as lines of 2048×1 pixel. One approach to performing whole slide imaging is to divide the sample into strips, as previously described. The whole slide (or other sample) imaging process is further described herein, and can include a two scan approach at different magnifications.

An example scanning pattern can include a zig-zag or serpentine scan. The microscope scans the molecular sample starting in the top left corner and scans the first row left-to-right (e.g., top) until the end of the row is reached. The position of the molecular sample is then moved so that the microscope is positioned in the center of the second row on the right side of the molecular sample (e.g., the end of the second row) and begins imaging right-to-left. This process repeats in a zig-zag pattern and can be the most time efficient pattern.

Other example scanning patterns include a raster scan. The microscope scans the sample starting in the top left corner of the molecular sample and scans the first row left-to-right (e.g., top) until the end of the row is reached. The position of the molecular sample is then moved so that the microscope is positioned in the center of the second row at the left side of the sample and begins imaging left-to-right. This process repeats in a raster pattern, which can be slower than the zig-zag pattern but may result in less drift or hysteresis between rows for motorized stages without linear encoders.

As may be appreciated, scanning patterns are not limited to instances of starting in the top left corner of the sample, embodiments are not so limited. For example, scanning patterns in accordance with the present disclosure can begin at any corner of the sample (e.g., bottom left, bottom right, top left, top right corners) and/or in middle portions of the sample. Further, scanning patterns can include scanning left-to-right, right-to-left, and combinations of both.

Embodiments are not limited to those listed above and can include various combinations of the same. For example, a number of embodiments are directed to a line-scanning imaging apparatus comprising a light source, an imaging spectrometer, an image sensor, and control circuitry. The light source generates sufficient power for delivering at least 100 milliwatts (mW) of optical power focused into an illumination line at a biological sample. In various embodiments, the apparatus include an optical system used to focus a light profile of the light source into the illumination line. In response to the light source generating the sufficient power, the imaging spectrometer separates light emitted from the biological sample illuminated by the optical power into a plurality of different component wavelengths. The image sensor, including circuitry, collects the light emitted along an optical pathway that corresponds to plurality of different component wavelengths from the imaging spectrometer and provides data indicative of the plurality of different component wavelengths along a data carrying path to control circuitry and processing circuitry at a rate of at least 100,000,000 wavelength-pixel measurements per second for a period of at least ten seconds. The control circuitry configured and arranged with the image sensor to scan the biological sample by: causing the image sensor to scan the biological sample while the imaging spectrometer is aligned with the image sensor, and collecting hyperspectral image data between a range of 200-1000 nm of the biological sample from the light emitted that corresponds to the plurality of different component wavelengths. The apparatus can further include processing circuitry used perform an image processing pipeline at the rate of least 100,000,000 wavelength-pixel measurements per second by transforming the hyperspectral image data into data that is representative of a quantification of emitters, absorbers, and/or scatterers present in the biological sample. And, in certain embodiments, thereby improving or optimizing an otherwise obtainable or achievable data acquisition rate and/or data processing rate of images of the molecular sample.

In a number of embodiments, as previously described, the imaging apparatus is configured and arranged to perform or include one or more of the following, including various combinations thereof: the processing circuitry is further configured and arranged to transform the hyperspectral image data by revising the hyperspectral image data to account for smile and keystone distortions present in the hyperspectral image data, the imaging sensor is further configured and arranged to prevent or mitigate smile and keystone distortions present in the hyperspectral image data, and the control circuitry is further configured and arranged to perform on-the-fly autofocusing as described herein.

A number of embodiments are directed to a staring-scanning imaging apparatus comprising a light source, an imaging spectrometer, an image sensor, and control circuitry. The light source generates sufficient power for delivering at least 100 milliwatts (mW) of optical power at the biological sample. In response to the light source generating the sufficient power, the imaging spectrometer separates light emitted from the biological sample as illuminated by the optical power into a plurality of different component wavelengths. The image sensor, including circuitry, collects the light emitted along an optical pathway that corresponds to plurality of different component wavelengths from the imaging spectrometer and provides data indicative of the plurality of different component wavelengths along a data carrying path to control circuitry and processing circuitry at a rate of at least 100,000,000 wavelength-pixel measurements per second for a period of at least ten seconds. The control circuitry configured and arranged with the image sensor to scan the biological sample by: causing the image sensor to scan the biological sample while the imaging spectrometer is aligned with the image sensor, and collecting hyperspectral image data between a range of 200-1000 nm of the biological sample from the light emitted that corresponds to the plurality of different component wavelengths. And, processing circuitry configured and arranged to perform an image processing pipeline at the rate of least 100,000,000 wavelength-pixel measurements per second by transforming the hyperspectral image data into data that is representative of a quantification of emitters, absorbers, and/or scatterers present in the biological sample.

In a number of embodiments, as previously described, the imaging apparatus is configured and arranged to perform or include one or more of the following, including various combinations thereof: the processing circuitry is further configured and arranged to transform the hyperspectral image data by revising the hyperspectral image data to account for phase distortions present in the hyperspectral image data, further including a display, wherein the processing circuitry configured and arranged to provide the data that is representative of the quantification of emitters, absorbers, and/or scatterers present in the biological sample to the display with a latency of less than 250 milliseconds.

A number of embodiments are directed to methods for autofocusing. Example methods can include generating sufficient power using a light source of an imaging apparatus for delivering at least 100 milliwatts (mW) of optical power at a molecular sample; in response to the light source generating the sufficient power, separating light emitted from a region of the molecular sample illuminated by the optical power into a plurality of different component wavelengths via an imaging spectrometer; and collecting the light emitted along an optical pathway from the region of the molecular sample corresponding to plurality of different component wavelengths via an image sensor. The methods can further include causing the image sensor to scan the region of the molecular sample while the imaging spectrometer is aligned with the image sensor and while, on-the-fly and during the scan using control circuitry, determining a depth position for the region and/or another region of the molecular sample to be scanned after the region, and causing the molecular sample to move to the depth position to alter an effective length of the optical pathway and therein improving a quality of a focal plane for the region and/or the other region of the molecular sample.

In a number of embodiments, the above described method can include performing one or more of the following, including various combinations thereof: causing the image sensor to scan the region of a plurality of regions of the molecular sample while concurrently determining an optimal focal plane for the region and/or the other region of the plurality of regions, and causing the molecular sample to move to the depth position after scanning the at least a portion of the region using the control circuitry; collecting a plurality of lines, each of the plurality of lines being a different z-distance away from an image plane of the imaging apparatus, and determining an optimal focal plane for the region and/or the other region of the molecular sample by using the plurality of lines; causing the image sensor or another image to tilt to a plurality of different image distances, thereby causing the image sensor to be the different z-distances from the image plane using autofocusing control circuitry; determining an optimal focal plane for the other region of the molecular sample by collecting and using light reflected from a reflective coating on a surface of a substrate that contains the molecular sample; the reflective coating being reflective outside of an imaging spectral region and transparent inside of the imaging spectral region, generating optical power outside of the imaging spectral region using another light source and for delivering at the substrate; continuously controlling a plurality of positions of the molecular sample relative to the optical objective; collect a plurality of lines at the image sensor that represent the other region of the molecular sample using autofocusing control circuitry configured and arranged with a cylindrical lens or mirror and the image sensor, wherein each of the plurality of lines at the imaging sensor are a different z-distance from an image plane of the imaging apparatus; determining an optimal plane of focus for the other region of molecular sample based on a focus metric and the plurality of lines at the image sensor, and causing the control circuitry to adjust a z-position of the molecular sample; generating hyperspectral image data of the molecular sample from the collected light emitted from the region of the molecular sample; via the light source and the image sensor, illuminating the molecular sample at an optical power of between 500-1,000 mW, at a frame rate of between 100 frames per second (FPS) to 4000 FPS, and at a transfer or storage rate of between 250 megabytes per second (MB/s) to 1 gigabyte per second (GB/s); generating the sufficient power for delivering at least 100 mW of optical power as an illumination line onto the molecular sample, expanding a light profile as emitted via the light source along its width to generate the illumination line; filter light emitted from the light source to an illumination line at different regions of the molecular sample; collecting the plurality of different component wavelengths as separated by the imaging spectrometer at the region of the molecular sample for each component wavelength at a frame rate and with an amount of light sufficient to identify at least four labels in the molecular sample; outputting power from a plurality of light sources in tandem or sequentially; collect hyperspectral image data of the molecular sample from the collected light emitted that corresponds to the plurality of different component wavelengths, and transform the hyperspectral image data into data that is representative of a quantification of emitters, absorbers, and/or scatterers present in the molecular sample; performing spectral decomposition of spectra intensities of the different component wavelengths into the quantification of emitters, absorbers, and/or scatterers present using a parallelized process; emitting a plurality of light beams at non-uniform light intensities and calibrating illumination of the hyperspectral image data using non-uniform intensity patterns which are attributable to the plurality of light sources; identifying the non-uniform light intensities by, for each of the plurality of light sources: controlling movement of the molecular sample in a direction of an illumination line of the respective light source, and for each pixel in the direction, causing collection of the light emitted from the region of the molecular sample corresponding to the plurality of different component wavelengths.

Other method embodiments are directed to capturing hyperspectral image data using a multi-mode diode and which can improve a data acquisition rate. Example method embodiments include using a multi-mode laser diode to generate optical power sufficient for delivery at a molecular sample and in response to the multi-mode laser diode generating the optical power, separating light emitted from the molecular sample illuminated by the optical power into a plurality of different component wavelengths via an imaging spectrometer. The method can further include collecting the light emitted along an optical pathway corresponding to the plurality of different component wavelengths via an image sensor by causing the image sensor to scan the molecular sample while maintaining alignment of the imaging spectrometer with the light emitted from the molecular sample, and collecting hyperspectral image data of the molecular sample from the collected light emitted that corresponds to the plurality of different component wavelengths.

In a number of embodiments, the above described method can include performing one or more of the following, including various combinations thereof: generating sufficient power for delivering at least 100 milliwatts (mW) of optical power at the molecular sample; causing the image sensor to scan the molecular sample while maintaining alignment of fast and slow axes of the multi-mode laser diode to filter the optical power to an illumination line and reduce out-of-focus light; filter the delivered optical power to a line at different portions of the molecular sample using an optical slit; focusing the delivered optical power from the multi-mode laser diode into an illumination line and delivering the illumination line at the molecular sample using an optical system; filtering the optical power to a line and reducing out-of-focus light; changing or controlling a width of the optical slit based an image mode of the imaging apparatus and an exposure time; to filtering the emitted light to a line at different portions of the molecular sample using a plurality of optical slits; transforming the hyperspectral image data into data that is representative of a quantification of emitters, absorbers, and/or scatterers present in the molecular sample by performing spectral decomposition of spectra intensities of the different component wavelengths into the quantification of emitters, absorbers, and/or scatterers present using a parallelized process; calibrating illumination of the hyperspectral image data; identifying a non-uniform intensity pattern of the optical power of the multi-mode laser diode and using the non-uniform intensity pattern to calibrate the illumination of the hyperspectral image data; identifying the non-uniform intensity pattern by: controlling movement of the molecular sample in a direction of an illumination line of the multi-mode laser diode, and for each pixel in the direction, collecting the light emitted that corresponds to the plurality of different component wavelengths; identifying the non-uniform intensity pattern by: identifying a section of the molecular sample with a fluorophore excited by the multi-mode laser diode, controlling movement of the molecular sample in a direction of an illumination line and, for each pixel in the direction, collecting the light emitted that corresponds to the plurality of different component wavelengths associated with a section of the molecular sample, and identifying the non-uniform intensity pattern corresponding to the multi-mode laser diode using the collected light that corresponds to the plurality of different component wavelengths of each pixel in the direction of the illumination line; generating data representative of a quantification of emitters, absorbers, and/or scatterers present in the molecular sample by using the non-uniform intensity pattern to adjust the hyperspectral image data; generating data representative of a quantification of emitters, absorbers, and/or scatterers present in the molecular sample by correcting for hyperspectral phenomena corresponding to the hyperspectral image data including performing smile and keystone corrections.

A number of embodiments are directed to methods for performing data image processing on hyperspectral image data in a manner that improve the data acquisition and processing rates. An example embodiment includes using a light source to generate optical power sufficient for delivery at a molecular sample, and in response to the light source generating the optical power, separating light emitted from one or more regions of the molecular sample illuminated by the optical power into a plurality of different component wavelengths via an imaging spectrometer. The light emitted along an optical pathway corresponding to the plurality of different component wavelengths is collected via an image sensor by causing the image sensor to scan the one or more regions of the molecular sample while the imaging spectrometer is aligned with the image sensor, and collecting hyperspectral image data of the molecular sample from the light emitted that corresponds to the plurality of different component wavelengths. The embodiment further includes performing an image processing pipeline by transforming the hyperspectral image data into data that is representative of a quantification of emitters, absorbers, and/or scatterers present in the one or more regions of the molecular sample.

In a number of embodiments, the above described method can include performing one or more of the following, including various combinations thereof: collecting hyperspectral image data between a range of 200-1000 nm of the molecular sample; generating sufficient power for delivering at least 100 milliwatts (mW) of optical power at the molecular sample; causing the image sensor to sample light emitted that corresponds to the plurality of different component wavelengths of the one or regions of the molecular sample a plurality of times; transforming the hyperspectral image data by revising the hyperspectral image data to account for distortions present in the hyperspectral image data; focus the light from the light source into an illumination line and onto a molecular sample via an optical system; transforming the hyperspectral image data by performing decomposition of spectral intensities of the different component wavelengths into the quantification of emitters, absorbers, and/or scatterers present using a parallelized process; performing decomposition of spectra intensities of the different component wavelengths into partial emitters, absorbers, and/or scatterers quantifications and decomposition of the partial emitters, absorbers, and/or scatterers quantifications into the emitters, absorbers, and/or scatterers quantifications; revising the hyperspectral image data to account for distortions, the distortions including keystone phenomenon and smile phenomenon; revising the hyperspectral image data to account for distortions, the distortions including phase correction; revising the hyperspectral image data to account for distortions, the distortions including phenomena selected from the group consisting of: keystone phenomenon, smile phenomenon, phase distortion, pixel misregistrations, non-uniform illumination, and a combination thereof; generating first calibration data indicative of emitters, absorbers, and/or scatterers present in the molecular sample and second calibration data indicative of distortions present, and performing the image processing pipeline using the first and the second calibration data; performing the image processing pipeline by using a first technique including an ordinary least squares method, and, in response to sampled data points producing negative label quantities or exhibiting residual error outside a threshold error as determined using the first technique, using a second technique; calibrating illumination of the hyperspectral image data using a non-uniform intensity pattern attributable to the light source by performing decomposition of measured spectra intensities of the different component wavelengths into emitter, absorber, and/or scatterer intensities, and adjusting for optical power of the light source based on a non-uniform intensity pattern; identifying the non-uniform intensity pattern for each of a plurality of light sources; calibrating the illumination of the hyperspectral image data with the non-uniform intensity patterns by, for each of the plurality of light sources: controlling movement of the molecular sample in a direction of an illumination line of the respective light source and, for each pixel in the direction, collecting the light emitted that corresponds to the plurality of different component wavelengths and identifying the non-uniform intensity pattern corresponding to the respective light source using the collected light emitted for each pixel in the direction of the illumination line; revising the hyperspectral image data to account for a variation in spectral efficiency of the emitted light optical pathway and the image sensor, wherein quantum efficiency of the image sensor and the emitted light optical pathway varies with wavelengths of the plurality of different component wavelengths; modeling the quantum efficiency variation of the image sensor over an electromagnetic spectrum and correct for the quantum efficiency variation using the model; modeling the quantum efficiency variation of the image sensor by obtaining nominal values for the quantum efficiency of the image sensor over an electromagnetic spectrum, wherein the electromagnetic spectrum is at a spectral region that is measured by each spectral pixel in a region of interest of the image sensor; and/or obtaining nominal values of between 0.0 and 1.0 over the electromagnetic spectrum, normalize the nominal values, store an inverse of the normalized values in a vector, and use the vector to correct for quantum efficiency.

A number of embodiments are directed to methods for collecting hyperspectral image data by filtering the light emitted into one or more lines in a manner that improve the data acquisition rate. An example embodiment includes using a light source arranged to generate optical power sufficient for delivering a plurality of illumination lines at a molecular sample. In response to the light source generating the optical power, the method includes shaping the light emitted to an illumination line at different portions of the molecular sample, and separating light emitted from one or more regions of the molecular sample illuminated by the optical power into a plurality of different component wavelengths via an imaging spectrometer. The light emitted along an optical pathway corresponding to the plurality of different component wavelengths is collected via an image sensor by causing the image sensor to scan the one or more regions of the molecular sample while the imaging spectrometer is aligned with the image sensor and collecting hyperspectral image data of the molecular sample from the light emitted that corresponds to the plurality of different component wavelengths.

In a number of embodiments, the above described method can include performing one or more of the following, including various combinations thereof: collecting hyperspectral image data between a range of 200-1000 nm of the molecular sample; generating sufficient power for delivering at least 100 milliwatts (mW) of optical power for each of the plurality of illumination lines at the molecular sample; filtering the light emitted from the illumination line at different portions of the molecular sample using an optical slit; and using at least two of the plurality of light sources having non-overlapping sets of wavelengths.

Various embodiments are implemented in accordance with the underlying U.S. Provisional Application (Ser. No. 62/352,931), entitled "High Speed Hyperspectral Imaging with Pipeline Processing", filed Jun. 21, 2016, to which benefit is claimed and is fully incorporated herein by reference. For instance, embodiments herein and/or in the provisional application (including the appendices therein) may be combined in varying degrees (including wholly). Reference may also be made to the experimental teachings and underlying references provided in the underlying provisional application, each of which are fully incorporated herein for their specific and general teachings. Embodiments discussed in the Provisional Application are not intended, in any way, to be limiting to the overall technical disclosure, or to any part of the claimed invention unless specifically noted.

As may be appreciated, each of the above-described methods can include various combinations of line-scanning a sample, step-and-stare, parallel processing the data, autofocusing using another image sensor at a tilt, autofocusing using reflective surface, high power light sources, multimode diodes, dynamic modifications of the region of interest, continuous line scanning, correction of distortions, various methods for spectral decomposition, z-stack imaging, event detection, on-the-fly illumination control, quantification of labels, imaging of four or more biomolecules, negation of autofluorescence, determining absolute concentrations of labels, multi-slits, and providing feedback, as described throughout the specification.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, arrangement, and/or other circuit-type depictions (e.g., reference numerals 420 and 630 of FIGS. 4 and 6 depict a block/module as described herein). Such circuits or circuitry are used together with other elements to exemplify how certain embodiments may be carried out in the form or structures, steps, functions, operations, activities, etc. For example, in certain of the above-discussed embodiments, one or more illustrated items in this context represent circuits (e.g., discrete logic circuitry or (semi-) programmable circuits) configured and arranged for implementing these operations/activities, as may be carried out in the approaches shown in FIGS. 2A and 2B. In certain embodiments, such illustrated items represent one or more elements of computer circuitry (e.g., microcomputer or other CPU) which is understood to include memory circuitry that stores code (program to be executed as a set/sets of instructions) for performing a basic algorithm (e.g., generating the hyperspectral image and outputting data indicative of a quantification of emitters in the molecular sample) or the more complex process/algorithm as described at FIG. 2B to perform the related steps, functions, operations, activities, etc. The specification may also make reference to an adjective that does not connote any attribute of the structure ("first [type of structure]" and "second [type of structure]") in which case the adjective is merely used for English-language antecedence to differentiate one such similarly-named structure from another similarly-named structure (e.g., "first light source configured to emit light . . . " is interpreted as "a light source configured to emit . . . "). On the other hand, the specification may make reference to an adjective that is intended to connote an attribute of the structure (e.g., monitor server), in which case the adjective (e.g., monitor) modifies to refer to at least a portion of the named structure (e.g., circuitry) is configured to have/perform that attribute (e.g., control circuitry refers to at least a portion of a processing circuitry that includes/performs the attribute of controlling).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the process illustrated and described by FIG. 2A can include additional steps and circuitry, such steps performed by the imaging apparatus illustrated by FIG. 1B. As another example, the imaging apparatus illustrated by FIG. 1A can include additional components, such as the various components illustrates by FIG. 1B-1E. Such modifications do not depart from the true spirit and scope of various aspects of the disclosure, including aspects set forth in the claims.

What is claimed is:

1. An imaging apparatus comprising:
    a light source configured and arranged to generate optical power for delivery at a molecular sample;
    in response to the light source generating the optical power, an imaging spectrometer configured and arranged to separate light emitted from one or more regions of the molecular sample illuminated by the optical power into a plurality of different component wavelengths;
    an image sensor, including circuitry, configured and arranged to collect the light emitted along an optical pathway corresponding to the plurality of different component wavelengths; and
    control circuitry configured and arranged with the image sensor to scan the molecular sample by:
        causing the image sensor to scan the one or more regions of the molecular sample while the imaging spectrometer is aligned with the image sensor; and
        collecting hyperspectral image data of the molecular sample from the light emitted that corresponds to the plurality of different component wavelengths; and
    processing circuitry configured and arranged to perform an image processing pipeline by transforming the hyperspectral image data into data that is representative of a quantification of emitters, absorbers, and/or scatterers present in the one or more regions of the molecular sample.

2. The imaging apparatus of claim 1, further including an optical system configured and arranged to focus the light from the light source into an illumination line and onto a molecular sample, wherein the light source includes a multi-mode laser diode.

3. The imaging apparatus of claim 1, wherein the processing circuitry is configured and arranged to transform the hyperspectral image data by performing decomposition of spectra intensities of the different component wavelengths into the quantification of emitters, absorbers, and/or scatterers present using a parallelized process.

4. The imaging apparatus of claim 1, wherein the processing circuitry is configured and arranged to transform the hyperspectral image data by performing decomposition of spectra intensities of the different component wavelengths into partial emitters, absorbers, and/or scatterers quantifications and decomposition of the partial emitters, absorbers, and/or scatterers quantifications into the emitters, absorbers, and/or scatterers quantifications.

5. The imaging apparatus of claim 1, wherein the processing circuitry is configured and arranged to revise the hyperspectral image data to account for distortions, the distortions including phenomena selected from the group consisting of: keystone phenomenon, smile phenomenon, pixel misregistrations, non-uniform illumination, phase correction, measurement noise, and a combination thereof.

6. The imaging apparatus of claim 1, wherein:
    the control circuitry is further configured and arranged to generate first calibration data indicative of emitters, absorbers, and/or scatterers present in the molecular sample and second calibration data indicative of distortions present in the imaging apparatus; and
    the processing circuitry is further configured and arranged to perform the image processing pipeline using the first and the second calibration data.

7. The imaging apparatus of claim 1, wherein the processing circuitry is configured and arranged to perform the image processing pipeline by using a first technique including an ordinary least squares method, and, in response to sampled data points producing negative emitters, absorbers, and/or scatterers quantities or exhibiting residual error outside a threshold error as determined using the first technique, using a second technique.

8. The imaging apparatus of claim 1, wherein the processing circuitry is configured and arranged to calibrate illumination of the hyperspectral image data using a non-uniform intensity pattern attributable to the light source by performing decomposition of measured spectra intensities of the different component wavelengths into emitter, absorber, and/or scatterer intensities, and adjusting for optical power of the light source based on a non-uniform intensity pattern.

9. The imaging apparatus of claim 8, wherein the processing circuitry is configured and arranged to identify the non-uniform intensity pattern for each of a plurality of light sources.

10. The imaging apparatus of claim 9, wherein the apparatus further includes a stage configured and arranged to hold the molecular sample, and the control circuitry and processing circuitry are further configured and arranged to calibrate the illumination of the hyperspectral image data with the non-uniform intensity patterns by, for each of the plurality of light sources:
    controlling movement of the molecular sample in a direction of an illumination line of the respective light source via the stage and, for each pixel in the direction, collecting the light emitted that corresponds to the plurality of different component wavelengths; and identifying the non-uniform intensity pattern corresponding to the respective light source using the collected light emitted for each pixel in the direction of the illumination line.

11. The imaging apparatus of claim 1, wherein the processing circuitry is further configured and arranged to revise the hyperspectral image data to account for a variation in quantum efficiency of the image sensor or emitted light optical pathway spectral efficiency, wherein the quantum efficiency of the image sensor or the emitted light optical pathway spectral efficiency varies with wavelengths of the plurality of different component wavelengths.

12. The imaging apparatus of claim 1, wherein the control circuitry is further configured and arranged to maintain a measured peak signal from the image sensor in a threshold saturation range.

13. An imaging apparatus comprising:
a multi-mode laser diode configured and arranged to generate optical power for delivery at a molecular sample;
in response to the multi-mode laser diode generating the optical power, an imaging spectrometer configured and arranged to separate light emitted from the molecular sample illuminated by the optical power into a plurality of different component wavelengths;
an image sensor, including circuitry, configured and arranged to collect the light emitted along an optical pathway corresponding to the plurality of different component wavelengths;
control circuitry configured and arranged with the image sensor to scan the molecular sample by:
causing the image sensor to scan the molecular sample while maintaining alignment of the imaging spectrometer with the image sensor and while maintaining alignment of fast and slow axes of the multi-mode laser diode to filter the optical power to an illumination line for delivery onto the molecular sample; and
collecting hyperspectral image data of the molecular sample from the collected light emitted that corresponds to the plurality of different component wavelengths.

14. The imaging apparatus of claim 13, wherein the multi-mode laser diode is configured and arranged to generate sufficient power for delivering at least 100 milliwatts (mW) of optical power at the molecular sample, and wherein the control circuitry is further configured and arranged with the image sensor to scan the molecular sample by causing the image sensor to scan the molecular sample while maintaining the alignment of fast and slow axes of the multi-mode laser diode to filter the optical power to the illumination line and reduce out-of-focus light.

15. The imaging apparatus of claim 13, wherein the imaging spectrometer further includes an optical slit aligned with fast and slow axes of the multi-mode laser diode, the optical slit being configured and arranged to filter the light emitted, reflected, transmitted, or scattered to a line and reduce out-of-focus light.

16. The imaging apparatus of claim 13, wherein the imaging spectrometer further includes an optical slit having a plurality of slits, the plurality of slits being configured and arranged along the optical pathway to filter the light emitted, reflected, transmitted or scattered to a line at one or more different regions imaged and to reduce out-of-focus light, wherein the out-of-focus light includes light from a neighboring region imaged.

17. The imaging apparatus of claim 13, further including processing circuitry configured and arranged to transform the hyperspectral image data into data that is representative of a quantification of emitters, absorbers, and/or scatterers present in the molecular sample by performing spectral decomposition of spectra intensities of the different component wavelengths into the quantification of emitters, absorbers, and/or scatterers present using a parallelized process.

18. The imaging apparatus of claim 13, further including a light source arrangement having a plurality of light sources, at least one of the plurality of lights sources including the multi-mode laser diode.

19. An imaging apparatus comprising:
a light source arrangement having at least one light source configured and arranged to generate optical power for delivering a plurality of illumination lines at a molecular sample;
a stage configured and arranged to hold the molecular sample;
in response to the at least one light source generating the optical power, an imaging spectrometer configured and arranged to separate light emitted from the molecular sample illuminated by the plurality of illumination lines into a plurality of different component wavelengths, the imaging spectrometer configured and arranged to filter the light emitted to a line among the plurality of illuminations lines at different regions imaged of the molecular sample, wherein:
the plurality of illumination lines are arranged as a modified light profile of the optical power generated by the at least one light source, and having, for each of the respective different regions imaged, a characteristic of reduced out-of-focus light from a neighboring region image;
an image sensor, including circuitry, configured and arranged to collect the light emitted along an optical pathway from the molecular sample that corresponds to the plurality of different component wavelengths; and
control circuitry configured and arranged with the image sensor to scan the molecular sample by:
causing the image sensor to scan the molecular sample including controlling a position of the molecular sample via movement of the stage and while maintaining alignment of the imaging spectrometer with the light emitted from the molecular sample and the image sensor; and
collecting hyperspectral image data of the molecular sample from the light emitted that corresponds to the plurality of different component wavelengths.

20. The imaging apparatus of claim 19, wherein the imaging spectrometer includes a plurality of optical slits configured and arranged to filter the light emitted, reflected, transmitted or scattered to the plurality of illumination lines, and the control circuitry is configured to cause the image sensor to scan the molecular sample by causing the image sensor to scan the molecular sample further includes:
causing the image sensor to scan a region of the molecular sample while the imaging spectrometer is aligned with the image sensor and while, on-the-fly and during the scan, determining a depth position for the region or another region of the molecular sample to be scanned after the region; and
causing the molecular sample to move to the depth position via the stage, the apparatus optionally including at least one lens, wherein the at least one lens or the imaging spectrometer is configured and arranged to generate the plurality of illumination lines by expanding the optical power generated by the at least one light source into the plurality of illumination lines that cross a plurality of points of the molecular sample.

21. An imaging apparatus comprising:

a light source configured and arranged to generate sufficient power for delivering at least 100 milliwatts (mW) of optical power at a molecular sample;

in response to the light source generating the sufficient power, an imaging spectrometer configured and arranged to separate light emitted from a region of the molecular sample illuminated by the optical power into a plurality of different component wavelengths;

an image sensor, including circuitry, configured and arranged to collect the light emitted along an optical pathway from the region of the molecular sample corresponding to plurality of different component wavelengths;

a stage configured and arranged to hold the molecular sample; and control circuitry configured and arranged with the image sensor to scan the molecular sample by, repeatedly carrying out the following acts:

causing the image sensor to scan the region of the molecular sample while the imaging spectrometer is aligned with the image sensor and while, on-the-fly and during the scan, determining a depth position for the region or another region of the molecular sample to be scanned after the region; and causing the molecular sample to move, via the stage, to the depth position to alter an effective length of the optical pathway and therein improving a quality of a focal plane for the region or the other region of the molecular sample.

22. The imaging apparatus of claim 21, wherein:

the image sensor is further configured and arranged to collect a plurality of lines, each of the plurality of lines being a different z-distance away from an image plane of the imaging apparatus; and the control circuitry is configured and arranged to determine an optimal focal plane for the region or the other region of the molecular sample by using the plurality of lines.

23. The imaging apparatus of claim 21, further including:

a substrate having a reflective coating on a surface thereof and configured and arranged to contain the molecular sample; and wherein the control circuitry is further configured and arranged to determine an optimal focal plane for the region or the other region of the molecular sample by using light reflected from the reflective coating.

24. The imaging apparatus of claim 21, further including autofocusing control circuitry configured and arranged with a cylindrical lens or mirror and the image sensor to collect a plurality of lines at the image sensor that represent the other region of the molecular sample, wherein each of the plurality of lines at the imaging sensor are a different z-distance from an image plane of the imaging apparatus.

25. The imaging apparatus of claim 21, wherein the control circuitry is further configured and arranged to maintain a measured peak signal from the image sensor in a threshold saturation range.

* * * * *